United States Patent
Ryu et al.

(10) Patent No.: US 11,848,744 B2
(45) Date of Patent: *Dec. 19, 2023

(54) NON-ACCESS STRATUM CONNECTION HANDLING FOR WIRELESS DEVICES

(71) Applicant: Ofinno, LLC, Reston, VA (US)

(72) Inventors: Jinsook Ryu, Oakton, VA (US);
Esmael Hejazi Dinan, McLean, VA (US); Yunjung Yi, Vienna, VA (US);
Kyungmin Park, Vienna, VA (US);
Peyman Talebi Fard, Vienna, VA (US);
Weihua Qiao, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,217

(22) Filed: Feb. 10, 2023

(65) Prior Publication Data
US 2023/0198611 A1 Jun. 22, 2023

Related U.S. Application Data

(63) Continuation of application No. 17/466,466, filed on Sep. 3, 2021, now Pat. No. 11,581,942, which is a
(Continued)

(51) Int. Cl.
*H04B 7/185* (2006.01)
*H04W 76/25* (2018.01)
(Continued)

(52) U.S. Cl.
CPC ..... *H04B 7/18526* (2013.01); *H04B 7/18539* (2013.01); *H04B 7/19* (2013.01);
(Continued)

(58) Field of Classification Search
CPC .. H04B 7/18526; H04B 7/18539; H04B 7/19; H04B 7/195; H04B 7/185; H04W 76/25;
(Continued)

(56) References Cited

U.S. PATENT DOCUMENTS

| 6,512,920 B1 | 1/2003 | Yaoya |
| 10,009,093 B2 | 6/2018 | Purkayastha et al. |

(Continued)

FOREIGN PATENT DOCUMENTS

| WO | 2020/062092 A1 | 4/2020 |
| WO | 2020/144572 A1 | 7/2020 |

(Continued)

OTHER PUBLICATIONS

3GPP TR 22.822 V16.0.0 (Jun. 2018); Technical Report; 3rd Generation Partnership Project; Technical Specification Group Services and System Aspects; Study on using Satellite Access in 5G; Stage 1; (Release 16).

(Continued)

*Primary Examiner* — Afshawn M Towfighi
(74) *Attorney, Agent, or Firm* — Sachin Kandhari; Kavon Nasabzadeh; Philip R. Smith

(57) ABSTRACT

A wireless device receives, from a base station, access network information. The wireless device determines, based on the access network information, an access network type. The wireless device selects, based on the access network type, a non-access stratum (NAS) period value from between a first NAS period value associated with a terrestrial network (TN) access network type; and a second NAS period value associated with a geostationary earth orbit (GEO) access network type. The wireless device sends, to an access and mobility management function (AMF), a first NAS request message. The wireless device starts, based on the sending the first NAS request message, a NAS period using the NAS period value.

20 Claims, 33 Drawing Sheets

Related U.S. Application Data continuation of application No. 16/899,651, filed on Jun. 12, 2020, now Pat. No. 11,115,115.

(60) Provisional application No. 62/861,439, filed on Jun. 14, 2019.

(51) Int. Cl.
*H04B 7/19* (2006.01)
*H04B 7/195* (2006.01)
*H04W 8/08* (2009.01)
*H04W 48/16* (2009.01)
*H04W 88/14* (2009.01)

(52) U.S. Cl.
CPC .............. *H04B 7/195* (2013.01); *H04W 8/08* (2013.01); *H04W 48/16* (2013.01); *H04W 76/25* (2018.02); *H04W 88/14* (2013.01)

(58) Field of Classification Search
CPC ....... H04W 8/08; H04W 48/16; H04W 88/14; H04W 76/10; H04W 60/00; H04W 24/02; H04W 84/06; H04W 84/042; H04W 48/00
See application file for complete search history.

(56) References Cited

U.S. PATENT DOCUMENTS

| | | | |
|---|---|---|---|
| 11,115,115 B2* | 9/2021 | Ryu | ............... H04W 24/02 |
| 11,581,942 B2* | 2/2023 | Ryu | ............... H04B 7/19 |
| 2002/0052180 A1 | 5/2002 | Ravishankar et al. | |
| 2007/0010252 A1 | 1/2007 | Balachandran et al. | |
| 2007/0135040 A1 | 6/2007 | Draim | |
| 2009/0041246 A1 | 2/2009 | Kitazoe | |
| 2015/0271730 A1 | 9/2015 | Benammar et al. | |
| 2015/0381263 A1 | 12/2015 | Lejnell et al. | |
| 2019/0342827 A1* | 11/2019 | Kim | ............... H04W 48/18 |
| 2019/0394770 A1 | 12/2019 | Wang et al. | |
| 2020/0100088 A1 | 3/2020 | Kim et al. | |
| 2020/0367190 A1* | 11/2020 | Wang | ............... H04W 36/0072 |
| 2020/0396000 A1* | 12/2020 | Ryu | ............... H04B 7/195 |
| 2021/0105064 A1* | 4/2021 | Faccin | ............... H04W 48/16 |
| 2021/0194572 A1 | 6/2021 | Gu | |
| 2022/0006514 A1 | 1/2022 | Sedin et al. | |
| 2022/0021444 A1 | 1/2022 | Wei et al. | |

FOREIGN PATENT DOCUMENTS

| | | |
|---|---|---|
| WO | 2020/148582 A1 | 7/2020 |
| WO | 2020/156674 A1 | 8/2020 |

OTHER PUBLICATIONS

3GPP TS 23.401 V15.7.0 (Mar. 2019); Technical Specification; 3rd Generation Partnership Project; General Packet Radio Service (GPRS) enhancements for Evolved Universal Terrestrial Radio Access Network (E-UTRAN) access (Release 15).
3GPP TS 23.501 V15.3.0 (Sep. 2018); Technical Specification; 3rd Generation Partnership Project; Technical Specification Group Services and System Aspects; System Architecture for the 5G System; Stage 2; (Release 15).
3GPP TS 23.502 V15.5.0 (Mar. 2019); Technical Specification; 3rd Generation Partnership Project; Technical Specification Group Services and System Aspects; Procedures for the 5G System; Stage 2; (Release 15).
3GPP TR 23.737 V0.7.0 (May 2019); Technical Report; 3rd Generation Partnership Project; Technical Specification Group Services and System Aspects; Study on architecture aspects for using satellite access in 5G (Release 16).
3GPP TS 24.301 V15.6.0 (Mar. 2019); Technical Specification; 3rd Generation Partnership Project; Technical Specification Group Core Network and Terminals; Non-Access-Stratum (NAS) protocol for Evolved Packet System (EPS); Stage 3 (Release 15).
C1-163140; 3GPP TSG-CT WG1 Meeting #98; Osaka (Japan), May 23-27, 2016; (was C1-163086); CR-Form-v11.1; Change Request; 24.301 CR 2427; rev 3; Current version: 13.5.0; Title: Update of NAS timers to support NB-S1 mode; Source to WG: Huawei, HiSilicon; Source to TSG: C1; Work item code: CIoT-CT.
C1-163087; 3GPP TSG-CT WG1 Meeting #98; Osaka (Japan), May 23-27, 2016; (was C1-162783); CR-Form-v11.1; Change Request; 24.301 CR 2428; rev 2; Current version: 13.5.0; Title: Update of NAS timers to support WB-S1 mode for IoT; Source to WG: Huawei, HiSilicon; Source to TSG: C1; Work item code: TEI13, LTE_MTCe2_L1-Core.
C1-163448; 3GPP TSG-CT WG1 Meeting #99; Tenerife (Spain), Jul. 25-29, 2016; CR-Form-v11.1; Change Request; 24.301 CR 2519; rev-; Current version: 13.6.1; Title: Correction to NAS timer extension multiplier to support NB-S1 mode; Source to WG: Huawei, HiSilicon; Source to TSG: C1; Work item code: CIoT-CT.
3GPP TS 24.501 V15.3.0 (Mar. 2019); Technical Specification; 3rd Generation Partnership Project; Technical Specification Group Core Network and Terminals; Non-Access-Stratum (NAS) protocol for 5G System (5GS); Stage 3; (Release 15).
3GPP TS 38.413 V15.3.0 (Mar. 2019); Technical Specification; 3rd Generation Partnership Project; Technical Specification Group Radio Access Network; NG-RAN; NG Application Protocol (NGAP); (Release 15).
R2-1908244; 3GPP RAN WG2 Meeting #106; Reno, United States, May 13-May 17, 2019; Agenda Item: 11.6.4.1; Source: InterDigital Inc., Nomor Research, Thales, MediaTek; Title: Mobility Challenges in Non-Terrestrial Networks (NTN); Document for: Discussion, Decision.
3GPP TR 38.821 V0.6.0 (Apr. 2019); Technical Report; 3rd Generation Partnership Project; Technical Specification Group Radio Access Network; Solutions for NR to support non-terrestrial networks (NTN) (Release 16).
3GPP TR 38.811 V1.0.0 (Jun. 2018) Technical Report; 3rd Generation Partnership Project; Technical Specification Group Radio Access Network; Study on New Radio (NR) to support non terrestrial networks (Release 15).
RP-190710; 3GPP TSG RAN meeting #83; Shenzen, China, Mar. 18-21, 2019; revision of RP-181370, 1598, 2444, 2844, 2880; Source: Thales; Title: Study on solutions for NR to support non-terrestrial networks (NTN); Type: SID new Document for: Approval; Agenda Item: 9.3.1—Study on NR to support non-terrestrial networks, moderator: Thales Release Rel-16.
SP-181253; TSG SA Meeting #SP-82; Dec. 12-14, 2018, Sorrento, Italy; (SP-181112); Source: SA WG2; Title: Update to FS_5GSAT_ARCH: Study on architecture aspects for using satellite access in 5G; Document for: Approval; Agenda Item: 17B.10; Work Item: FS_5GSAT_ARCH.
3GPP TR 38.821 V0.7.0 (May 2019); 3rd Generation Partnership Project; Technical Specification Group Radio Access Network; Solutions for NR to support non-terrestrial networks (NTN); (Release 16).
3GPP TR 23.737 V0.8.0 (May 2019); 3rd Generation Partnership Project; Technical Specification Group Services and System Aspects; Study on architecture aspects for using satellite access in 5G; (Release 16).
R2-1818511; 3GPP TSG-RAN WG2 Meeting #104; Spokane, USA, Nov. 12-16, 2018; Agenda item: 11.6.3.1; Source: Nomor Research GmbH, Thales; Title: Considerations on MAC Timers and on RTD Compensation Offset in Non-Terrestrial Networks (NTN); Document for: Discussion, Decision.
R3-191768; 3GPP TSG-RAN WG3 #103bis; Xi'An, China, Apr. 8-12, 2019; Agenda item: 20.2.5.1; Source: Ericsson; Title: DC and NTN-Xn Terminated on the Ground; Document for: Approval.
R2-1905906; 3GPP TSG RAN WG2 Meeting #106; Reno, USA, May 13- 17, 2019; Agenda item: 11.6.4.3; Source: Nomor Research GmbH; Title: System Information in NTN; Document for: Decision.
R1-1904000; 3GPP TSG RAN WG1 Meeting #96bis; Xi'an, China, Apr. 8-12, 2019; Agenda item: 7.2.5.3; Source: Huawei, HiSilicon; Title: Discussion on timing advance and RACH procedures for NTN; Document for: Discussion and Decision.

(56) References Cited

OTHER PUBLICATIONS

Extended European Search Report, dated Aug. 26, 2020, in European Patent Application No. 20179830.3.
3GPP TS 24.501 V16.1.0 (Jun. 2019); 3rd Generation Partnership Project; Technical Specification Group Core Network and Terminals; Non-Access-Stratum (NAS) protocol for 5G System (5GS); Stage 3; (Release 16).
3GPP TS 23.501 V17.3.0 (Dec. 2021); Technical Specification; 3rd Generation Partnership Project; Technical Specification Group Services and System Aspects; System architecture for the 5G System (5GS); Stage 2; (Release 17).
3GPP TR 23.737 V0.8.0 (May 2019); Technical Report; 3rd Generation Partnership Project; Technical Specification Group Services and System Aspects; Study on architecture aspects for using satellite access in 5G; (Release 16).
3GPP TR 23.737 V17.2.0 (Mar. 2021); Technical Report; 3rd Generation Partnership Project; Technical Specification Group Services and System Aspects; Study on architecture aspects for using satellite access in 5G; (Release 17).
3GPP TS 24.501 V16.0.2 (Mar. 2019); Technical Specification; 3rd Generation Partnership Project; Technical Specification Group Core Network and Terminals; Non-Access-Stratum (NAS) protocol for 5G System (5GS); Stage 3; (Release 16).
3GPP TS 38.413 V16.8.0 (Dec. 2021); Technical Specification; 3rd Generation Partnership Project; Technical Specification Group Radio Access Network; NG-RAN; NG Application Protocol (NGAP); (Release 16).
C1-221004; 3GPP TSG CT WG1 Meeting#134-e; Electronic meeting, Feb. 17-25, 2022.
C1-221006; 3GPP TSG CT WG1 Meeting#134-e; Electronic meeting, Feb. 17-25, 2022.
C1-221036; 3GPP TSG-CT WG1 Meeting #134-e; E-Meeting, Feb. 17-25, 2022; 3GPP TSG-RAN WG2 Meeting #116bis-e; R2-2201951; E-meeting, Jan. 17-25, 2022; Title: Reply LS on IoT NTN extended NAS supervision timers at satellite access; Release: Rel-17; Work Item: LTE_NBIOT_eMTC_NTN, 5GSAT_ARCH-CT.
C1-221144; 3GPP TSG-CT WG1 Meeting #134e; E-meeting, Feb. 17-25, 2022; Source: Ericsson; Title: Extended NAS timers at satellite access; Agenda item: 17.2.4; Document for: Decision.
C1-221146; 3GPP TSG-CT WG1 Meeting #134e; E-meeting, Feb. 17-25, 2022; CR-Form-v12.1; Change Request; 24.501; CR 3901; rev 2; Current version: 17.5.0; Title: Addition of extended NAS timers via a satellite NG- RAN cell—Alternative A.
C1-221147; 3GPP TSG-CT WG1 Meeting #134e; E-meeting, Feb. 17-25, 2022; CR-Form-v12.1; Change Request; 24.501; CR 3994; rev -; Current version: 17.5.0; Title: Addition of extended NAS timers via a satellite NG- RAN cell—Alternative B.
C1-222030; 3GPP TSG-CT WG1 Meeting #134e; E-meeting, Feb. 17-25, 2022; (was C1-221146); CR-Form-v12.1; Change Request; 24.501; CR 3901; rev 3; Current version: 17.5.0; Title: Addition of extended NAS timers via a satellite NG-RAN cell—Alternative A.
C1-222098; 3GPP TSG-CT WG1 Meeting #134-e; E-Meeting, Feb. 17-25, 2022; Title: NR satellite RAT type in UE NAS; Response to:-; Release: Rel-17; Work Item: 5GSAT_ARCH-CT.
3GPP TS 24.501 V16.1.0 (Jun. 2019); Technical Specification; 3rd Generation Partnership Project; Technical Specification Group Core Network and Terminals; Non-Access-Stratum (NAS) protocol for 5G System (5GS); Stage 3; (Release 16).

* cited by examiner

CM State Transition in UE

CM State Transition in AMF 5G system architecture

Non-terrestrial network architecture with transparent satellite

Non-terrestrial network architecture with regenerative satellite

Different types of satellites

| RAT type/Platform type | Altitude range | Orbit | Typical beam footprint size |
|---|---|---|---|
| LEO satellite | 300 – 1500 km | Circular around the earth | 100 – 500 km |
| MEO satellite | 7000 – 25000 km | | 100 – 500 km |
| GEO satellite | 35,786 km | Notional station keeping position fixed in terms of elevation/azimuth with respect to a given earth point | 200 – 1000 km |
| UAS platform | 8-50 km (20km for HAPS) | | 5 – 200 km |
| HEO platform | 400 – 50000km | Elliptical around the earth | 200 – 1000km |

Types of non-terrestrial network platforms

FIG. 18

| Class of Orbit | Altitude (km) | Elevation angle (degrees) | |
|---|---|---|---|
| | | 0 | 10 |
| | | | 90 |
| LEO satellite | | Propagation delay – satellite to UE (millisec) | |
| | 800 | 11.0 | 7.9 |
| | | | 2.7 |
| | 1400 | 14.8 | 11.6 |
| | | | 4.7 |
| MEO satellite | | Propagation delay – satellite to UE (millisec) | |
| | 8000 | 43.0 | 39.4 |
| | | | 26.7 |
| GEO satellite | | Propagation delay – satellite to UE (millisec) | |
| | 35,786 | 138.9 | 135.3 |
| | | | 119.3 |

Types of non-terrestrial network platforms

FIG. 19

Non-terrestrial and terrestrial access networks within a PLMN (PLMN A)

Non-terrestrial and terrestrial access networks within a PLMN

Control plane protocol stack between a UE and a AMF/SMF

```
┌─────────────────────────────────────┐
│  Receive, by a wireless device from a base station,  │
│  access network information indicating an access     │
│  network type of a plurality of access network       │
│  types comprising a GEO access network type, a       │
│  LEO access network type                             │
│                    3210                              │
└─────────────────────────────────────┘
                    │
                    ▼
┌─────────────────────────────────────┐
│  Select, based on the access network type, a 1st    │
│  NAS period among a plurality of periods            │
│  comprising a first value and a second value        │
│                    3220                              │
└─────────────────────────────────────┘
                    │
                    ▼
┌─────────────────────────────────────┐
│  Initiate a NAS procedure, by sending a 1st NAS     │
│  request message to the AMF via the base station,   │
│  wherein a start of the first NAS period is based   │
│  on the sending                                      │
│                    3230                              │
└─────────────────────────────────────┘
                    │
                    ▼
┌─────────────────────────────────────┐
│  In response to an expiration of the 1st NAS        │
│  period, abort the NAS procedure                     │
│                    3240                              │
└─────────────────────────────────────┘
```

FIG. 32

NON-ACCESS STRATUM CONNECTION HANDLING FOR WIRELESS DEVICES

CROSS-REFERENCE TO RELATED APPLICATIONS

This application is a continuation of U.S. patent application Ser. No. 17/466,466, filed on Sep. 3, 2021, which is a continuation of U.S. patent application Ser. No. 16/899,651, filed on Jun. 12, 2020, which claims the benefit of U.S. Provisional Application No. 62/861,439, filed Jun. 14, 2019, all of which are hereby incorporated by reference in their entireties.

BRIEF DESCRIPTION OF THE SEVERAL VIEWS OF THE DRAWINGS

Examples of several of the various embodiments of the present invention are described herein with reference to the drawings.

FIG. 18 is an example figure of different types of non-terrestrial network platforms.

FIG. 19 shows examples of propagation delay corresponding to NTNs of different altitudes.

FIG. 32 is a flow diagram of an aspect of an example embodiment of the present disclosure.

DETAILED DESCRIPTION OF EMBODIMENTS

Example embodiments of the present invention enable implementation of enhanced features and functionalities in 4G/5G systems. Embodiments of the technology disclosed herein may be employed in the technical field of 4G/5G systems and network slicing for communication systems. More particularly, the embodiments of the technology disclosed herein may relate to 5G core network and 5G systems for network slicing in communication systems. Throughout the present disclosure, UE, wireless device, and mobile device are used interchangeably.

Figure 1:
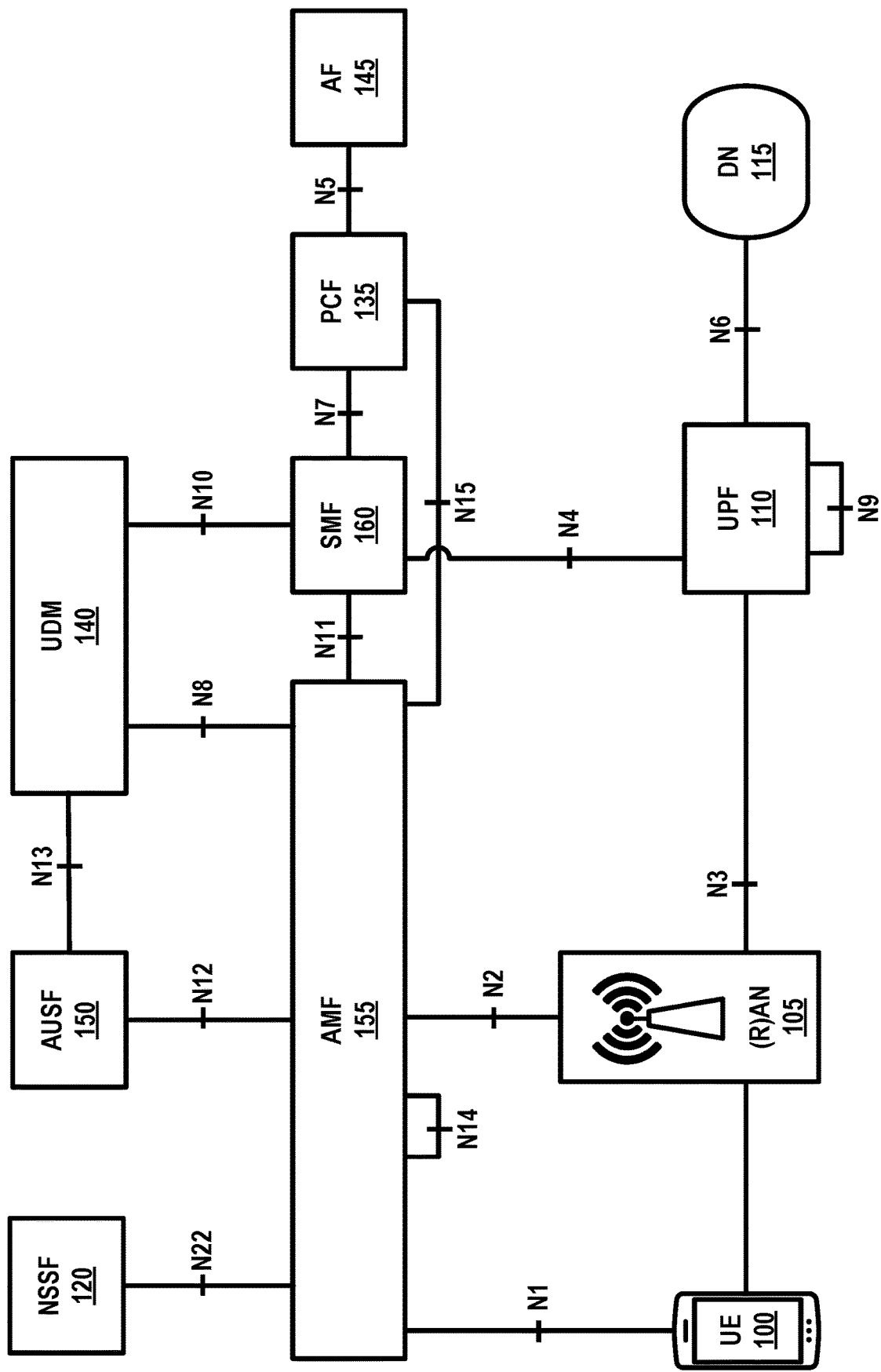
FIG. 1 is a diagram of an example 5G system architecture as per an aspect of an embodiment of the present disclosure.
Figure 2:
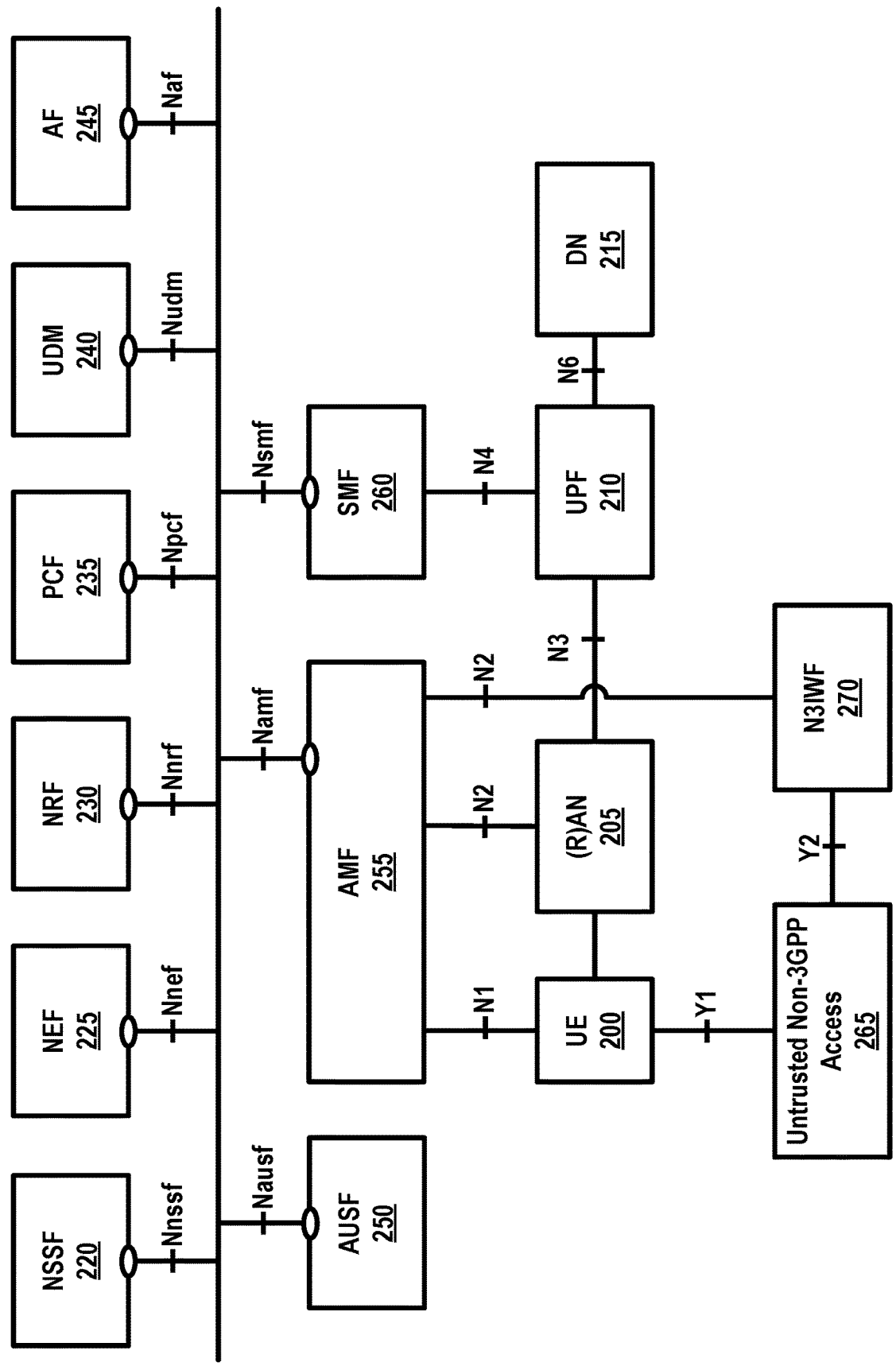
FIG. 2 is a diagram of an example 5G System architecture as per an aspect of an embodiment of the present disclosure.

The following acronyms are used throughout the present disclosure:

5G 5th generation mobile networks
5GC 5G Core Network
5GS 5G System
5G-AN 5G Access Network
5QI 5G QoS Indicator
ACK Acknowledgement
AF Application Function
AMF Access and Mobility Management Function
AN Access Network
CDR Charging Data Record
CCNF Common Control Network Functions
CIoT Cellular IoT
CN Core Network
CP Control Plane DDN Downlink Data Notification
DL Downlink
DN Data Network
DNN Data Network Name
DRX Discontinuous Reception
eNB Evolved Node B
F-TEID Fully Qualified TEID
gNB next generation Node B
GPSI Generic Public Subscription Identifier
GTP GPRS Tunneling Protocol
GUTI Globally Unique Temporary Identifier
HPLMN Home Public Land Mobile Network
IMSI International Mobile Subscriber Identity
LADN Local Area Data Network
LI Lawful Intercept
MEI Mobile Equipment Identifier
MICO Mobile Initiated Connection Only
MME Mobility Management Entity
MO Mobile Originated
MSISDN Mobile Subscriber ISDN
MT Mobile Terminating
N3IWF Non-3GPP InterWorking Function
NAI Network Access Identifier
NAS Non-Access Stratum
NB-IoT Narrow Band IoT
NEF Network Exposure Function
NF Network Function
NGAP Next Generation Application Protocol
ng-eNB Next Generation Evolved Node B
NG-RAN Next Generation Radio Access Network
NR New Radio
NRF Network Repository Function
NSI Network Slice Instance
NSSAI Network Slice Selection Assistance Information
NSSF Network Slice Selection Function
OCS Online Charging System
OFCS Offline Charging System
PCF Policy Control Function
PDU Packet/Protocol Data Unit
PEI Permanent Equipment Identifier
PLMN Public Land Mobile Network
PRACH Physical Random Access Channel
PLMN Public Land Mobile Network
RAN Radio Access Network
QFI QoS Flow Identity
RM Registration Management
S1-AP S1 Application Protocol
SBA Service Based Architecture
SEA Security Anchor Function
SCM Security Context Management
SI System Information
SIB System Information Block
SMF Session Management Function
SMSF SMS Function
S-NSSAI Single Network Slice Selection Assistance information
SUCI Served User Correlation ID
SUPI Subscriber Permanent Identifier
TEID Tunnel Endpoint Identifier
UE User Equipment
UL Uplink
UL CL Uplink Classifier
UPF User Plane Function
VPLMN Visited Public Land Mobile Network Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
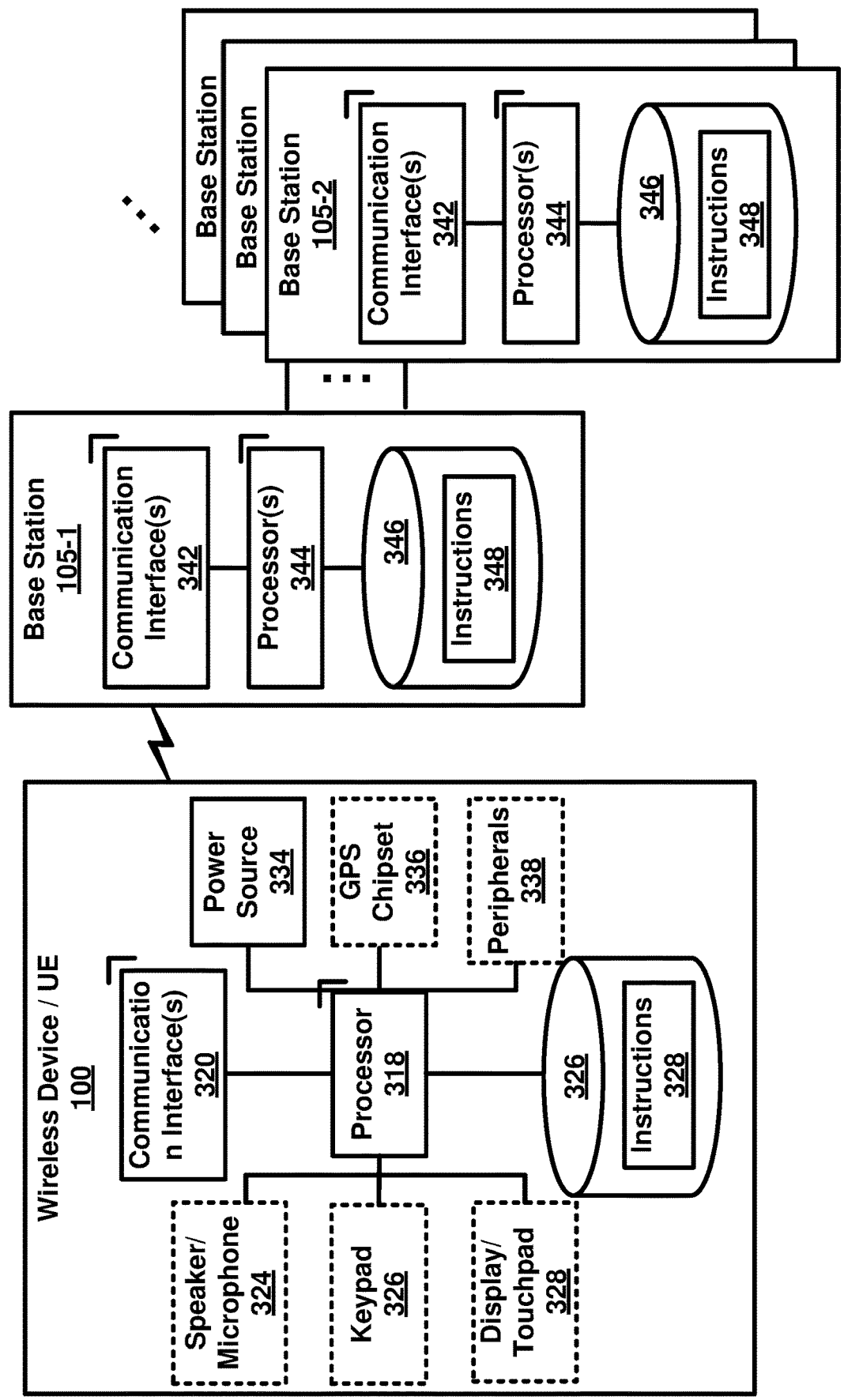
FIG. 3 is a system diagram of an example wireless device and a network node in a 5G system as per an aspect of an embodiment of the present disclosure.
Figure 4:
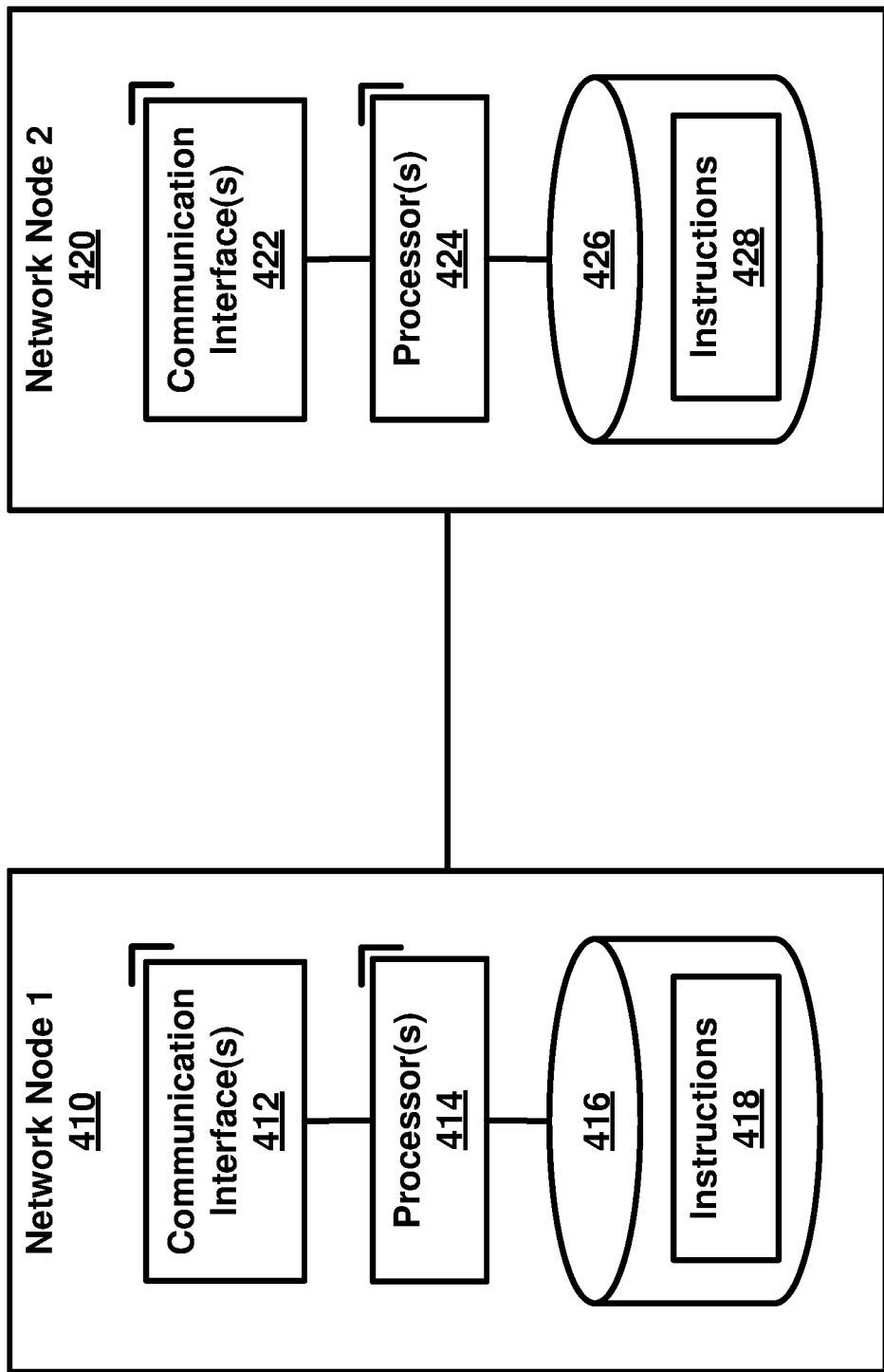
FIG. 4 is a system diagram of an example wireless device as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, a network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(s) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function (AF), AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the AN 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

Figure 5A:
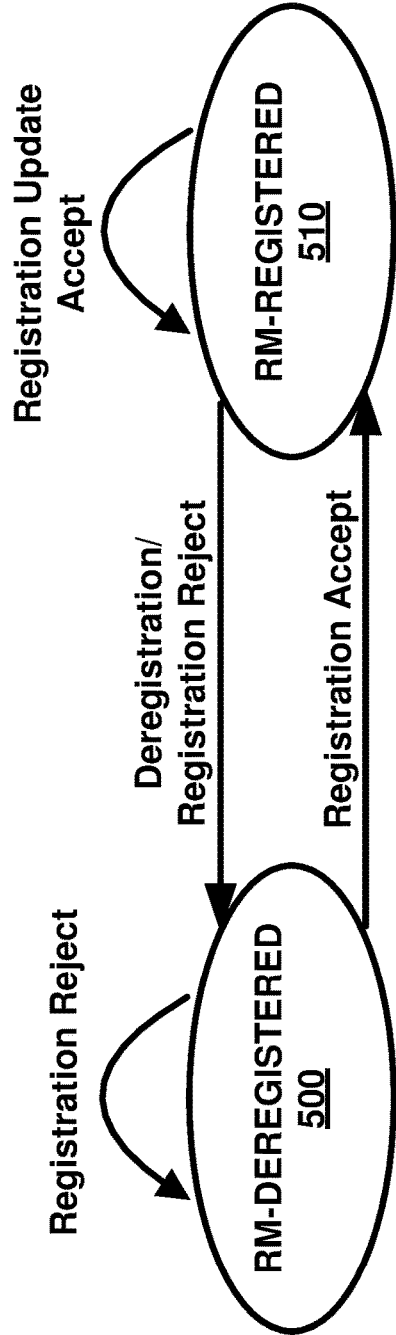
FIG. 5A and FIG. 5B depict two registration management state models in UE 100 and AMF 155 as per an aspect of embodiments of the present disclosure.
Figure 5B:
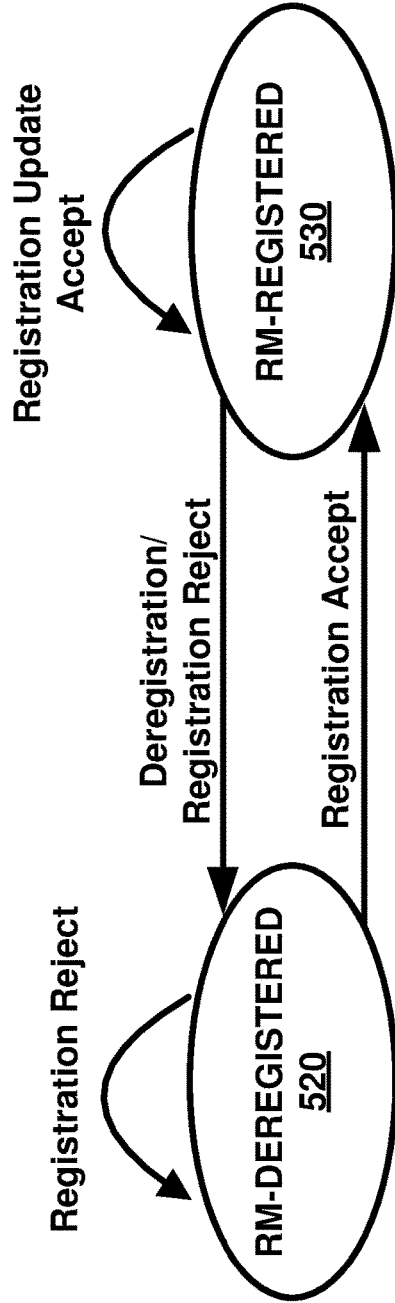

In an example, as depicted in example FIG. 5A and FIG. 5B, the registration management, RM may be employed to register or de-register a UE/user 100 with the network and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
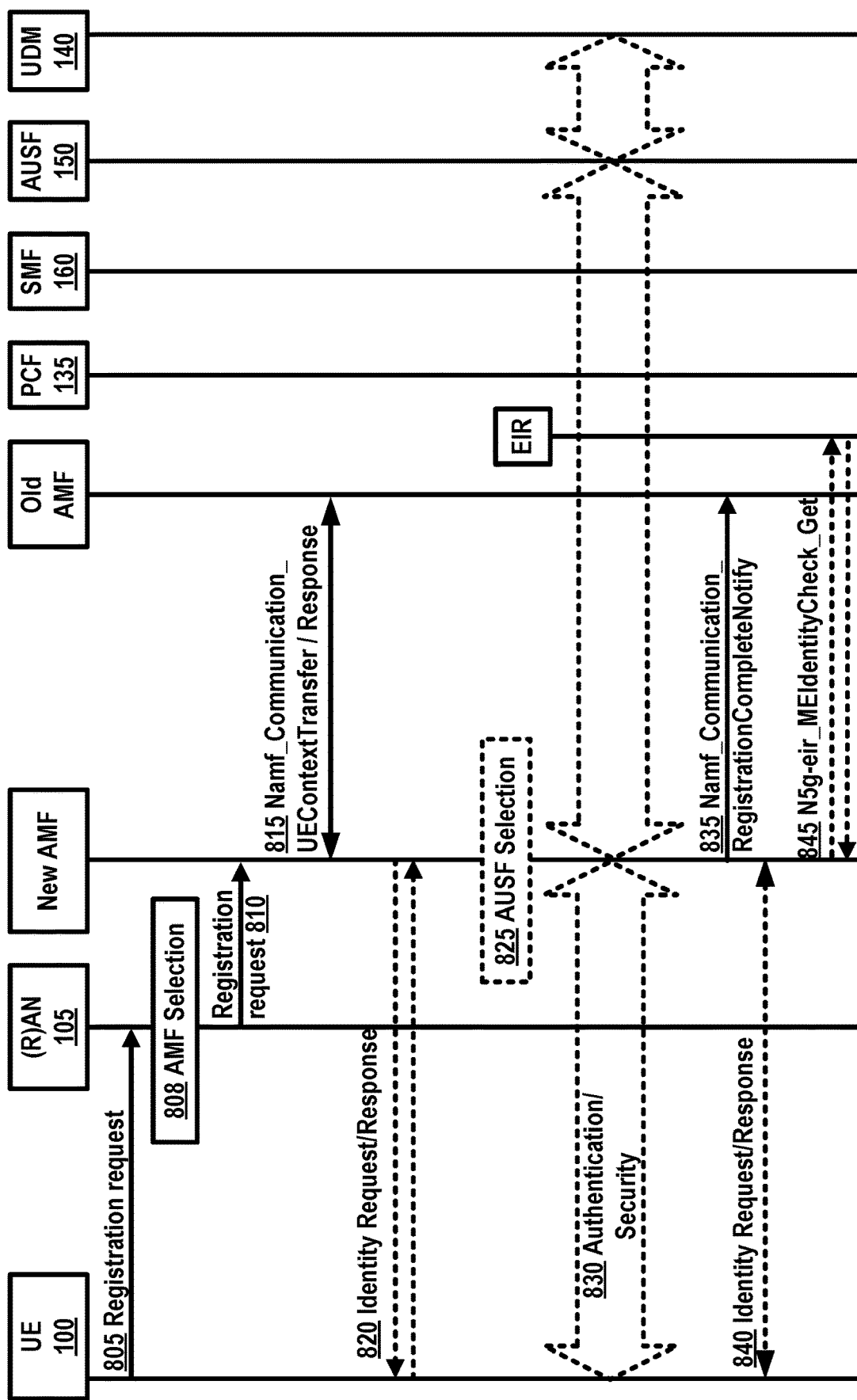
FIG. 8 is an example call flow as per an aspect of an embodiment of the present disclosure.
Figure 9:
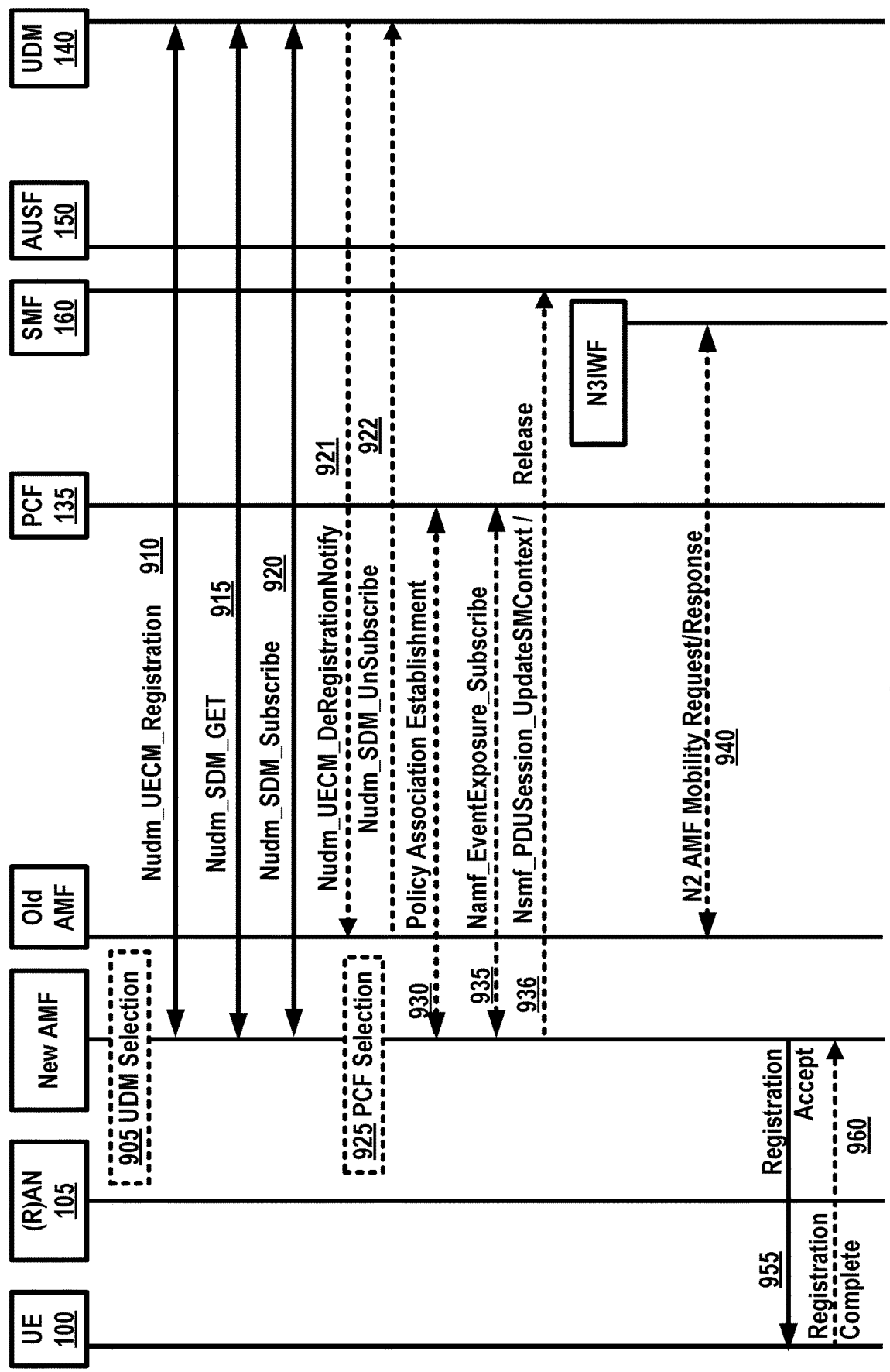
FIG. 9 is an example call flow as per an aspect of an embodiment of the present disclosure.

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

Figure 6A:
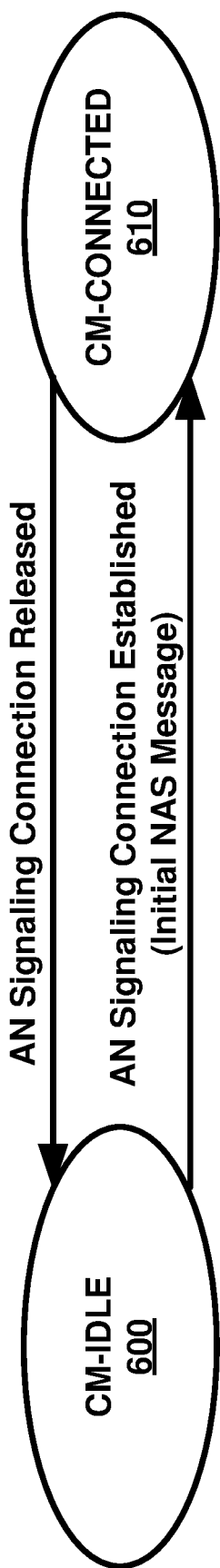
FIG. 6A and FIG. 6B depict two connection management state models in UE 100 and AMF 155 as per an aspect of embodiments of the present disclosure.
Figure 6B:
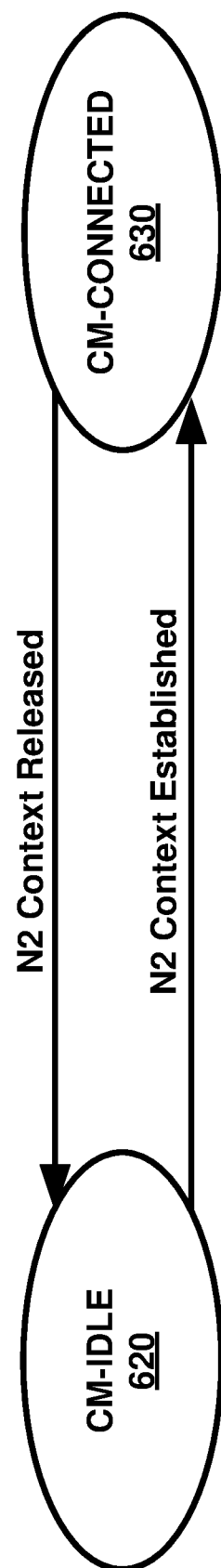

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the AN signaling connection between the UE 100 and the (R)AN 105 (e.g. RRC connection over 3GPP access) and the N2 connection for the UE 100 between the AN and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 may perform cell selection, cell reselection, PLMN selection, and/or the like. A UE 100 in CM-CONNECTED 610 state may have a NAS signaling connection with the AMF 155 over N1.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
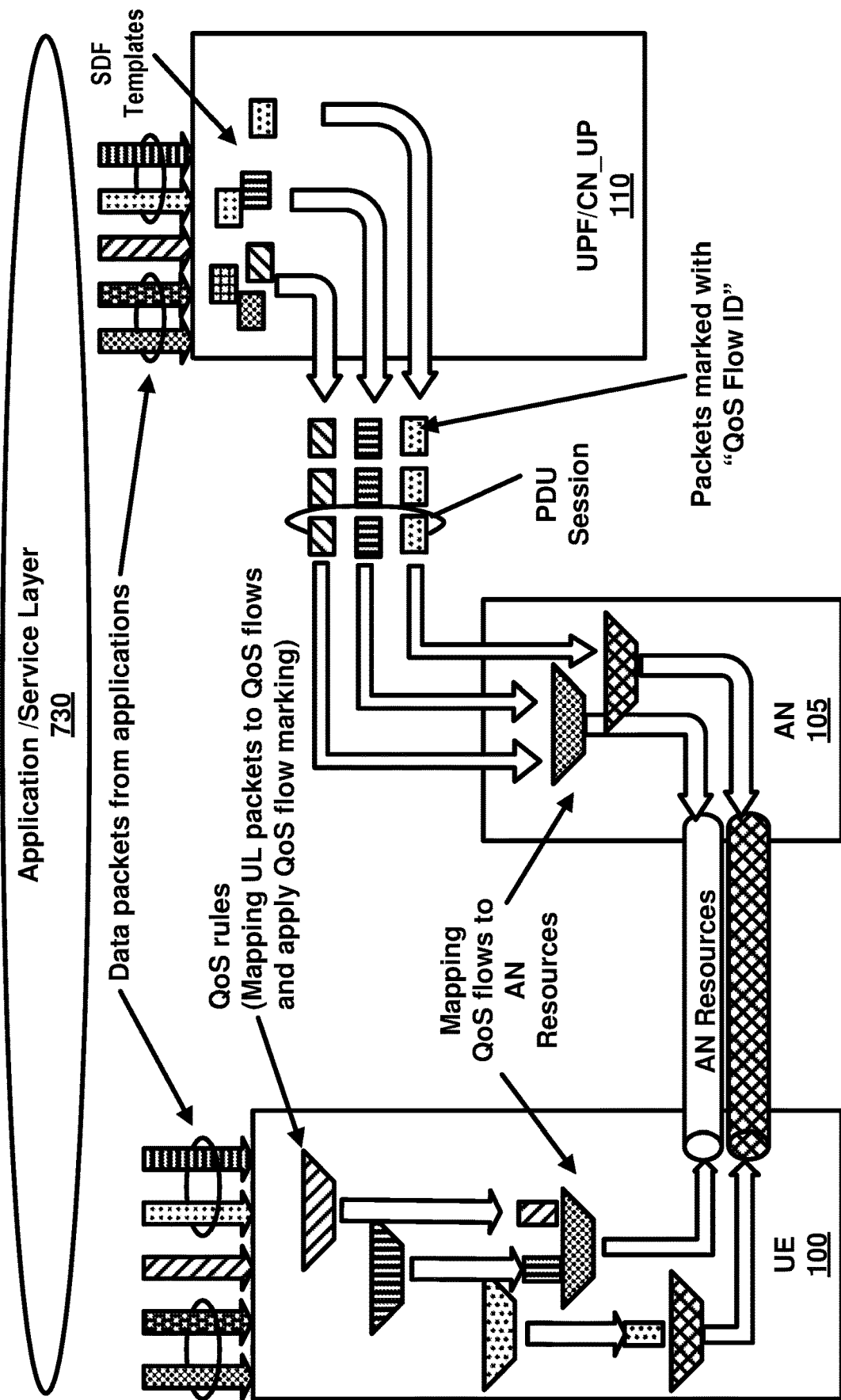
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like.).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEf 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer.

The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc.) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 should be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by each PLMN based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message 805 (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the AN parameters may include e.g. SUCI or SUPI or the 5G-GUTI, the Selected PLMN ID and requested NSSAI, and/or the like. In an example, the AN parameters may comprise establishment cause. The establishment cause may provide the reason for requesting the establishment of an RRC connection. In an example, the registration type may indicate if the UE 100 wants to perform an initial registration (e.g. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (e.g., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (e.g. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of each S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects 808 an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection 808.

In an example, the (R)AN 105 may send to the new AMF 155 an N2 message 810 (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 a Namf_Communication_UEContextTransfer (complete registration request) 815. In an example, if the UE's 5G-GUTI was included in the registration request and the serving AMF 155 has changed since last registration procedure, the new AMF 155 may invoke the Namf_Communication_UEContextTransfer service operation 815 on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by each NF consumer, for the UE, to the new AMF 155. In an example, if the UE 100 identifies itself with PEI, the SUPI request may be skipped.

In an example, the old AMF 155 may send to new AMF 155 a response 815 to Namf_Communication_UEContextTransfer (SUPI, MM context, SMF 160 information, PCF ID). In an example, the old AMF 155 may respond to the new AMF 155 for the Namf_Communication_UEContextTransfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure 820 may be initiated by the AMF 155 sending an identity request message to the UE 100 requesting the SUCI.

In an example, the UE 100 may respond with an identity response message 820 including the SUCI. The UE 100 may derive the SUCI by using the provisioned public key of the HPLMN.

In an example, the AMF 155 may decide to initiate UE 100 authentication 825 by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration the AMF 155 may skip the authentication and security setup or the AMF 155 may accept that the authentication may fail and may continue the registration procedure.

In an example, the authentication 830 may be performed by Nudm_UEAuthenticate_Get_operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify 835. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(*s*) to locally release the UE's SM context by invoking the Nsmf_PDUSession_ReleaseSMContext service operation.

In an example, the new AMF 155 may send to the UE 100 an identity request/response 840 (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check 845 by invoking the N5g-eir_EquipmentIdentityCheck_Get service operation 845.

In an example, the new AMF 155, based on the SUPI, may select 905 a UDM 140. The UDM 140 may select a UDR instance. In an example, the AMF 155 may select a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration 910 and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get 915. The UDM 140 may retrieve this information from UDR by Nudr_UDM_Query (access and mobility subscription data). After a successful response is received, the AMF 155 may subscribe to be notified using Nudm_SDM_Subscribe 920 when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification 921 to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe 922.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select 925 a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select 925 a PCF 135.

In an example, the new AMF 155 may perform a policy association establishment 930 during registration procedure. If the new AMF 155 contacts the PCF 135 identified by the (V-)PCF ID received during inter-AMF 155 mobility, the new AMF 155 may include the PCF-ID in the Npcf_AMPolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_EventExposure_Subscribe service operation 935 for UE 100 event subscription.

In an example, the AMF 155 may send to the SMF 160 a Nsmf_PDUSession_UpdateSMContext 936. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160(s) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155 may send to a N3IWF an N2 AMF 155 mobility request 940. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response 940.

In an example, the new AMF 155 may send to the UE 100 a registration accept 955 (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message 955. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of each S-NSSAI of the allowed NSSAI to the S-NSSAIs of the configured NSSAI for the HPLMN. The AMF 155 may include in the registration accept message 955 the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete 960 message. In an example, the UE 100 may send the registration complete message 960 to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
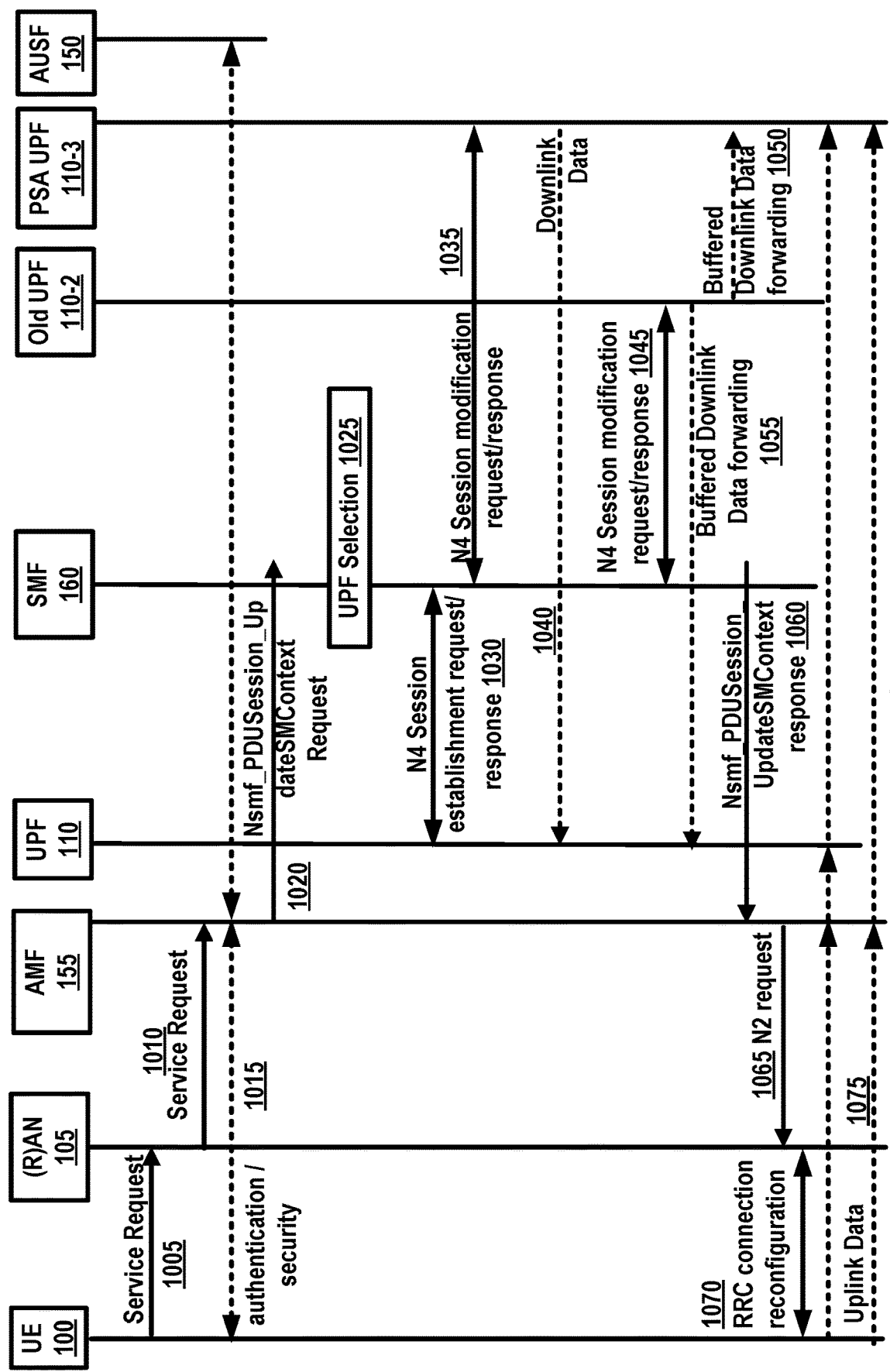
FIG. 10 is an example call flow as per an aspect of an embodiment of the present disclosure.
Figure 11:
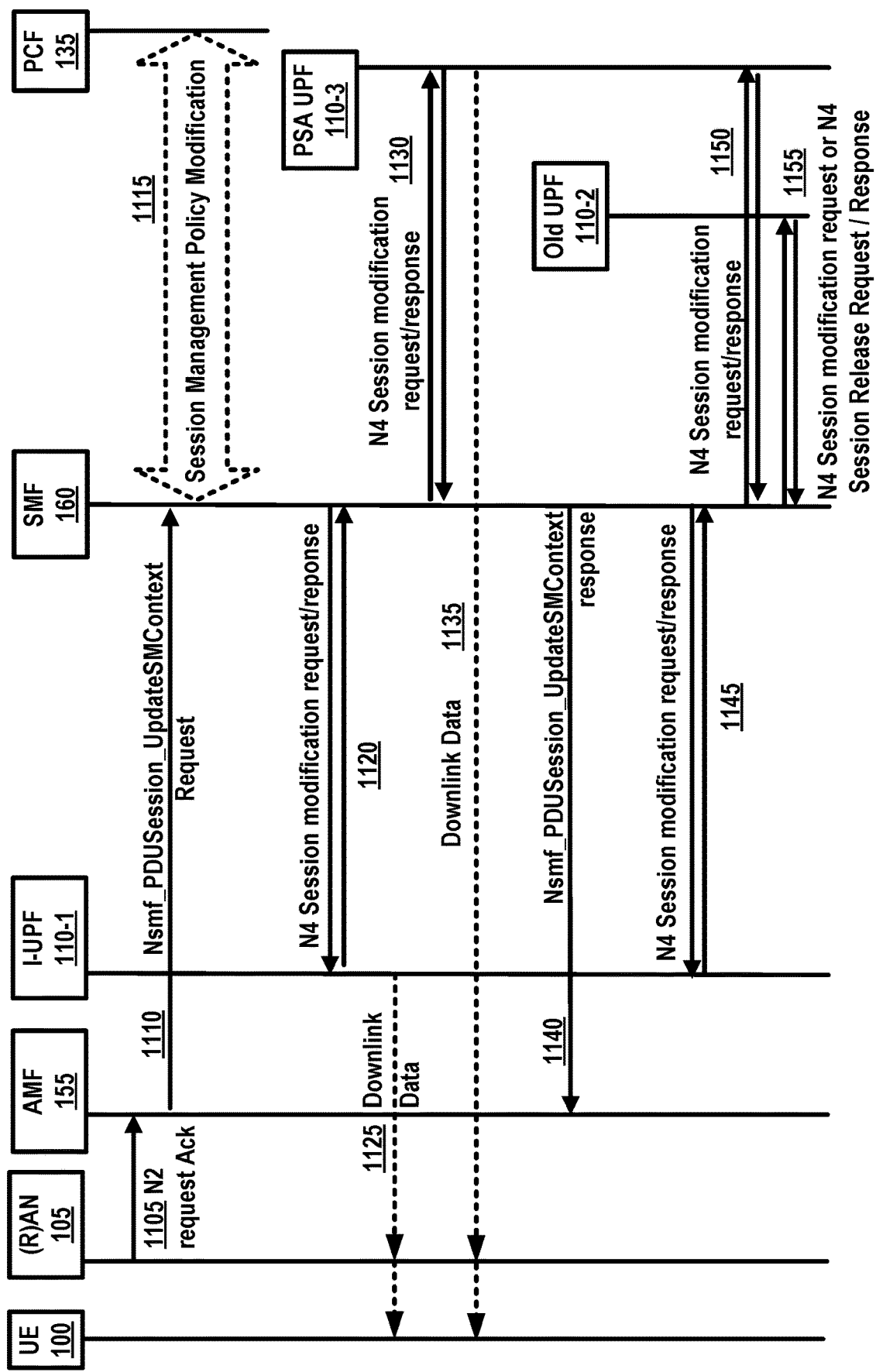
FIG. 11 is an example call flow as per an aspect of an embodiment of the present disclosure.

As depicted in example FIG. 10 and FIG. 11, a service request procedure e.g., a UE 100 triggered service request procedure may be used by a UE 100 in CM-IDLE state to request the establishment of a secure connection to an AMF 155. FIG. 11 is continuation of FIG. 10 depicting the service request procedure. The service request procedure may be used to activate a user plane connection for an established PDU session. The service request procedure may be triggered by the UE 100 or the 5GC, and may be used when the UE 100 is in CM-IDLE and/or in CM-CONNECTED and may allow selectively to activate user plane connections for some of the established PDU sessions.

In an example, a UE 100 in CM IDLE state may initiate the service request procedure to send uplink signaling messages, user data, and/or the like, as a response to a network paging request, and/or the like. In an example, after receiving the service request message, the AMF 155 may perform authentication. In an example, after the establishment of signaling connection to the AMF 155, the UE 100 or network may send signaling messages, e.g. PDU session establishment from the UE 100 to a SMF 160, via the AMF 155.

In an example, for any service request, the AMF 155 may respond with a service accept message to synchronize PDU session status between the UE 100 and network. The AMF 155 may respond with a service reject message to the UE 100, if the service request may not be accepted by the network. The service reject message may include an indication or cause code requesting the UE 100 to perform a registration update procedure. In an example, for service request due to user data, network may take further actions if user plane connection activation may not be successful. In an example FIG. 10 and FIG. 11, more than one UPF, e.g., old UPF 110-2 and PDU session Anchor PSA UPF 110-3 may be involved.

In an example, the UE 100 may send to a (R)AN 105 an AN message comprising AN parameters, mobility management, MM NAS service request 1005 (e.g., list of PDU sessions to be activated, list of allowed PDU sessions, security parameters, PDU session status, and/or the like), and/or the like. In an example, the UE 100 may provide the list of PDU sessions to be activated when the UE 100 may re-activate the PDU session(s). The list of allowed PDU sessions may be provided by the UE 100 when the service request may be a response of a paging or a NAS notification, and may identify the PDU sessions that may be transferred or associated to the access on which the service request may be sent. In an example, for the case of NG-RAN, the AN parameters may include selected PLMN ID, and an establishment cause. The establishment cause may provide the reason for requesting the establishment of an RRC connection. The UE 100 may send NAS service request message towards the AMF 155 encapsulated in an RRC message to the RAN 105.

In an example, if the service request may be triggered for user data, the UE 100 may identify, using the list of PDU sessions to be activated, the PDU session(s) for which the UP connections are to be activated in the NAS service request message. If the service request may be triggered for signaling, the UE 100 may not identify any PDU session(s). If this procedure may be triggered for paging response, and/or the UE 100 may have at the same time user data to be transferred, the UE 100 may identify the PDU session(s) whose UP connections may be activated in MM NAS service request message, by the list of PDU sessions to be activated.

In an example, if the service request over 3GPP access may be triggered in response to a paging indicating non-3GPP access, the NAS service request message may identify in the list of allowed PDU sessions the list of PDU sessions associated with the non-3GPP access that may be re-activated over 3GPP. In an example, the PDU session status may indicate the PDU sessions available in the UE 100. In an example, the UE 100 may not trigger the service request procedure for a PDU session corresponding to a LADN when the UE 100 may be outside the area of availability of the LADN. The UE 100 may not identify such PDU session(s) in the list of PDU sessions to be activated, if the service request may be triggered for other reasons.

In an example, the (R)AN 105 may send to AMF 155 an N2 Message 1010 (e.g., a service request) comprising N2 parameters, MM NAS service request, and/or the like. The AMF 155 may reject the N2 message if it may not be able to handle the service request. In an example, if NG-RAN may be used, the N2 parameters may include the 5G-GUTI, selected PLMN ID, location information, RAT type, establishment cause, and/or the like. In an example, the 5G-GUTI may be obtained in RRC procedure and the (R)AN 105 may select the AMF 155 according to the 5G-GUTI. In an example, the location information and RAT type may relate to the cell in which the UE 100 may be camping. In an example, based on the PDU session status, the AMF 155 may initiate PDU session release procedure in the network for the PDU sessions whose PDU session ID(s) may be indicated by the UE 100 as not available.

In an example, if the service request was not sent integrity protected or integrity protection verification failed, the AMF 155 may initiate a NAS authentication/security procedure 1015.

In an example, if the UE 100 triggers the service request to establish a signaling connection, upon successful establishment of the signaling connection, the UE 100 and the network may exchange NAS signaling.

In an example the AMF 155 may send to the SMF 160 a PDU session update context request 1020 e.g., Nsmf_P-DUSession_UpdateSMContext request comprising PDU session ID(s), Cause(s), UE 100 location information, access type, and/or the like.

In an example, the Nsmf_PDUSession_UpdateSMContext request may be invoked by the AMF 155 if the UE 100 may identify PDU session(s) to be activated in the NAS service request message. In an example, the Nsmf_PDUSession_UpdateSMContext request may be triggered by the SMF 160 wherein the PDU session(s) identified by the UE 100 may correlate to other PDU session ID(s) than the one triggering the procedure. In an example, the Nsmf_PDUSession_UpdateSMContext request may be triggered by the SMF 160 wherein the current UE 100 location may be outside the area of validity for the N2 information provided by the SMF 160 during a network triggered service request procedure. The AMF 155 may not send the N2 information provided by the SMF 160 during the network triggered service request procedure.

In an example, the AMF 155 may determine the PDU session(s) to be activated and may send a Nsmf_PDUSession_UpdateSMContext request to SMF 160($s$) associated with the PDU session(s) with cause set to indicate establishment of user plane resources for the PDU session(s).

In an example, if the procedure may be triggered in response to paging indicating non-3GPP access, and the list of allowed PDU sessions provided by the UE 100 may not include the PDU session for which the UE 100 was paged, the AMF 155 may notify the SMF 160 that the user plane for the PDU session may not be re-activated. The service request procedure may succeed without re-activating the user plane of any PDU sessions, and the AMF 155 may notify the UE 100.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) keep the PDU session, may reject the activation of user plane connection for the PDU session and may inform the AMF 155. In an example, if the procedure may be triggered by a network triggered service request, the SMF 160 may notify the UPF 110 that originated the data notification to discard downlink data for the PDU sessions and/or to not provide further data notification messages. The SMF 160 may respond to the AMF 155 with an appropriate reject cause and the user plane activation of PDU session may be stopped.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) release the PDU session. The SMF 160 may locally release the PDU session and may inform the AMF 155 that the PDU session may be released. The SMF 160 may respond to the AMF 155 with an appropriate reject cause and the user plane Activation of PDU session may be stopped.

In an example, if the UP activation of the PDU session may be accepted by the SMF 160, based on the location info received from the AMF 155, the SMF 160 may check the UPF 110 Selection 1025 Criteria (e.g., slice isolation requirements, slice coexistence requirements, UPF's 110 dynamic load, UPF's 110 relative static capacity among UPFs supporting the same DNN, UPF 110 location available at the SMF 160, UE 100 location information, Capability of the UPF 110 and the functionality required for the particular UE 100 session. In an example, an appropriate UPF 110 may be selected by matching the functionality and features required for a UE 100, DNN, PDU session type (e.g. IPv4, IPv6, ethernet type or unstructured type) and if applicable, the static IP address/prefix, SSC mode selected for the PDU session, UE 100 subscription profile in UDM 140, DNAI as included in the PCC rules, local operator policies, S-NSSAI, access technology being used by the UE 100, UPF 110 logical topology, and/or the like), and may determine to perform one or more of the following: continue using the current UPF(s); may select a new intermediate UPF 110 (or add/remove an intermediate UPF 110), if the UE 100 has moved out of the service area of the UPF 110 that was previously connecting to the (R)AN 105, while maintaining the UPF(s) acting as PDU session anchor; may trigger re-establishment of the PDU session to perform relocation/reallocation of the UPF 110 acting as PDU session anchor, e.g. the UE 100 has moved out of the service area of the anchor UPF 110 which is connecting to RAN 105.

In an example, the SMF 160 may send to the UPF 110 (e.g., new intermediate UPF 110) an N4 session establishment request 1030. In an example, if the SMF 160 may select a new UPF 110 to act as intermediate UPF 110-2 for the PDU session, or if the SMF 160 may select to insert an intermediate UPF 110 for a PDU session which may not have an intermediate UPF 110-2, an N4 session establishment request 1030 message may be sent to the new UPF 110, providing packet detection, data forwarding, enforcement and reporting rules to be installed on the new intermediate UPF. The PDU session anchor addressing information (on N9) for this PDU session may be provided to the intermediate UPF 110-2.

In an example, if a new UPF 110 is selected by the SMF 160 to replace the old (intermediate) UPF 110-2, the SMF 160 may include a data forwarding indication. The data forwarding indication may indicate to the UPF 110 that a second tunnel endpoint may be reserved for buffered DL data from the old I-UPF.

In an example, the new UPF 110 (intermediate) may send to SMF 160 an N4 session establishment response message 1030. In case the UPF 110 may allocate CN tunnel info, the UPF 110 may provide DL CN tunnel info for the UPF 110 acting as PDU session anchor and UL CN tunnel info (e.g., CN N3 tunnel info) to the SMF 160. If the data forwarding indication may be received, the new (intermediate) UPF 110 acting as N3 terminating point may send DL CN tunnel info for the old (intermediate) UPF 110-2 to the SMF 160. The SMF 160 may start a timer, to release the resource in the old intermediate UPF 110-2.

In an example, if the SMF 160 may selects a new intermediate UPF 110 for the PDU session or may remove the old I-UPF 110-2, the SMF 160 may send N4 session modification request message 1035 to PDU session anchor, PSA UPF 110-3, providing the data forwarding indication and DL tunnel information from new intermediate UPF 110.

In an example, if the new intermediate UPF 110 may be added for the PDU session, the (PSA) UPF 110-3 may begin to send the DL data to the new I-UPF 110 as indicated in the DL tunnel information.

In an example, if the service request may be triggered by the network, and the SMF 160 may remove the old I-UPF 110-2 and may not replace the old I-UPF 110-2 with the new I-UPF 110, the SMF 160 may include the data forwarding indication in the request. The data forwarding indication may indicate to the (PSA) UPF 110-3 that a second tunnel endpoint may be reserved for buffered DL data from the old I-UPF 110-2. In this case, the PSA UPF 110-3 may begin to buffer the DL data it may receive at the same time from the N6 interface.

In an example, the PSA UPF 110-3 (PSA) may send to the SMF 160 an N4 session modification response 1035. In an example, if the data forwarding indication may be received, the PSA UPF 110-3 may become as N3 terminating point and may send CN DL tunnel info for the old (intermediate) UPF 110-2 to the SMF 160. The SMF 160 may start a timer, to release the resource in old intermediate UPF 110-2 if there is one.

In an example, the SMF 160 may send to the old UPF 110-2 an N4 session modification request 1045 (e.g., may comprise new UPF 110 address, new UPF 110 DL tunnel ID, and/or the like). In an example, if the service request may be triggered by the network, and/or the SMF 160 may remove the old (intermediate) UPF 110-2, the SMF 160 may send the N4 session modification request message to the old (intermediate) UPF 110-2, and may provide the DL tunnel information for the buffered DL data. If the SMF 160 may allocate new I-UPF 110, the DL tunnel information is from the new (intermediate) UPF 110 may act as N3 terminating point. If the SMF 160 may not allocate a new I-UPF 110, the DL tunnel information may be from the new UPF 110 (PSA) 110-3 acting as N3 terminating point. The SMF 160 may start a timer to monitor the forwarding tunnel. In an example, the old (intermediate) UPF 110-2 may send N4 session modification response message to the SMF 160.

In an example, if the I-UPF 110-2 may be relocated and forwarding tunnel was established to the new I-UPF 110, the old (intermediate) UPF 110-2 may forward its buffered data to the new (intermediate) UPF 110 acting as N3 terminating point. In an example, if the old I-UPF 110-2 may be removed and the new I-UPF 110 may not be assigned for the PDU session and forwarding tunnel may be established to the UPF 110 (PSA) 110-3, the old (intermediate) UPF 110-2 may forward its buffered data to the UPF 110 (PSA) 110-3 acting as N3 terminating point.

In an example, the SMF 160 may send to the AMF 155 an N11 message 1060 e.g., a Nsmf_PDUSession_UpdateSMContext response (comprising: N1 SM container (PDU session ID, PDU session re-establishment indication), N2 SM information (PDU session ID, QoS profile, CN N3 tunnel info, S-NSSAI), Cause), upon reception of the Nsmf_PDUSession_UpdateSMContext request with a cause including e.g., establishment of user plane resources. The SMF 160 may determine whether UPF 110 reallocation may be performed, based on the UE 100 location information, UPF 110 service area and operator policies. In an example, for a PDU session that the SMF 160 may determine to be served by the current UPF 110, e.g., PDU session anchor or intermediate UPF, the SMF 160 may generate N2 SM information and may send a Nsmf_PDUSession_UpdateSMContext response 1060 to the AMF 155 to establish the user plane(s). The N2 SM information may contain information that the AMF 155 may provide to the RAN 105. In an example, for a PDU session that the SMF 160 may determine as requiring a UPF 110 relocation for PDU session anchor UPF, the SMF 160 may reject the activation of UP of the PDU session by sending Nsmf_PDUSession_UpdateSMContext response that may contain N1 SM container to the UE 100 via the AMF 155. The N1 SM container may include the corresponding PDU session ID and PDU session re-establishment indication.

Upon reception of the Namf_EventExposure_Notify from the AMF 155 to the SMF 160, with an indication that the UE 100 is reachable, if the SMF 160 may have pending DL data, the SMF 160 may invoke the Namf_Communication_N1N2MessageTransfer service operation to the AMF 155 to establish the user plane(s) for the PDU sessions. In an example, the SMF 160 may resume sending DL data notifications to the AMF 155 in case of DL data.

In an example, the SMF 160 may send a message to the AMF 155 to reject the activation of UP of the PDU session by including a cause in the Nsmf_PDUSession_UpdateSM-Context response if the PDU session may correspond to a LADN and the UE 100 may be outside the area of availability of the LADN, or if the AMF 155 may notify the SMF 160 that the UE 100 may be reachable for regulatory prioritized service, and the PDU session to be activated may not for a regulatory prioritized service; or if the SMF 160 may decide to perform PSA UPF 110-3 relocation for the requested PDU session.

In an example, the AMF 155 may send to the (R)AN 105 an N2 request message 1065 (e.g., N2 SM information received from SMF 160, security context, AMF 155 signaling connection ID, handover restriction list, MM NAS service accept, list of recommended cells/TAs/NG-RAN node identifiers). In an example, the RAN 105 may store the security context, AMF 155 signaling connection Id, QoS information for the QoS flows of the PDU sessions that may be activated and N3 tunnel IDs in the UE 100 RAN 105 context. In an example, the MM NAS service accept may include PDU session status in the AMF 155. If the activation of UP of a PDU session may be rejected by the SMF 160, the MM NAS service accept may include the PDU session ID and the reason why the user plane resources may not be activated (e.g. LADN not available). Local PDU session release during the session request procedure may be indicated to the UE 100 via the session Status.

In an example, if there are multiple PDU sessions that may involve multiple SMF 160s, the AMF 155 may not wait for responses from all SMF 160s before it may send N2 SM information to the UE 100. The AMF 155 may wait for all responses from the SMF 160s before it may send MM NAS service accept message to the UE 100.

In an example, the AMF 155 may include at least one N2 SM information from the SMF 160 if the procedure may be triggered for PDU session user plane activation. AMF 155 may send additional N2 SM information from SMF 160s in separate N2 message(s) (e.g. N2 tunnel setup request), if there is any. Alternatively, if multiple SMF 160s may be involved, the AMF 155 may send one N2 request message to (R)AN 105 after all the Nsmf_PDUSession_UpdateSM-Context response service operations from all the SMF 160s associated with the UE 100 may be received. In such case, the N2 request message may include the N2 SM information received in each of the Nsmf_PDUSession_UpdateSMContext response and PDU session ID to enable AMF 155 to associate responses to relevant SMF 160.

In an example, if the RAN 105 (e.g., NG RAN) node may provide the list of recommended cells/TAs/NG-RAN node identifiers during the AN release procedure, the AMF 155 may include the information from the list in the N2 request. The RAN 105 may use this information to allocate the RAN 105 notification area when the RAN 105 may decide to enable RRC inactive state for the UE 100.

If the AMF 155 may receive an indication, from the SMF 160 during a PDU session establishment procedure that the UE 100 may be using a PDU session related to latency sensitive services, for any of the PDU sessions established for the UE 100 and the AMF 155 has received an indication from the UE 100 that may support the CM-CONNECTED with RRC inactive state, then the AMF 155 may include the UE's RRC inactive assistance information. In an example, the AMF 155 based on network configuration, may include the UE's RRC inactive assistance information.

In an example, the (R)AN 105 may send to the UE 100 a message to perform RRC connection reconfiguration 1070 with the UE 100 depending on the QoS information for all the QoS flows of the PDU sessions whose UP connections may be activated and data radio bearers. In an example, the user plane security may be established.

In an example, if the N2 request may include a MM NAS service accept message, the RAN 105 may forward the MM NAS service accept to the UE 100. The UE 100 may locally delete context of PDU sessions that may not be available in 5GC.

In an example, if the N1 SM information may be transmitted to the UE 100 and may indicate that some PDU session(s) may be re-established, the UE 100 may initiate PDU session re-establishment for the PDU session(s) that may be re-established after the service request procedure may be complete.

In an example, after the user plane radio resources may be setup, the uplink data from the UE 100 may be forwarded to the RAN 105. The RAN 105 (e.g., NG-RAN) may send the uplink data to the UPF 110 address and tunnel ID provided.

In an example, the (R)AN 105 may send to the AMF 155 an N2 request Ack 1105 (e.g., N2 SM information (comprising: AN tunnel info, list of accepted QoS flows for the PDU sessions whose UP connections are activated, list of rejected QoS flows for the PDU sessions whose UP connections are activated)). In an example, the N2 request message may include N2 SM information(s), e.g. AN tunnel info. RAN 105 may respond N2 SM information with separate N2 message (e.g. N2 tunnel setup response). In an example, if multiple N2 SM information are included in the N2 request message, the N2 request Ack may include multiple N2 SM information and information to enable the AMF 155 to associate the responses to relevant SMF 160.

In an example, the AMF 155 may send to the SMF 160 a Nsmf_PDUSession_UpdateSMContext request 1110 (N2 SM information (AN tunnel info), RAT type) per PDU session. If the AMF 155 may receive N2 SM information (one or multiple) from the RAN 105, then the AMF 155 may forward the N2 SM information to the relevant SMF 160. If the UE 100 time zone may change compared to the last reported UE 100 Time Zone, then the AMF 155 may include the UE 100 time zone IE in the Nsmf_PDUSession_UpdateSMContext request message.

In an example, if dynamic PCC is deployed, the SMF 160 may initiate notification about new location information to the PCF 135 (if subscribed) by invoking an event exposure notification operation (e.g., a Nsmf_EventExposure_Notify service operation). The PCF 135 may provide updated policies by invoking a policy control update notification message 1115 (e.g., a Npcf_SMPolicyControl_UpdateNotify operation).

In an example, if the SMF 160 may select a new UPF 110 to act as intermediate UPF 110 for the PDU session, the SMF 160 may initiates an N4 session modification procedure 1120 to the new I-UPF 110 and may provide AN tunnel info. The downlink data from the new I-UPF 110 may be forwarded to RAN 105 and UE 100. In an example, the UPF 110 may send to the SMF 160, an N4 session modification response 1120. In an example, the SMF 160 may send to the AMF 155, a Nsmf_PDUSession_UpdateSMContext response 1140.

In an example, if forwarding tunnel may be established to the new I-UPF 110 and if the timer SMF 160 set for forwarding tunnel may be expired, the SMF 160 may sends N4 session modification request 1145 to new (intermediate) UPF 110 acting as N3 terminating point to release the forwarding tunnel. In an example, the new (intermediate) UPF 110 may send to the SMF 160 an N4 session modification response 1145. In an example, the SMF 160 may send to the PSA UPF 110-3 an N4 session modification request 1150, or N4 session release request. In an example, if the SMF 160 may continue using the old UPF 110-2, the SMF 160 may send an N4 session modification request 1155, providing AN tunnel info. In an example, if the SMF 160 may select a new UPF 110 to act as intermediate UPF 110, and the old UPF 110-2 may not be PSA UPF 110-3, the SMF 160 may initiate resource release, after timer expires, by sending an N4 session release request (release cause) to the old intermediate UPF 110-2.

In an example, the old intermediate UPF 110-2 may send to the SMF 160 an N4 session modification response or N4 session release response 1155. The old UPF 110-2 may acknowledge with the N4 session modification response or N4 session release response message to confirm the modification or release of resources. The AMF 155 may invoke the Namf_EventExposure_Notify service operation to notify the mobility related events, after this procedure may complete, towards the NFs that may have subscribed for the events. In an example, the AMF 155 may invoke the Namf_EventExposure_Notify towards the SMF 160 if the SMF 160 had subscribed for UE 100 moving into or out of area of interest and if the UE's current location may indicate that it may be moving into or moving outside of the area of interest subscribed, or if the SMF 160 had subscribed for LADN DNN and if the UE 100 may be moving into or outside of an area where the LADN is available, or if the UE 100 may be in MICO mode and the AMF 155 had notified an SMF 160 of the UE 100 being unreachable and that SMF 160 may not send DL data notifications to the AMF 155, and the AMF 155 may informs the SMF 160 that the UE 100 is reachable, or if the SMF 160 had subscribed for UE 100 reachability status, then the AMF 155 may notify the UE 100 reachability.

Figure 12:
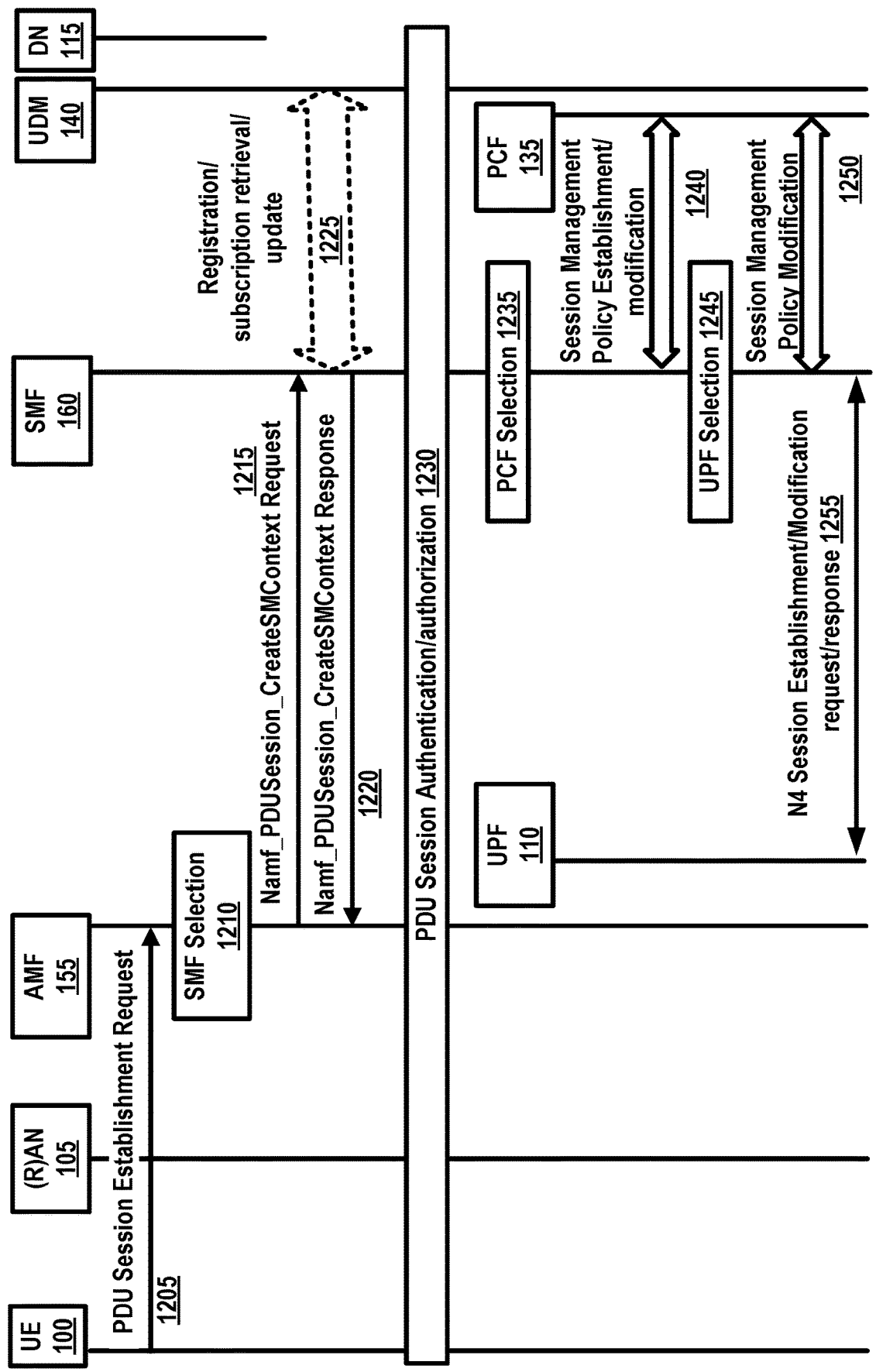
FIG. 12 is an example call flow as per an aspect of an embodiment of the present disclosure.
Figure 13:
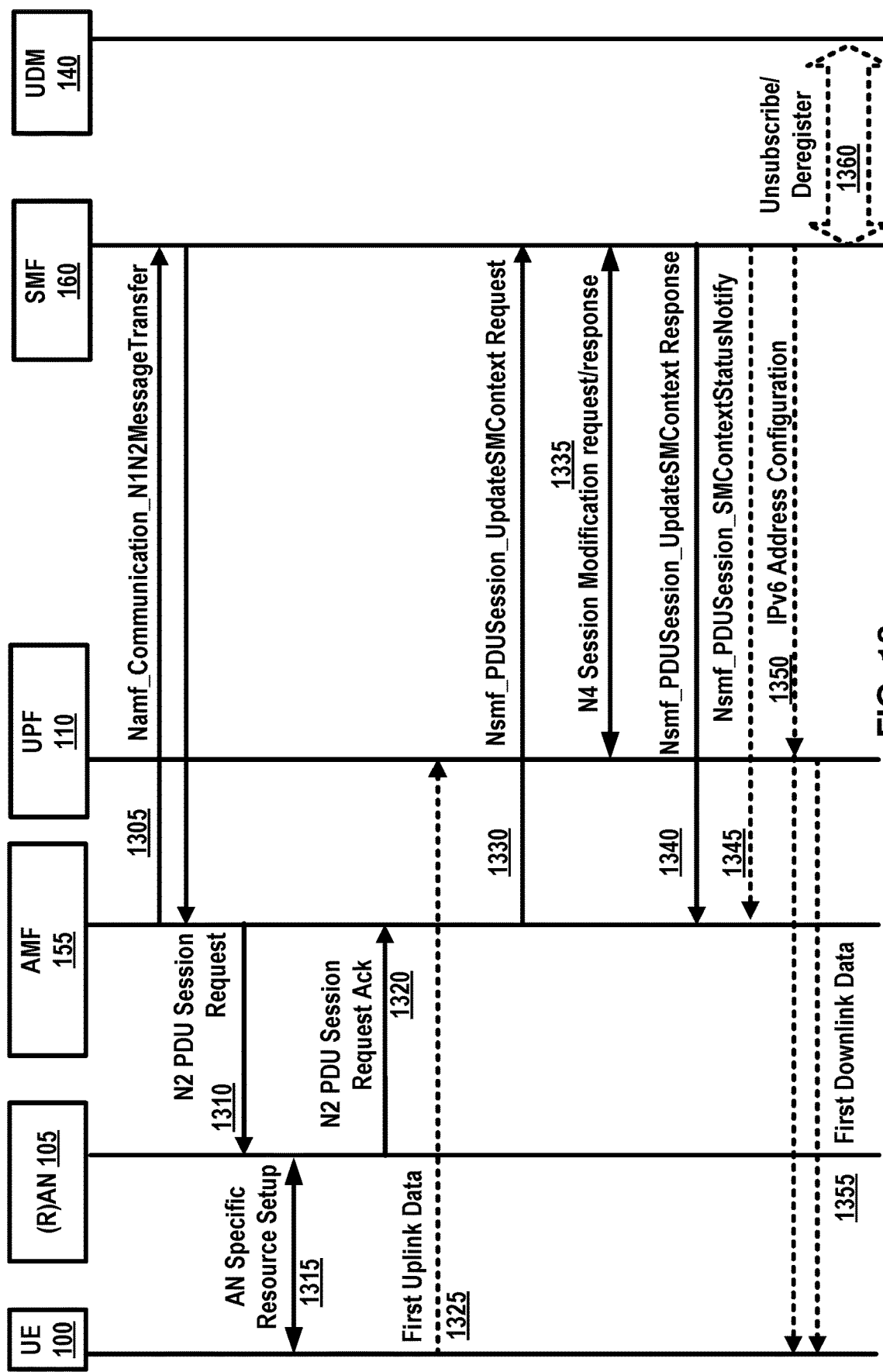
FIG. 13 is an example call flow as per an aspect of an embodiment of the present disclosure.

An example PDU session establishment procedure depicted in FIG. 12 and FIG. 13. In an example embodiment, when the PDU session establishment procedure may be employed, the UE 100 may send to the AMF 155 a NAS Message 1205 (or a SM NAS message) comprising NSSAI, S-NSSAI (e.g., requested S-NSSAI, allowed S-NSSAI, subscribed S-NSSAI, and/or the like), DNN, PDU session ID, request type, old PDU session ID, N1 SM container (PDU session establishment request), and/or the like. In an example, the UE 100, in order to establish a new PDU session, may generate a new PDU session ID. In an example, when emergency service may be required and an emergency PDU session may not already be established, the UE 100 may initiate the UE 100 requested PDU session establishment procedure with a request type indicating emergency request. In an example, the UE 100 may initiate the UE 100 requested PDU session establishment procedure by the transmission of the NAS message containing a PDU session establishment request within the N1 SM container. The PDU session establishment request may include a PDU type, SSC mode, protocol configuration options, and/or the like. In an example, the request type may indicate initial request if the PDU session establishment is a request to establish the new PDU session and may indicate existing PDU session if the request refers to an existing PDU session between 3GPP access and non-3GPP access or to an existing PDN connection in EPC. In an example, the request type may indicate emergency request if the PDU session establishment may be a request to establish a PDU session for emergency services. The request type may indicate existing emergency PDU session if the request refers to an existing PDU session for emergency services between 3GPP access and non-3GPP access. In an example, the NAS message sent by the UE 100 may be encapsulated by the AN in a N2 message towards the AMF 155 that may include user location information and access technology type information. In an example, the PDU session establishment request message may contain SM PDU DN request container containing information for the PDU session authorization by the external DN. In an example, if the procedure may be triggered for SSC mode 3 operation, the UE 100 may include the old PDU session ID which may indicate the PDU session ID of the on-going PDU session to be released, in the NAS message. The old PDU session ID may be an optional parameter which may be included in this case. In an example, the AMF 155 may receive from the AN the NAS message (e.g., NAS SM message) together with user location information (e.g. cell ID in case of the RAN 105). In an example, the UE 100 may not trigger a PDU session establishment for a PDU session corresponding to a LADN when the UE 100 is outside the area of availability of the LADN.

In an example, the AMF 155 may determine that the NAS message or the SM NAS message may correspond to the request for the new PDU session based on that request type indicates initial request and that the PDU session ID may not be used for any existing PDU session(s) of the UE 100. If the NAS message does not contain an S-NSSAI, the AMF 155 may determine a default S-NSSAI for the requested PDU session either according to the UE 100 subscription, if it may contain only one default S-NSSAI, or based on operator policy. In an example, the AMF 155 may perform SMF 160 selection 1210 and select an SMF 160. If the request type may indicate initial request or the request may be due to handover from EPS, the AMF 155 may store an association of the S-NSSAI, the PDU session ID and a SMF 160 ID. In an example, if the request type is initial request and if the old PDU session ID indicating the existing PDU session may be contained in the message, the AMF 155 may select the SMF 160 and may store an association of the new PDU session ID and the selected SMF 160 ID.

In an example, the AMF 155 may send to the SMF 160, an N11 message 1215, e.g., Nsmf_PDUSession_CreateSM-Context request (comprising: SUPI or PEI, DNN, S-NSSAI, PDU session ID, AMF 155 ID, request type, N1 SM container (PDU session establishment request), user location information, access type, PEI, GPSI), or Nsmf_PDUSession_UpdateSMContext request (SUPI, DNN, S-NSSAI, PDU session ID, AMF 155 ID, request type, N1 SM container (PDU session establishment request), user location information, access type, RAT type, PEI). In an example, if the AMF 155 may not have an association with the SMF 160 for the PDU session ID provided by the UE 100 (e.g. when request type indicates initial request), the AMF 155 may invoke the Nsmf_PDUSession_CreateSMContext request, but if the AMF 155 already has an association with an SMF 160 for the PDU session ID provided by the UE 100 (e.g. when request type indicates existing PDU session), the AMF 155 may invoke the Nsmf_PDUSession_UpdateSMContext request. In an example, the AMF 155 ID may be the UE's GUAMI which uniquely identifies the AMF 155 serving the UE 100. The AMF 155 may forward the PDU session ID together with the N1 SM container containing the PDU session establishment request received from the UE 100. The AMF 155 may provide the PEI instead of the SUPI when the UE 100 has registered for emergency services without providing the SUPI. In case the UE 100 has registered for emergency services but has not been authenticated, the AMF 155 may indicate that the SUPI has not been authenticated.

In an example, if the request type may indicate neither emergency request nor existing emergency PDU session and, if the SMF 160 has not yet registered and subscription data may not be available, the SMF 160 may register with the UDM 140, and may retrieve subscription data 1225 and subscribes to be notified when subscription data may be modified. In an example, if the request type may indicate existing PDU session or existing emergency PDU session, the SMF 160 may determine that the request may be due to handover between 3GPP access and non-3GPP access or due to handover from EPS. The SMF 160 may identify the existing PDU session based on the PDU session ID. The SMF 160 may not create a new SM context but instead may update the existing SM context and may provide the representation of the updated SM context to the AMF 155 in the response. if the request type may be initial request and if the old PDU session ID may be included in Nsmf_PDUSession_CreateSMContext request, the SMF 160 may identify the existing PDU session to be released based on the old PDU session ID.

In an example, the SMF 160 may send to the AMF 155, the N11 message response 1220, e.g., either a PDU session create/update response, Nsmf_PDUSession_CreateSMContext response 1220 (cause, SM context ID or N1 SM container (PDU session reject(cause))) or a Nsmf_PDUSession_UpdateSMContext response.

In an example, if the SMF 160 may perform secondary authorization/authentication 1230 during the establishment of the PDU session by a DN-AAA server, the SMF 160 may select a UPF 110 and may trigger a PDU session establishment authentication/authorization.

In an example, if the request type may indicate initial request, the SMF 160 may select an SSC mode for the PDU session. The SMF 160 may select one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For Unstructured PDU type the SMF 160 may allocate an IPv6 prefix for the PDU session and N6 point-to-point tunneling (based on UDP/IPv6).

In an example, if dynamic PCC is deployed, the may SMF 160 performs PCF 135 selection 1235. If the request type indicates existing PDU session or existing emergency PDU session, the SMF 160 may use the PCF 135 already selected for the PDU session. If dynamic PCC is not deployed, the SMF 160 may apply local policy.

In an example, the SMF 160 may perform a session management policy establishment procedure 1240 to establish a PDU session with the PCF 135 and may get the default PCC Rules for the PDU session. The GPSI may be included if available at the SMF 160. If the request type in 1215 indicates existing PDU session, the SMF 160 may notify an event previously subscribed by the PCF 135 by a session management policy modification procedure and the PCF 135 may update policy information in the SMF 160. The PCF 135 may provide authorized session-AMBR and the authorized 5QI and ARP to SMF 160. The PCF 135 may subscribe to the IP allocation/release event in the SMF 160 (and may subscribe other events).

In an example, the PCF 135, based on the emergency DNN, may set the ARP of the PCC rules to a value that may be reserved for emergency services.

In an example, if the request type in 1215 indicates initial request, the SMF 160 may select an SSC mode for the PDU session. The SMF 160 may select 1245 one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For unstructured PDU type the SMF 160 may allocate an IPv6 prefix for the PDU session and N6 point-to-point tunneling (e.g., based on UDP/IPv6). In an example, for Ethernet PDU type PDU session, neither a MAC nor an IP address may be allocated by the SMF 160 to the UE 100 for this PDU session.

In an example, if the request type in 1215 is existing PDU session, the SMF 160 may maintain the same IP address/prefix that may be allocated to the UE 100 in the source network.

In an example, if the request type in 1215 indicates existing PDU session referring to an existing PDU session moved between 3GPP access and non-3GPP access, the SMF 160 may maintain the SSC mode of the PDU session, e.g., the current PDU session Anchor and IP address. In an example, the SMF 160 may trigger e.g. new intermediate UPF 110 insertion or allocation of a new UPF 110. In an example, if the request type indicates emergency request, the SMF 160 may select 1245 the UPF 110 and may select SSC mode 1.

In an example, the SMF 160 may perform a session management policy modification 1250 procedure to report some event to the PCF 135 that has previously subscribed. If request type is initial request and dynamic PCC is deployed and PDU type is IPv4 or IPv6, the SMF 160 may notify the PCF 135 (that has previously subscribed) with the allocated UE 100 IP address/prefix.

In an example, the PCF 135 may provide updated policies to the SMF 160. The PCF 135 may provide authorized session-AMBR and the authorized 5QI and ARP to the SMF 160.

In an example, if request type indicates initial request, the SMF 160 may initiate an N4 session establishment procedure 1255 with the selected UPF 110. The SMF 160 may initiate an N4 session modification procedure with the selected UPF 110. In an example, the SMF 160 may send an N4 session establishment/modification request 1255 to the UPF 110 and may provide packet detection, enforcement, reporting rules, and/or the like to be installed on the UPF 110 for this PDU session. If CN tunnel info is allocated by the SMF 160, the CN tunnel info may be provided to the UPF 110. If the selective user plane deactivation is required for this PDU session, the SMF 160 may determine the Inactivity Timer and may provide it to the UPF 110. In an example, the UPF 110 may acknowledges by sending an N4 session establishment/modification response 1255. If CN tunnel info is allocated by the UPF, the CN tunnel info may be provided to SMF 160. In an example, if multiple UPFs are selected for the PDU session, the SMF 160 may initiate N4 session establishment/modification procedure 1255 with each UPF 110 of the PDU session.

In an example, the SMF 160 may send to the AMF 155 an Namf_Communication_N1N2MessageTransfer 1305 message (comprising PDU session ID, access type, N2 SM information (PDU session ID, QFI(s), QoS profile(s), CN tunnel info, S-NSSAI, session-AMBR, PDU session type, and/or the like), N1 SM container (PDU session establishment accept (QoS Rule(s), selected SSC mode, S-NSSAI, allocated IPv4 address, interface identifier, session-AMBR, selected PDU session type, and/or the like))). In case of multiple UPFs are used for the PDU session, the CN tunnel info may comprise tunnel information related with the UPF 110 that terminates N3. In an example, the N2 SM information may carry information that the AMF 155 may forward to the (R)AN 105 (e.g., the CN tunnel info corresponding to the core network address of the N3 tunnel corresponding to the PDU session, one or multiple QoS profiles and the corresponding QFIs may be provided to the (R)AN 105, the PDU session ID may be used by AN signaling with the UE 100 to indicate to the UE 100 the association between AN resources and a PDU session for the UE 100, and/or the like). In an example, a PDU session may be associated to an S-NSSAI and a DNN. In an example, the N1 SM container may contain the PDU session establishment accept that the AMF 155 may provide to the UE 100. In an example, multiple QoS rules and QoS profiles may be included in the PDU session establishment accept within the N1 SM and in the N2 SM information. In an example, the Namf_Communication_N1N2MessageTransfer 1305 may further comprise the PDU session ID and information allowing the AMF 155 to know which access towards the UE 100 to use.

In an example, the AMF 155 may send to the (R)AN 105 an N2 PDU session request 1310 (comprising N2 SM information, NAS message (PDU session ID, N1 SM container (PDU session establishment accept, and/or the like))). In an example, the AMF 155 may send the NAS message 1310 that may comprise PDU session ID and PDU session establishment accept targeted to the UE 100 and the N2 SM information received from the SMF 160 within the N2 PDU session request 1310 to the (R)AN 105.

In an example, the (R)AN 105 may issue AN specific signaling exchange 1315 with the UE 100 that may be related with the information received from SMF 160. In an example, in case of a 3GPP RAN 105, an RRC connection reconfiguration procedure may take place with the UE 100 to establish the necessary RAN 105 resources related to the QoS Rules for the PDU session request 1310. In an example, (R)AN 105 may allocate (R)AN 105 N3 tunnel information for the PDU session. In case of dual connectivity, the master RAN 105 node may assign some (zero or more) QFIs to be setup to a master RAN 105 node and others to the secondary RAN 105 node. The AN tunnel info may comprise a tunnel endpoint for each involved RAN 105 node, and the QFIs assigned to each tunnel endpoint. A QFI may be assigned to either the master RAN 105 node or the secondary RAN 105 node. In an example, (R)AN 105 may forward the NAS message 1310 (PDU session ID, N1 SM container (PDU session establishment accept)) to the UE 100. The (R)AN 105 may provide the NAS message to the UE 100 if the necessary RAN 105 resources are established and the allocation of (R)AN 105 tunnel information are successful.

In an example, the N2 PDU session response 1320 may comprise a PDU session ID, cause, N2 SM information (PDU session ID, AN tunnel info, list of accepted/rejected QFI(s)), and/or the like. In an example, the AN tunnel info may correspond to the access network address of the N3 tunnel corresponding to the PDU session.

In an example, the AMF 155 may forward the N2 SM information received from (R)AN 105 to the SMF 160 via a Nsmf_PDUSession_UpdateSMContext request 1330 (comprising: N2 SM information, request type, and/or the like). In an example, if the list of rejected QFI(s) is included in N2 SM information, the SMF 160 may release the rejected QFI(s) associated QoS profiles.

In an example, the SMF 160 may initiate an N4 session modification procedure 1335 with the UPF 110. The SMF 160 may provide AN tunnel info to the UPF 110 as well as the corresponding forwarding rules. In an example, the UPF 110 may provide an N4 session modification response 1335 to the SMF 160160.

In an example, the SMF 160 may send to the AMF 155 a Nsmf_PDUSession_UpdateSMContext response 1340 (Cause). In an example, the SMF 160 may subscribe to the UE 100 mobility event notification from the AMF 155 (e.g. location reporting, UE 100 moving into or out of area of interest), after this step by invoking Namf_Event Exposure_Subscribe service operation. For LADN, the SMF 160 may subscribe to the UE 100 moving into or out of LADN service area event notification by providing the LADN DNN as an indicator for the area of interest. The AMF 155 may forward relevant events subscribed by the SMF 160.

In an example, the SMF 160 may send to the AMF 155, a Nsmf_PDUSession_SMContextStatusNotify (release) 1345. In an example, if during the procedure, any time the PDU session establishment is not successful, the SMF 160 may inform the AMF 155 by invoking Nsmf_PDUSession_SMContextStatusNotify(release) 1345. The SMF 160 may releases any N4 session(s) created, any PDU session address if allocated (e.g. IP address) and may release the association with the PCF 135.

In an example, in case of PDU type IPv6, the SMF 160 may generate an IPv6 Router Advertisement 1350 and may send it to the UE 100 via N4 and the UPF 110.

In an example, if the PDU session may not be established, the SMF 160 may unsubscribe 1360 to the modifications of session management subscription data for the corresponding (SUPI, DNN, S-NSSAI), using Nudm_SDM_Unsubscribe (SUPI, DNN, S-NSSAI), if the SMF 160 is no more handling a PDU session of the UE 100 for this (DNN, S-NSSAI). In an example, if the PDU session may not be established, the SMF 160 may deregister 1360 for the given PDU session using Nudm_UECM_Deregistration (SUPI, DNN, PDU session ID).

Figure 14:
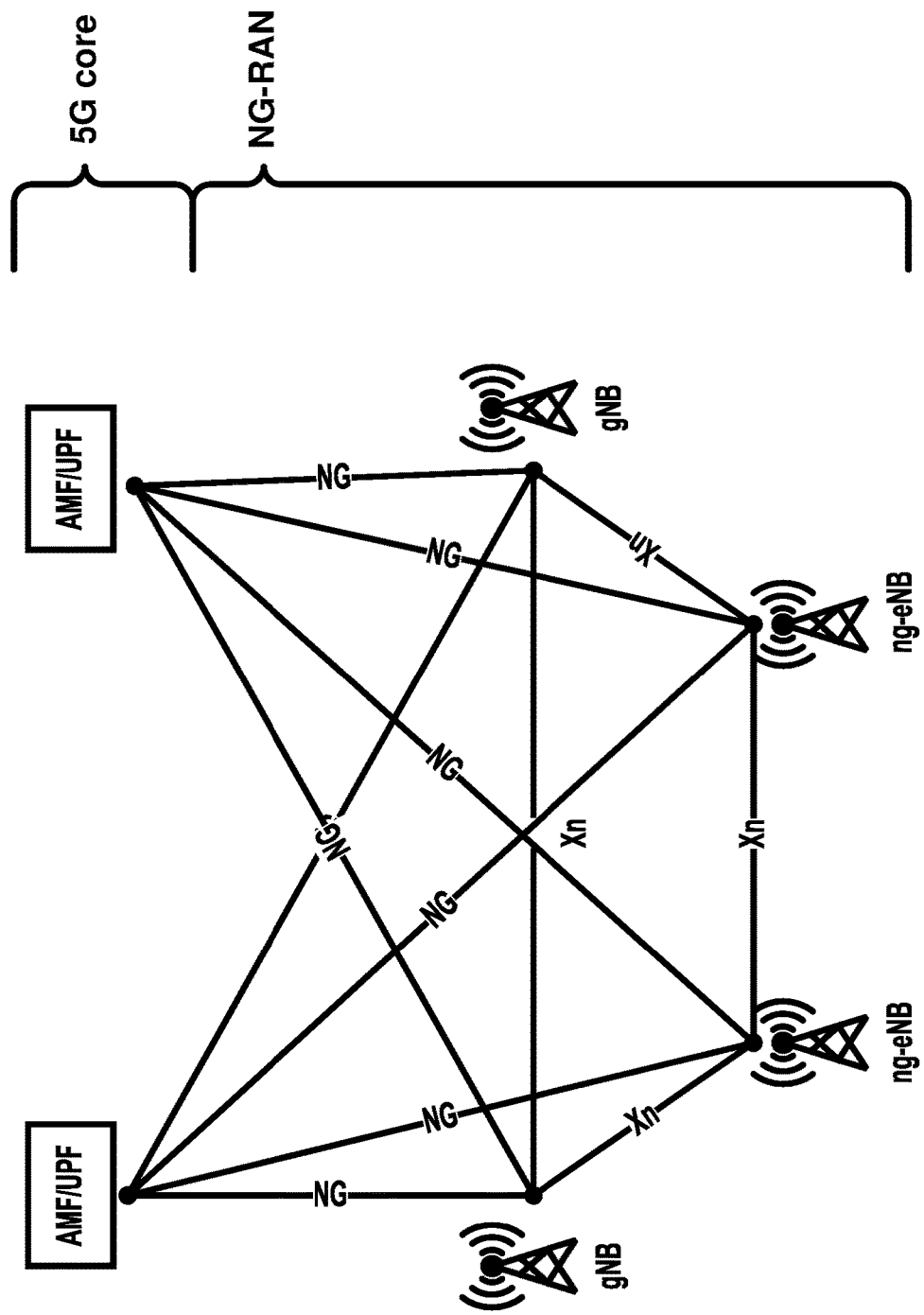
FIG. 14 is an example architecture of a 5G system as per an aspect of an embodiment of the present disclosure.

FIG. 14 depicts an example architecture of a 5G communication system as per an aspect of an embodiment of the present disclosure. The 5G system comprises a 5G Core Network (5GC) and a Next Generation Radio Access Network (NG-RAN). The NG-RAN may be a base station of 5G system and may comprise a gNB, an ng-eNB and/or the like. The gNB may provide new radio (NR) user plane and control plane protocol that terminates towards a wireless device (e.g. UE). The ng-eNB may provide Evolved Universal Terrestrial Radio Access (E-UTRA) user plane and control plane protocol terminations towards the wireless device. The gNBs and ng-eNBs may be interconnected with each other via one or more Xn interfaces. The gNBs and ng-eNBs may be also connected to the 5GC via one or more NG interfaces (e.g. to an AMF via an NG-C interface and/or to a UPF via an NG-U interface).

A satellite may be a space-borne vehicle embarking a bent pipe payload or a regenerative payload telecommunication transmitter. The satellite may be placed into a low-earth orbit (LEO) at an altitude between 300 km to 1500 km, a medium-earth orbit (MEO) at an altitude between 8000 to 20000 km, or a geostationary satellite earth orbit (GEO) at 35,786 km altitude. A satellite network may be a network or network segment that uses a space-borne vehicle to embark a transmission equipment relay node or a base station. While a terrestrial network is a network located on the surface of the earth, a non-terrestrial network (NTN) may be a network which uses a satellite as an access network, a backhaul interface network, or both.

Figure 15A:
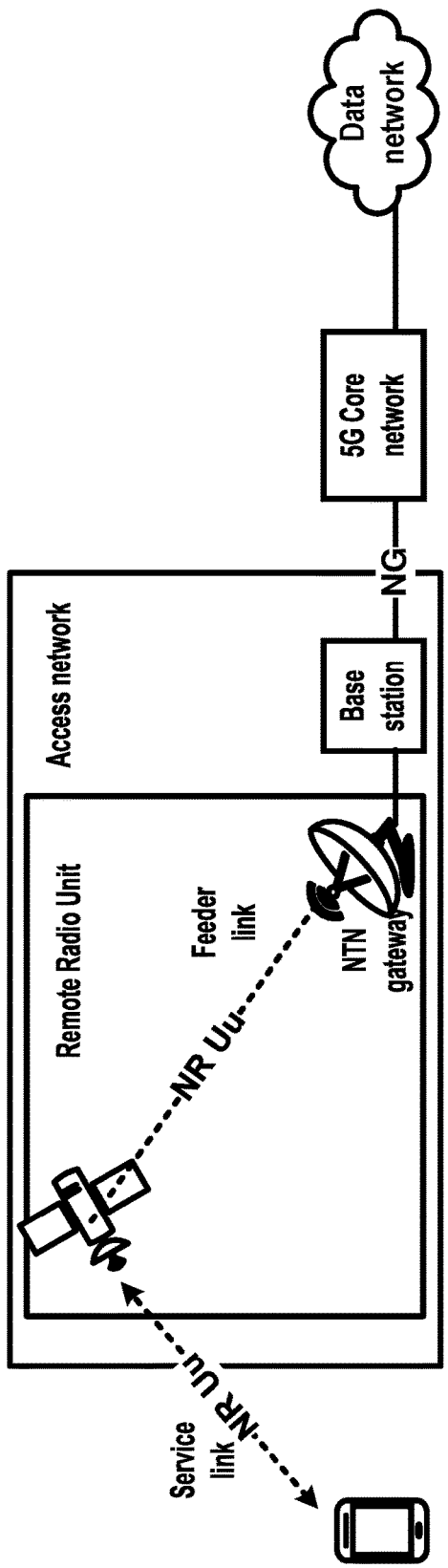
FIG. 15A is an example non-terrestrial network architecture as an aspect of an embodiment of the present disclosure.
Figure 15B:
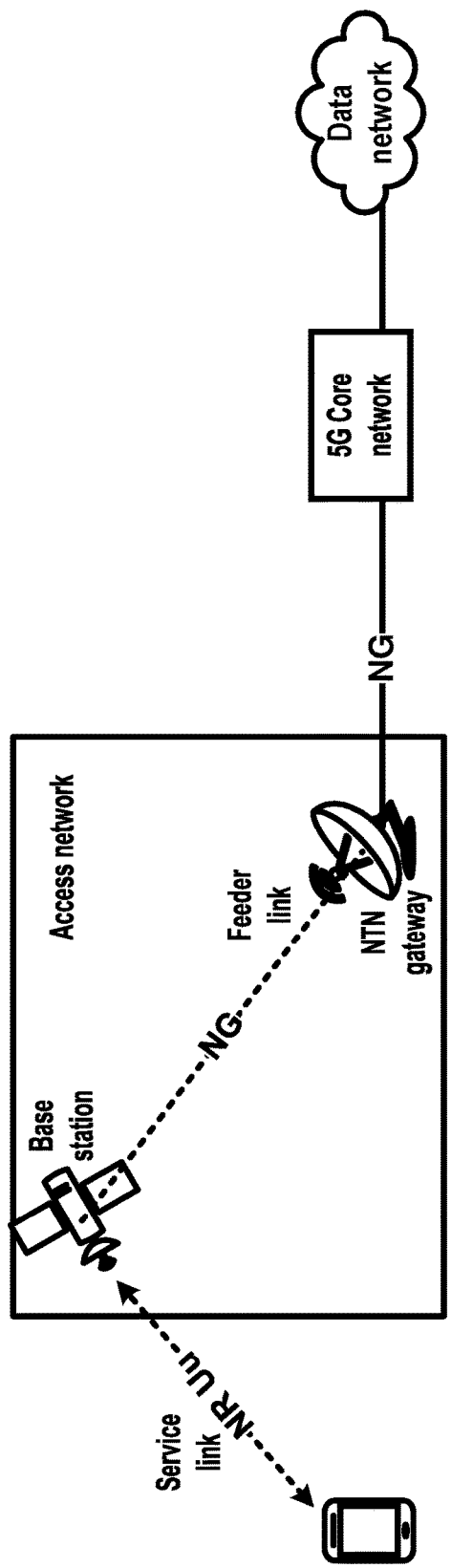
FIG. 15B is an example non-terrestrial network architecture as an aspect of an embodiment of the present disclosure.

FIGS. 15A and 15B are examples of NTN architectures in which a satellite is used as part of a network as per embodiments of the present disclosure.

FIG. 15A shows an example NTN architecture corresponding to a transparent satellite model. The NTN architecture of FIG. 15A comprises a wireless device, a satellite, an NTN gateway, a base station, a 5G core network, and a data network. In the NTN architecture of FIG. 15A, the satellite may behave as a remote radio unit (RRU) communicating with the NTN gateway. The NTN gateway may connect to a base station on the ground. The wireless device may transmit and receive via the satellite and the satellite may implement frequency conversion and radio frequency amplification in both the uplink and downlink directions. The satellite (an RRU in this example) may correspond to an analogue RF repeater that repeats the NR-Uu radio interface from a service link (between the satellite and the wireless device) to a feeder link (between the NTN gateway and the satellite), and vice-versa.

FIG. 15B shows an example NTN architecture regarding corresponding to a regenerative satellite model. The NTN architecture of FIG. 15B comprises a wireless device, a satellite, an NTN gateway, a 5G core network, and/or the like. The satellite may regenerate signals received from earth (e.g. from a wireless device or from an NTN gateway). In an example, the satellite may behave as a base station.

Figure 16:
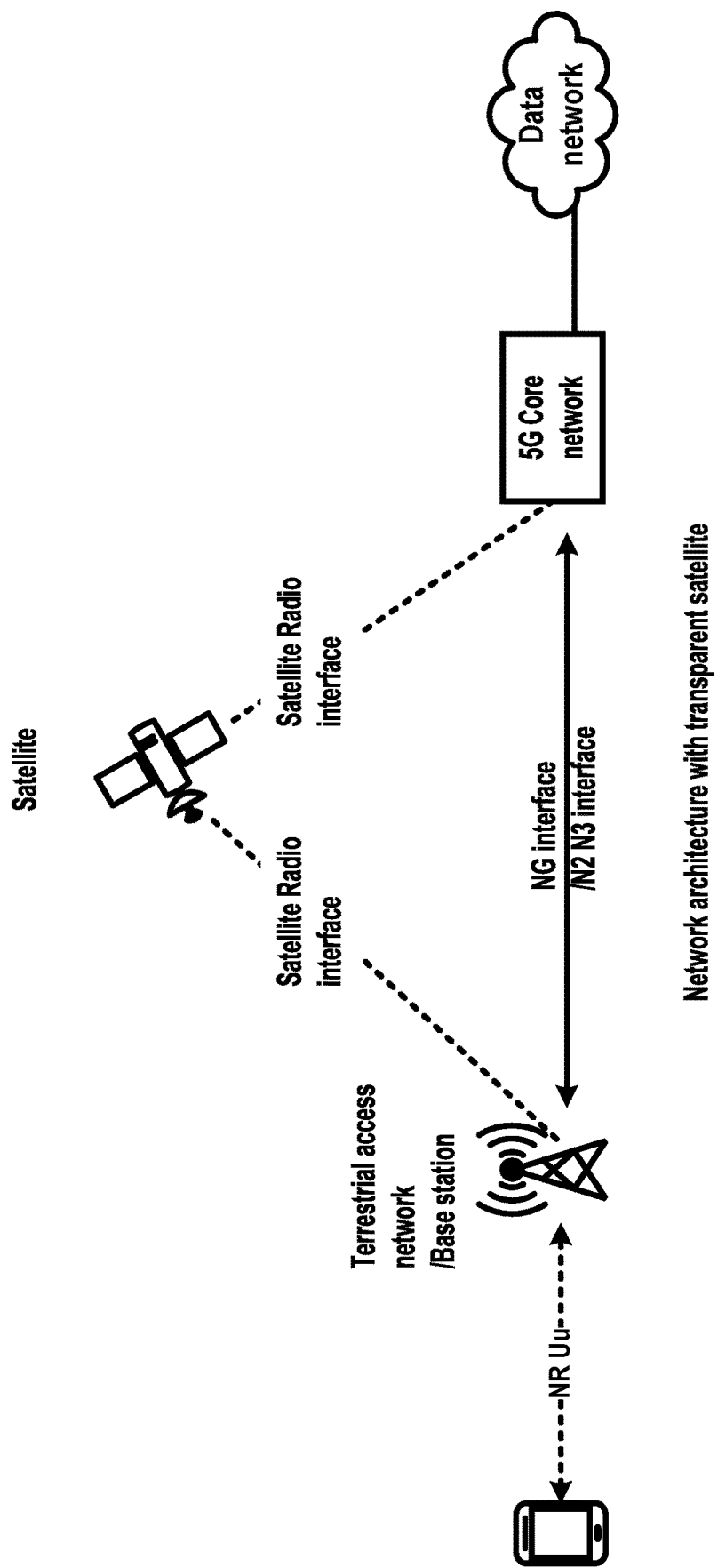
FIG. 16 shows different types of non-terrestrial networks as an aspect of an embodiment of the present disclosure.

FIG. 16 depicts an example wireless network architecture in which a satellite is used as part of a backhaul interface as per embodiments of the disclosure. The NTN architecture of FIG. 16 comprises a wireless device, an access network/base station, a satellite, a 5G core network, and a data network. In the example of FIG. 16, the access network/base station is a terrestrial access network which is located on a surface of the earth. However, it will be understood that the access network may also have an NTN architecture analogous to the NTN architectures shown in, for example, FIGS. 15A and/or 15B. As shown in the example of FIG. 16, the 5G core network may also be located on a surface of the earth. The wireless device may communicate with the access network/base station. The access network/base station may communicate with the 5G core network via a satellite radio interface (e.g., a satellite backhaul). The satellite radio interface may provide a transport for next generation (NG) reference points (e.g. N2/N3) between the terrestrial access network and the 5G core network. In an example, the satellite may transparently carry the communication payload of the NG reference points.

Figure 17:
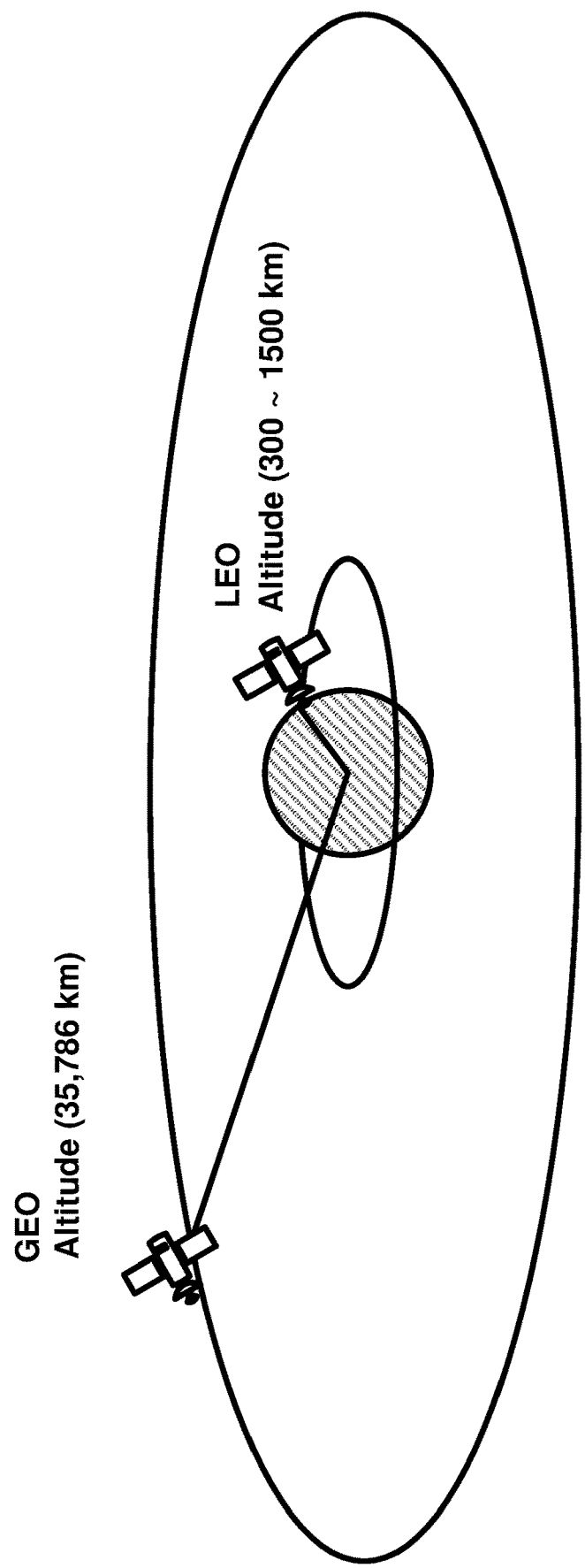
FIG. 17 depicts earth orbits of example satellites.

FIG. 17 depicts earth orbits of example satellites. In an example, a low earth orbit (LEO) orbits earth with an altitude ranging from 300 km to 1500 km above the surface of the earth. An orbital period of the LEO may be between about 84 minutes and 127 minutes. In an example, mean orbital velocity needed to maintain a stable LEO may be 7.8 km/s and may be reduced with increased orbital altitude. In an example, mean orbital velocity for circular orbit of 200 km may be 7.79 km/s. In an example, mean orbital velocity for circular orbit 1500 km may be 7.12 km/s. In another example, a geostationary satellite earth orbit (GEO) orbits earth with an altitude 35,786 km above the surface of the earth. The GEO may be established at an altitude very close to 35,786 km (22,236 mi) and directly above the equator. This equates to an orbital velocity of 3.07 km/s (1.91 mi/s) and an orbital period of 1,436 minutes, which equates to almost one sidereal day (23.934461223 hours). From the perspective of a given point on the surface of the earth, the position of the LEO satellite may change, while the position of the GEO may not move.

FIG. 18 shows different types of non-terrestrial networks comprising low earth orbiting (LEO) satellites, medium earth orbiting (MEO) satellites, geostationary earth orbiting (GEO), unmanned aircraft system (UAS) and highly elliptical orbiting (HEO) satellites. In an example, the typical beam footprint size of the GEO satellite is 200-1000 km. The footprint of a communications satellite may be the ground area that its transponders offer coverage and determines the satellite dish diameter required to receive each transponder's signal. The transponders may be a wireless device.

Propagation delay may be the amount of time it takes for the head of the signal to travel from a sender to a receiver or vice versa. For uplink, the sender may be a wireless device and the receiver may be a base station/access network. For downlink, the sender may be a base station/access network and the receiver may be a wireless device. The propagation delay may vary depending on a distance between the sender and the receiver.

FIG. 19 shows examples of propagation delay corresponding to NTNs of different altitudes. The propagation delay of this example figure is one-way latency. In an example, one-way latency is an amount of time required to propagate through a telecommunication system from a terminal to the receiver (e.g. base station, eNB, gNB, RRU of a base station). In an example, for the transparent satellite model of GEO case, the round-trip propagation delay including service link (e.g. between the satellite and the wireless device) and feeder link (e.g. between the NTN gateway and the satellite) may be four times of 138.9 milliseconds (approximately 556 milliseconds). If processing time and congestion are taken into account, the round-trip delay of the GEO satellite may be more than a few seconds. In an example, terrestrial network (e.g. NR, E-UTRA, LTE) round-trip propagation delay may negligible. In an example, terrestrial network round-trip propagation delay may be less than 1 millisecond. In an example, the GEO satellite round-trip delay may be hundreds of times longer than the one of terrestrial network.

Figure 20:
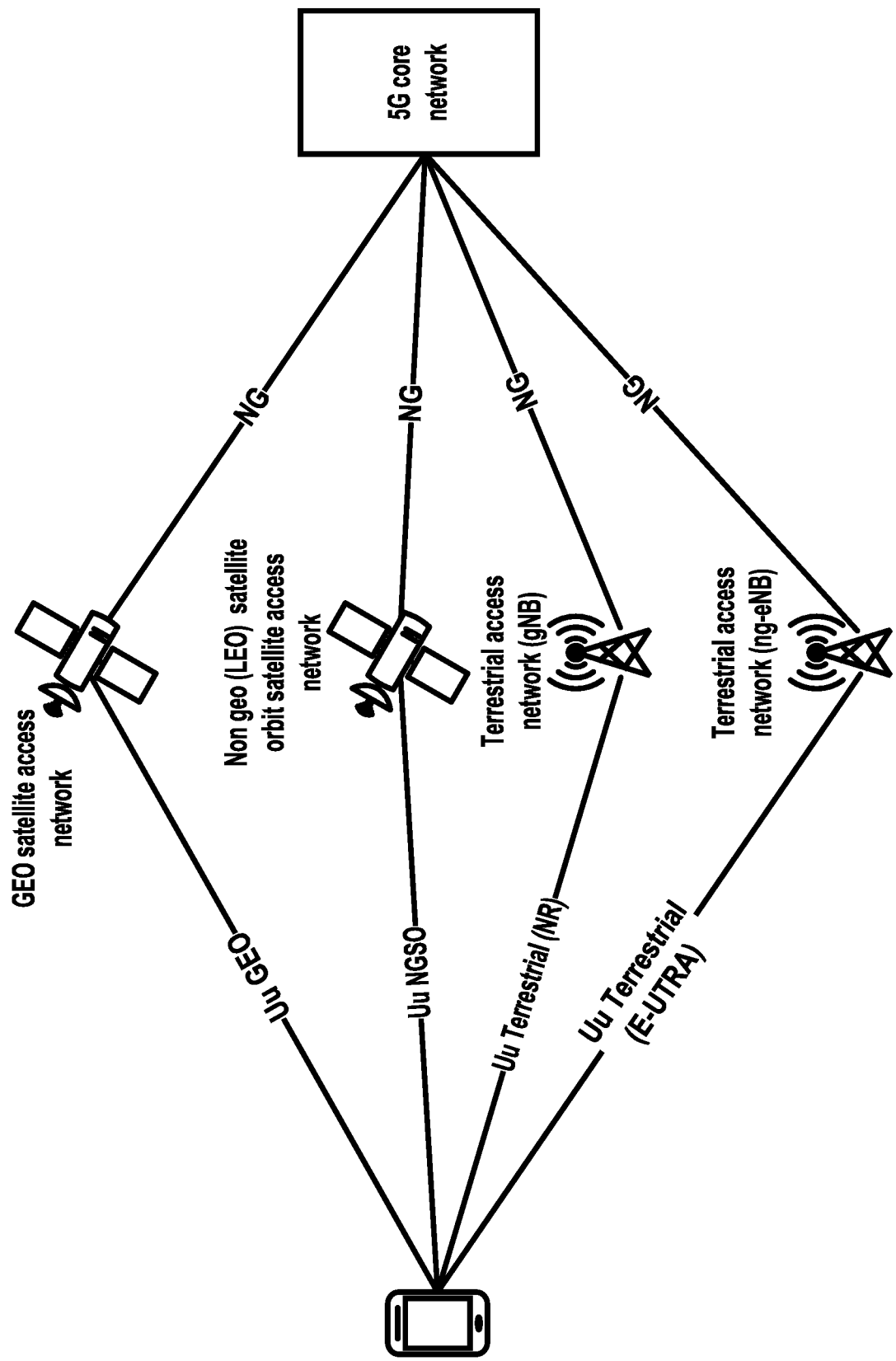
FIG. 20 is an example architecture of a 5G system having a 5G core network that provides service to different types of access networks as per an aspect of an embodiment of the present disclosure.

FIG. 20 is an example architecture of a 5G system having a 5G core network that provides service to different types of access networks as per an aspect of an embodiment of the present disclosure. As shown in FIG. 20, the different types of access networks may include terrestrial access networks and non-terrestrial access networks. An ng-eNB may constitute a type of terrestrial access network and a gNB may constitute another type of terrestrial access network. A non-GEO (e.g. LEO) satellite may a type of non-terrestrial access network and a GEO satellite may constitute another type of non-terrestrial access network. The 5G core network may operate multiple access networks which have different physical perspectives (e.g. latency, throughput, delay).

Figure 21:
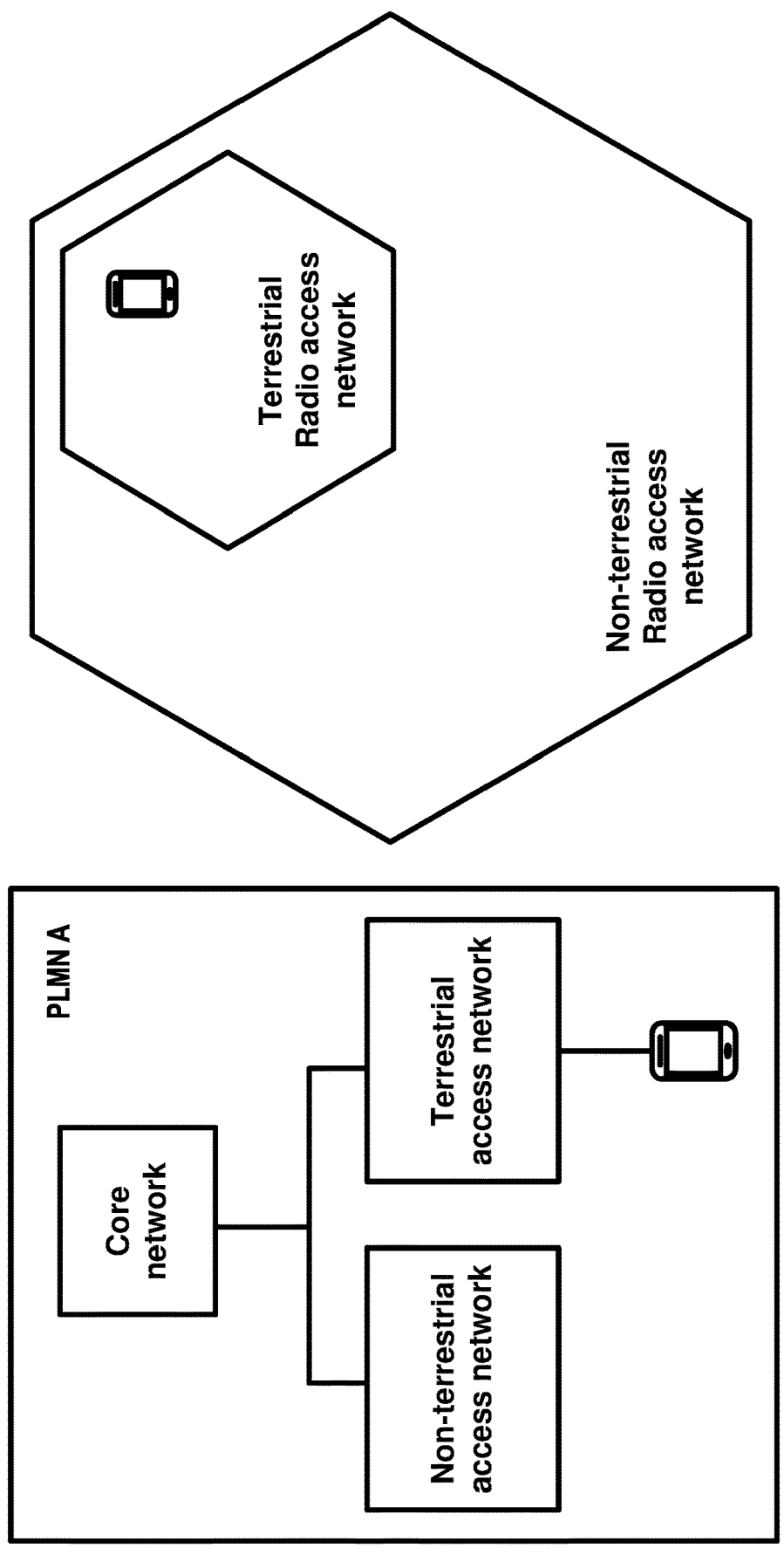
FIG. 21 depicts an architecture (left side) and coverage map (right side) of a deployment scenario in which one public land mobile network (e.g. PLMN A) provides both a non-terrestrial access network and a terrestrial access network as per an aspect of an embodiment of the present disclosure.

FIG. 21 depicts an architecture (left side) and coverage map (right side) of a deployment scenario in which one public land mobile network (e.g. PLMN A) provides both a non-terrestrial access network and a terrestrial access network. In an example, a wireless device may be able to access the non-terrestrial access network and the terrestrial access network. In this deployment scenario, separate NG instances (e.g. N2, N3) are handling separate access type nodes. The coverage of the non-terrestrial access network may span over the coverage of the terrestrial access network. In an example, the PLMN A is a Verizon, AT&T and/or the like. In an example, Verizon may deploy a cellular access network (e.g. 4G, 5G terrestrial network) and a non-terrestrial access network. A wireless device which is a subscriber of Verizon may access to a core network via the terrestrial access network when the wireless device is in a coverage area of the terrestrial access network. In an example, urban area or suburban area may be the coverage area of the terrestrial access network. The wireless device may access the core network via the non-terrestrial access network when the wireless device is out of coverage area of the terrestrial access network. In an example, the rural area or mountain area may be out of the terrestrial access network coverage.

Figure 22:
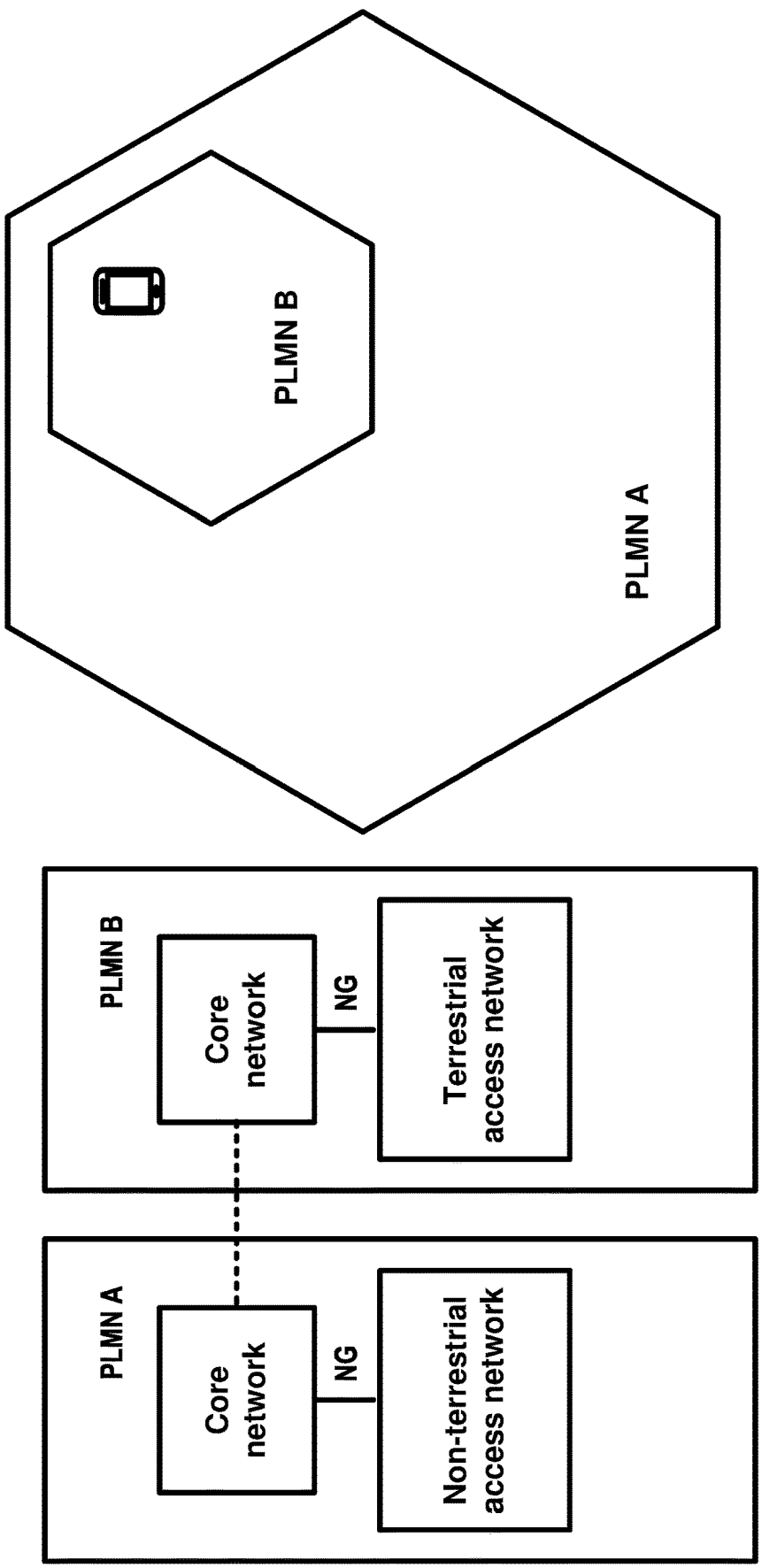
FIG. 22 depicts an architecture (left side) and coverage map (right side) of a scenario in which two different public land mobile networks (e.g. PLMN A and PLMN B) respectively provide a non-terrestrial access network and a terrestrial access network.

FIG. 22 depicts an architecture (left side) and coverage map (right side) of a scenario in which two different public land mobile networks (e.g. PLMN A and PLMN B) respectively provide a non-terrestrial access network and a terrestrial access network. In an example, the PLMN B is a Verizon, AT&T and/or the like. In an example, the PLMN B is an Iridium communication. In an example, Verizon may have roaming agreement with non-terrestrial network operator Iridium communication. A wireless device which is subscriber of the Verizon may access Verizon terrestrial access network if the wireless device resides in the coverage of the terrestrial access network. The wireless device may roam to the non-terrestrial access network, PLMN B, if the wireless device is out of coverage of the terrestrial access network.

Figure 23:
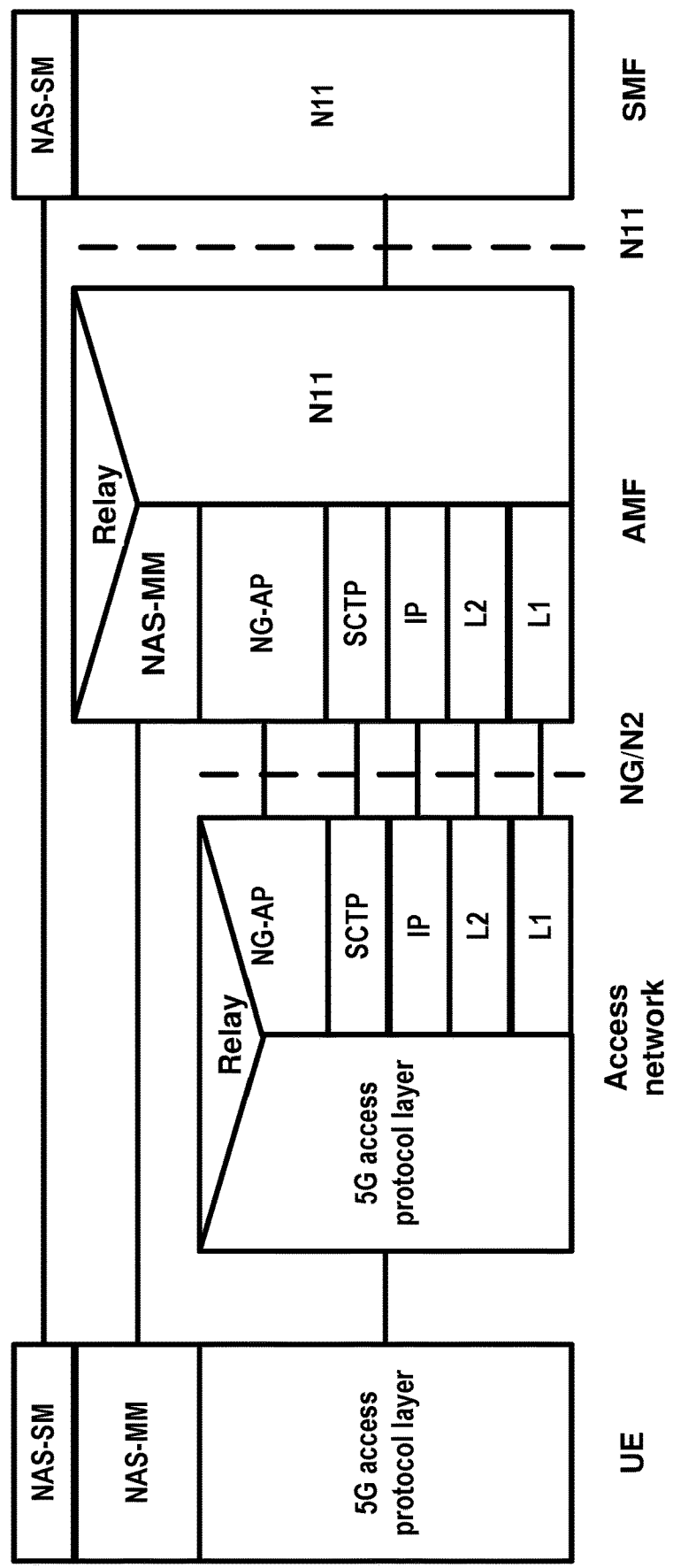
FIG. 23 depicts an example control plane protocol stack between a wireless device and various network functions as per an aspect of an embodiment of the present disclosure.

FIG. 23 depicts an example control plane protocol stack between a wireless device and various network functions (e.g. AMF, SMF). In an example, the wireless device is a user equipment (UE). In an example, the wireless device is a transponder. As shown in FIG. 23, a non-access stratum (NAS) procedure may be used by protocols for mobility management and session management between a UE and the network functions (e.g. AMF, SMF, PCF). Mobility management (MM) may be between a user equipment (UE) and the access and mobility management function (AMF) for both 3GPP access (e.g. LTE, New Radio, 3G, 4G, 5G) and non-3GPP access (e.g. IEEE defined radio access). Session management (SM) may be between the user equipment (UE) and the session management function (SMF) for both 3GPP access and non-3GPP access. In an example, NAS-MM is protocol interface between the UE and the AMF. In an example, NAS-SM is protocol interface between the UE and the SMF. The main function of the mobility management (5GMM) sublayer is to support the identification, security, mobility of a UE as well as generic message transport. The main function of the 5GSM sublayer is to support the packet data unit (PDU) session handling in the UE and in the SMF (transferred via the AMF). The 5GSM may comprises procedure for an authentication and authorization, establishment, modification and release of PDU sessions.

The UE (wireless device) and the network functions may maintain and control non-access stratum (NAS) timers for each NAS procedure in order to handle abnormal cases and proper operations. There may be multiple categories of timers, for example, NAS timers for mobility management and NAS timers for session management. In an example, the UE may start a NAS timer when the UE starts a NAS procedure (e.g. registration procedure, service request procedure). In an example, the UE may start the NAS timer in response to sending a NAS request message to a network function (e.g. AMF, SMF, PCF). If the UE does not receive a NAS response message corresponding to the NAS request message from the network function before an expiration of the NAS timer (before timeout of the NAS period), the UE aborts the ongoing NAS procedure. The UE may also determine to retransmit (re-send) the NAS request message after a pause. A period of the pause may be determined by another NAS timer. In an example, a wireless device may determine a retransmission (re-sending) of the NAS request message based on the expiration of the NAS timer.

Figure 24:
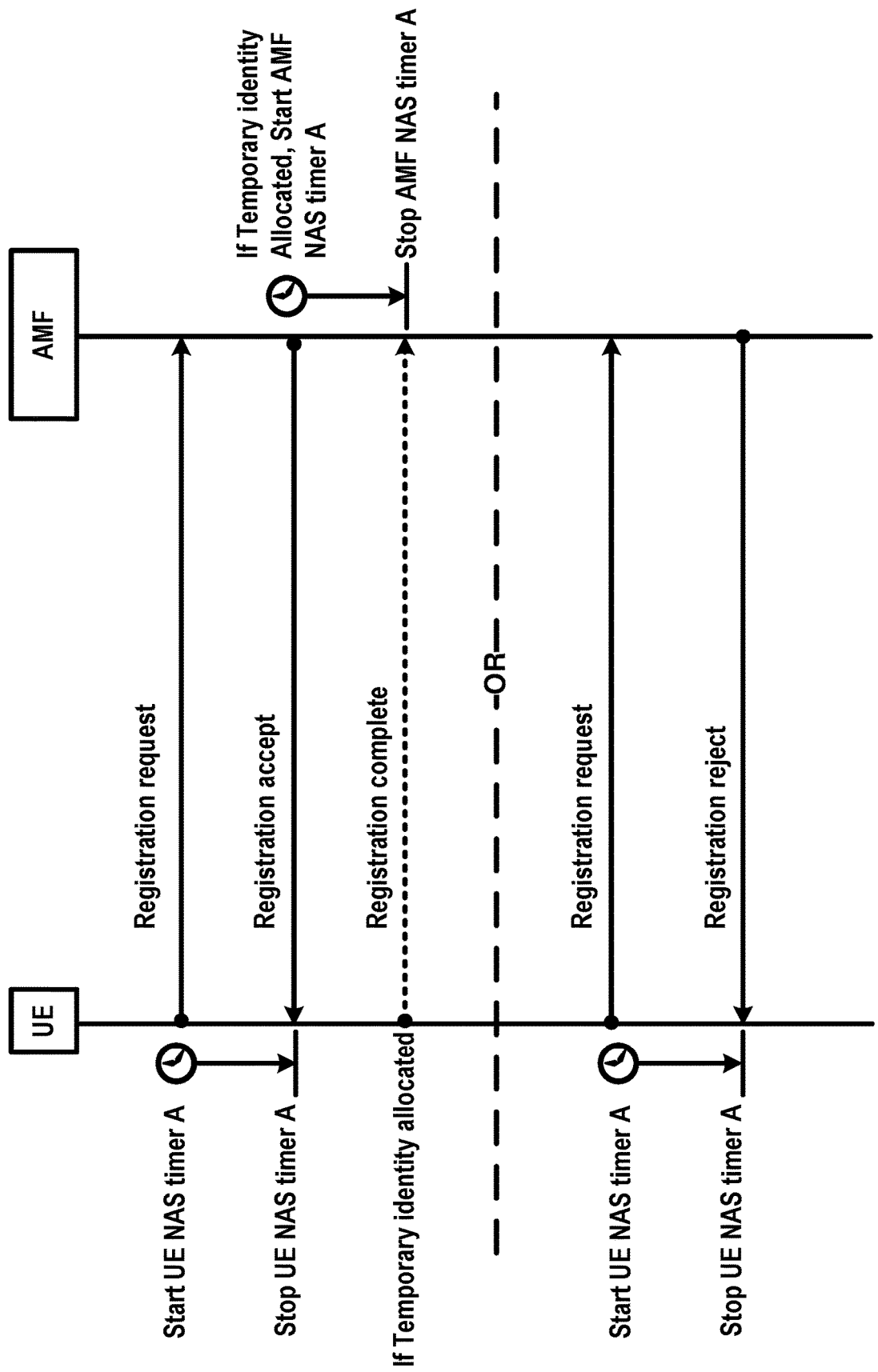
FIG. 24 illustrates a usage of an NAS timer in the context of a registration procedure as per an aspect of an embodiment of the present disclosure.
Figure 25:
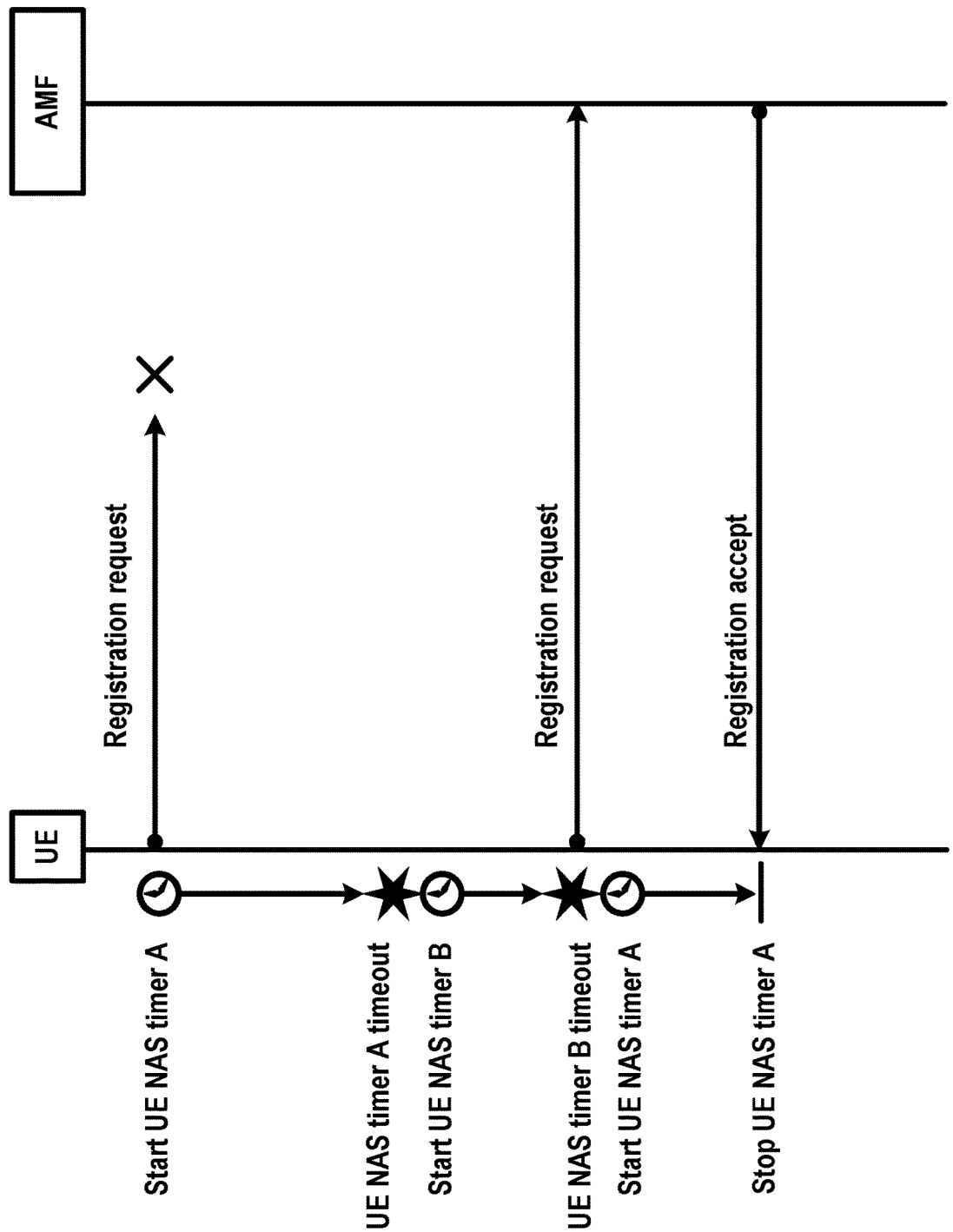
FIG. 25 illustrates another usage of an NAS timer in the context of a registration procedure as per an aspect of an embodiment of the present disclosure.

FIGS. 24 and 25 illustrate usage of NAS timers in the context of a registration procedure, in which a UE sends a registration request message for mobility and periodic registration to an AMF via an access network. FIG. 24 illustrates a successful case in which the UE receives a response message from an AMF before a timeout (expiration) of the NAS timer. FIG. 25 is a case in which the UE does not receive a response message.

FIG. 24 illustrates a registration procedure in which a UE attempts to register with an AMF. In a first scenario, shown at the top of FIG. 24, the UE sends a registration request message to the AMF requesting a registration of the UE. The registration request message may comprise a registration type, a UE identity (e.g., SUCI, 5G-GUTI), the location of the UE (e.g., last visited TAI), requested NSSAI, UE mobility management context information, information for the MICO mode usage, and/or the like. In an example, the registration type may indicate a mobility or periodic registration. The UE may start a first NAS timer referred to as UE NAS timer A. The UE NAS timer A illustrated in FIG. 24 may correspond, for example, to the timer T3510 identified in 3GPP standards. The UE NAS timer A may be started simultaneously with or in response to the sending of the registration request message. The access stratum layer of the UE may perform a random-access procedure to establish a radio resource control (RRC) connection setup with an access network. If the AMF receives the registration request message successfully (as it does in FIG. 24), the AMF may send a registration accept message to the UE. In an example, the registration accept message may comprise 5G-GUTI, registration area, a periodic registration area update time value, a MICO mode indication, and/or the like.

If the registration accept message includes a temporary identity (e.g., 5G-GUTI), the AMF may start a timer simultaneous with or in response to the sending of the registration accept message. This timer may be referred to as AMF NAS timer A, and may correspond to the timer T3550 identified in the 3GPP standards. The UE may stop the UE NAS timer A in response to receiving the registration accept message is received successfully from the AMF (as shown in FIG. 24). If the registration accept message comprising a temporary identity (e.g. 5G-GUTI), the UE may send a registration complete message to the AMF. The AMF may stop the AMF NAS timer A in response to receiving the registration complete message from the UE.

In a second scenario, shown at the bottom of FIG. 24, the AMF may reject the registration procedure by sending a registration reject message to the UE. The AMF may reject the registration if, for example, there is congestion when the registration request message is received. The UE may stop the UE NAS timer A in response to receiving the registration request message. The subsequent behavior of the UE may be based on a cause value in the registration reject message.

FIG. 25 illustrates another registration procedure in which a UE attempts to register with an AMF. In FIG. 25, the UE may send a registration request message analogous to the registration request message shown in FIG. 24. The UE may also start the UE NAS timer A. In an example, the period of the UE NAS timer A may be 15 seconds. In the scenario of FIG. 25, the NAS timer expires while the UE is waiting for an NAS response message (e.g. registration accept, registration reject). Simultaneous with or in response to the expiration of the UE NAS timer A, the UE starts a second NAS timer, referred to in the present example as UE NAS timer B. If the UE NAS timer B, expires, the UE may increase a registration attempt counter and may re-send (retransmit) the registration request message and restart the UE NAS timer A. If a registration accept message is received in response to the retransmission of the request (as shown in FIG. 25), then the UE NAS timer A stops. If no registration accept message is received and the registration attempt counter reaches or exceeds a predefined value (e.g., 5), the UE may abort the ongoing procedure (not shown in FIG. 25).

In an example, a NAS procedure such as service request procedure, one NAS timer (e.g. first NAS timer) may be used to abort the NAS procedure. In an example, retransmission of the same NAS request message may not happen for the service request procedure based on an expiration of the first NAS timer. The UE may abort the service request procedure in response to the expiration of the first NAS timer. A UE may send another service request message in response to upper layer request. In an example, a service request for service A is aborted in response to an expiration of a first NAS timer. The wireless may send a service request message in response to a connection request for service B from an upper layer of the UE. In an example, the upper layer of a UE may be application layer of the UE.

In existing wireless technologies (e.g. 5G system), non-access stratum (NAS) handling may be access agnostic, for example, when an AMF supports multiple access technologies. In an example, a wireless device may access a 5G core (e.g. AMF) via a base station employing NR (gNB). The wireless device may access a 5G core (e.g. AMF) via a base station employing E-UTRA (ng-eNB). Irrespective of accessing via the NR or the E-UTRA, the wireless device may adopt the same NAS timings (e.g., the periods/values of one or more NAS timers). In an example, a wireless device may start a NAS procedure (e.g., registration procedure, service request, and/or the like) by sending a NAS request message (e.g., registration request message, service request message, and/or the like) to an AMF. The wireless device may start a first NAS period (e.g., corresponding to UE NAS timer A) when sending the NAS request message. The first NAS period may correspond to a preconfigured value (e.g., 15 seconds). The wireless device may determine that the NAS procedure has failed if the wireless device does not receive a NAS response message prior to an expiration of the first NAS period. In an example, the wireless device may abort the NAS procedure (e.g. service request procedure) in response to the expiration of the first NAS period. In an example, the wireless device may abort the NAS procedure (e.g. registration procedure) and start a second NAS period (e.g., corresponding to UE NAS timer B) when the first NAS period expires. The second NAS period may be, for example, 10 seconds. The wireless device may send a second NAS request message when the second NAS period expires and may abort the NAS procedure after a number of failed attempts.

Configuration of NAS timers in existing technologies may result in high signaling overhead and excessive connection failure when multiple access technologies are implemented in a wireless device. For example, when different access technologies such as GEO type access network, LEO type access network, and/or terrestrial access network are implemented in a 5G network, the wireless device may experience increased connection failures because of expiry of NAS timers. For example, incomplete NAS registration procedures may result in increased connections failures when the wireless device connect to the 5G network. If existing NAS timers configurations are used, then a wireless device accessing an AMF via a non-terrestrial networks (NTN) may re-send a NAS message or abort the NAS procedure. Implementation of existing technologies may increase signaling overhead even though the AMF respond to the NAS registration procedure promptly. The wireless device may abort the NAS procedure, which causes a delay for a connection setup. Example embodiments enhances NAS timer configurations to reduce connections failures during the access procedures. Example embodiment takes into account relatively longer propagation delays non-terrestrial networks (NTN) to enhance NAS timer configuration. Example embodiments implement enhanced timer management processes for NAS procedures to reduce connection failure and signaling overhead. The enhanced timer management processes of the present disclosure may accommodate a wider variety of access types. The example embodiments may reduce expiry of a NAS timer before receiving the registration accept message and allow reasonably long delay for a response to arrive.

In example embodiment, one or more public land mobile network (e.g. PLMN A) may employ non-terrestrial network (NTN), terrestrial network, or both. In an example, as depicted in FIG. 15A and FIG. 15B, the PLMN may employ the NTN for a Uu interface between a wireless device and an access network (e.g. base station, gNB). As depicted in FIG. 16, the PLMN may employ the NTN for backhaul interface (e.g. NG interface, N2/N3 interface) between an access network (e.g. base station, gNB) and 5G core network (e.g. AMF, UPF). In yet other scenarios the PLMN may employ an NTN in both the access network and the backhaul. Employing the NTN as the Uu interface or the NG interface may result in longer propagation delay compared to terrestrial network. In an example, a propagation delay of the terrestrial network (e.g. gNB (NR), ng-eNB(E-UTRA)) may be negligible. In an example, a round-trip propagation delay of terrestrial network may be under a 1 microsecond. In an example, a round-trip propagation delay of NTN may be from tens of times (for LEO) to hundreds of times (for GEO) comparing to a terrestrial network. In an example, the round-trip propagation delay of LEO may be negligible, and the round-trip propagation delay of GEO may not be negligible.

In an example embodiment, a wireless device (e.g., UE) may access a PLMN via an access network. The wireless device may determine NAS periods/NAS timers (e.g. first NAS period, second NAS period, third NAS period) based on access network information received from an access network of the PLMN. The access network information may indicate an access network type of a plurality of access network types. For example, the plurality of access network types may comprise a non-terrestrial network (NTN), a terrestrial network (TN), and/or the like. The NTN access network type may comprise a GEO NTN access network type, a LEO NTN access network type, a MEO NTN access network, and/or the like. In an example, the NAS periods/NAS timers may be equal to a first set of values based on the access network information indicating the GEO access network type. The NAS periods/NAS timers may be equal to a second set of values based on the access network information indicating the LEO TN. The first set of values may be longer than the second set of values. In an example, the NAS periods/NAS timers may be equal to the second set of values based on the access network information indicating the TN access network type. In an example, the NAS periods/NAS timers may be longer when the access network information includes NTN than when the access network includes TN (does not include the NTN). In an example, the first set of values for the NAS periods/NAS timers may be longer than the second set for values for the NAS periods/NAS timers a few hundred seconds (e.g. 200s, 300s).

The wireless device may receive a backhaul network information from the PLMN (e.g., AMF, access network/base station, and/or the like). The wireless device may update/re-determine the NAS periods/NAS timers based on the backhaul network information in response to receiving the backhaul network information from the PLMN. In an example, the NAS periods/NAS timers may be extended with a delta value (e.g. 100 seconds) in response to the backhaul network information indicating the NTN. In an example, the NAS periods/NAS timers may be not changed in response to the backhaul network information indicating the TN. Determining the NAS periods/NAS timers (first NAS period, second NAS period, third NAS period) based on the access network information/type and/or the backhaul network information, may reduce signaling overload and improve user experience.

Figure 26:
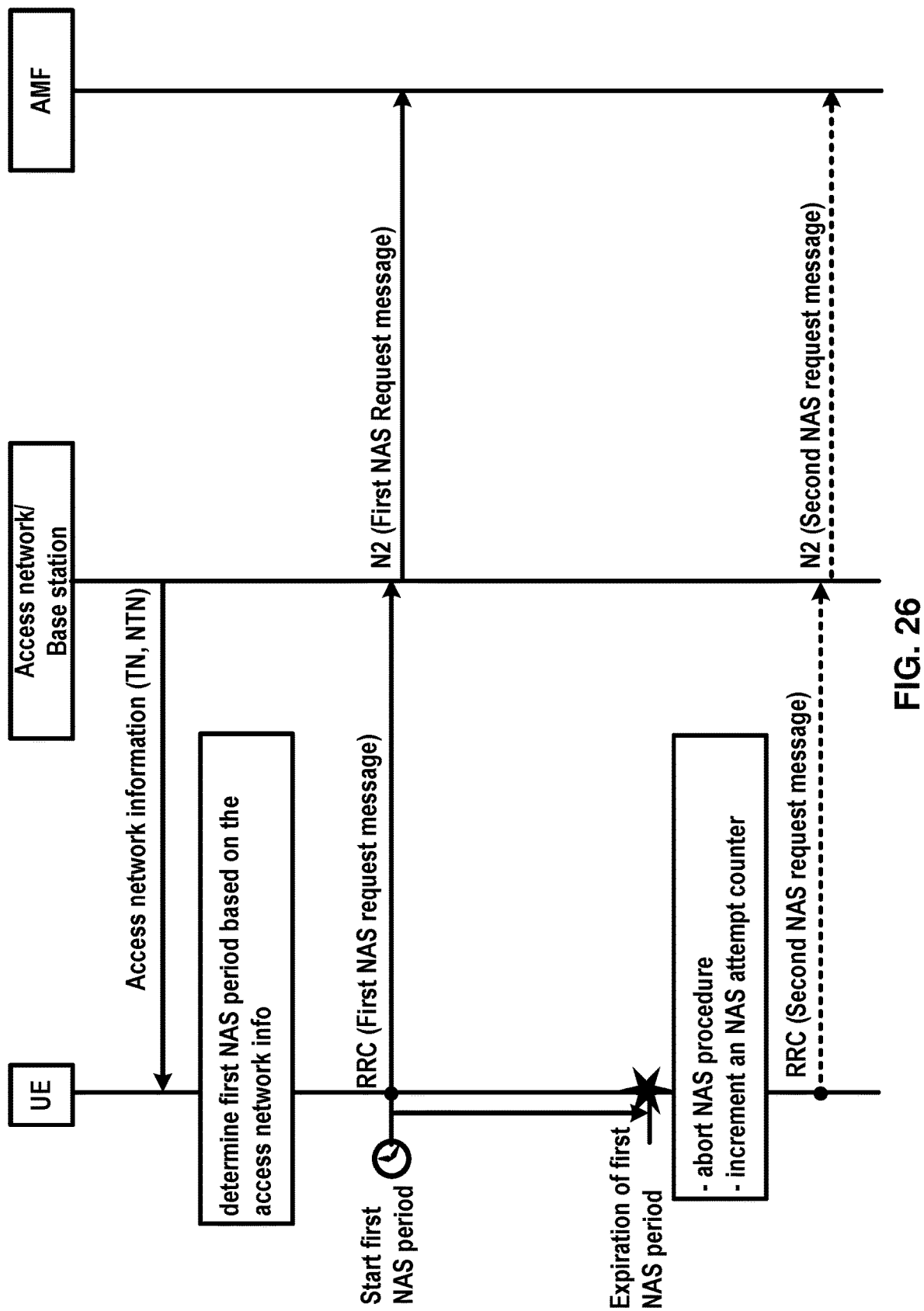
FIG. 26 illustrates an example embodiment of a present disclosure.

FIG. 26 illustrates an example embodiment of a present disclosure comprising a wireless device (e.g. a UE), an access network/base station, and an AMF. In an example, a wireless device may handle one NAS period/timer to determine a re-transmission (re-sending) of the NAS request message. The wireless device may receive, from the access network/base station, access network information indicating an access network type. The access network information may be included in system information block. In an example implementation, the wireless device may determine the access network type based on a detected numerology (e.g. modulation scheme, frequency band, and/or the like) of the access network. The access network type may comprise a terrestrial network (TN), a non-terrestrial network (NTN) and/or the like. The NTN may comprise a low earth orbit (LEO) satellite type, a medium earth orbit (MEO) satellite type, a geostationary earth orbit (GEO) satellite type, an unmanned aircraft system (UAS) platform type, a high elliptical orbit (HEO) platform type, and/or the like. In an example implementation, the TN may comprise a narrow band internet of things type, an enhanced machine type communication (MTC) type, a wide-band evolved terrestrial radio access (WB-E-UTRA) type, a new radio (NR) type, and/or the like. In an example implementation, the TN may comprise a wide-band evolved terrestrial radio access (WB-E-UTRA) type, a new radio (NR)type, and/or the like. The wireless device may determine a first NAS period (e.g., a first NAS timer, a period value for the first NAS timer) based on the access network type in response to receiving/detecting the access network information/type.

In an example, the first NAS period/NAS timer may be equal to a first value based on the access network information indicating the NTN. The first NAS period/NAS timer may be equal to a second value based on the access network information indicating the TN. The first value may be different from the second value. The first value may be longer than the second value. In an example, the first value may be 215 seconds and the second value may be 15 seconds.

In an example implementation, the NTN may comprise a GEO, and the first value may be longer than the second value. In another example implementation, the NTN may comprise a LEO, and the first value may be longer than the second value, but not as long as the first value associated with the GEO. In yet another example implementation, the NTN may comprise a LEO, and the first value may be the same as the second value.

In an example implementation, a third value or fourth value may be existed to support more granularity timer handling.

In an example implementation, the first value and/or the second value may be pre-configured in the wireless device. In another example implementation, the access network information may indicate the first value and/or the second value. In yet another example implementation, the access network information may indicate an access type, from which the first value and/or the second value may be inferred.

In an example, the wireless device may initiate a NAS procedure by sending a first NAS request message to the AMF. The wireless device may start the first NAS period in response to sending the first NAS request message. If the wireless device does not receive a first NAS response message from the network (e.g., AMF) prior to an expiration of the first NAS period/timer, the wireless device may abort/stop the NAS procedure. In an example implementation, the wireless device may send a second NAS procedure in response to the expiration of the first NAS period/timer. The wireless device may increment an NAS attempt counter by 1 in response to the expiration of the first NAS period. The NAS attempt counter may be used to limit the number of NAS request attempts when there is no response form the network (e.g. AMF). If the NAS attempt counter is greater or equal to NAS attempt maximum counter value, the wireless device may start a third NAS period/timer. In an example, the NAS attempt maximum counter may be 5. In an example, the third NAS period/timer may be T3525 in response to the NAS procedure being a service request procedure. In an example, the wireless device may send the NAS request message after the third NAS period/timer is expired.

Figure 27:
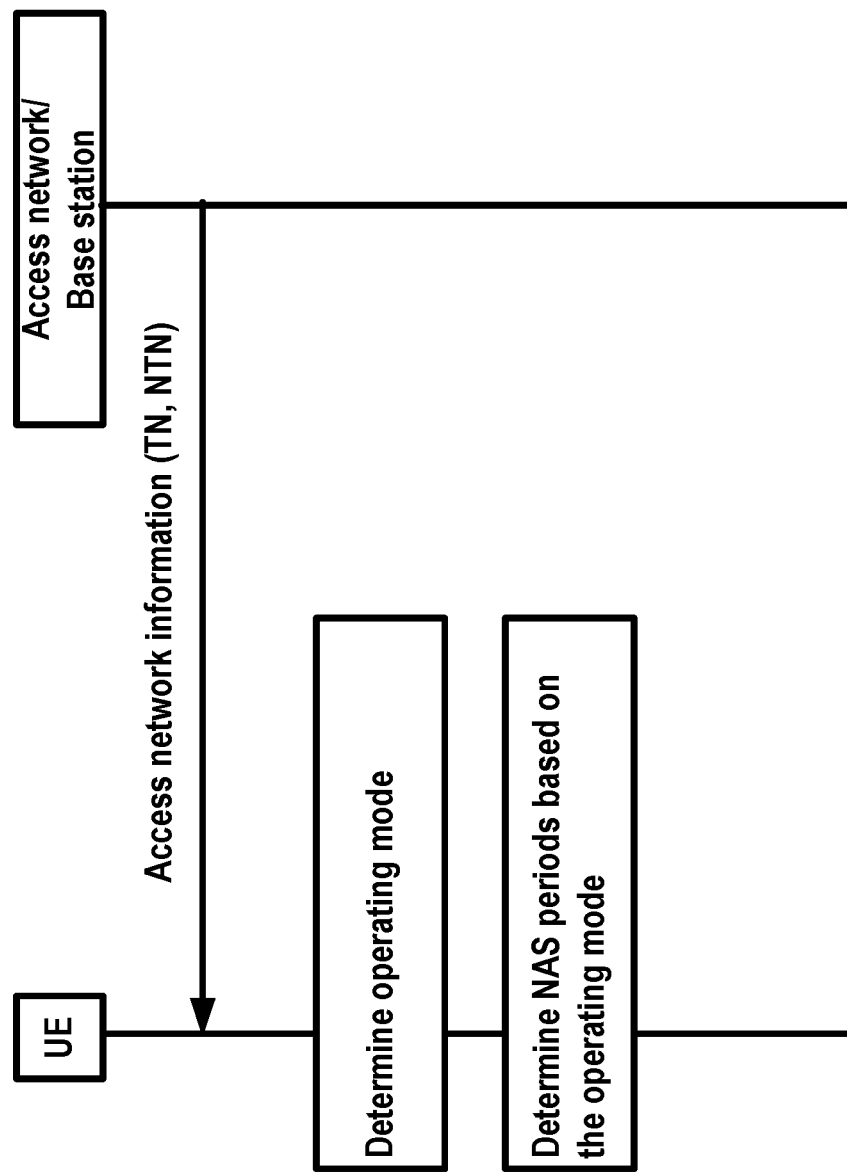
FIG. 27 illustrates an example embodiment of a present disclosure.

FIG. 27 illustrates an example embodiment of a present disclosure comprising a wireless device (e.g. UE) and an access network/base station. The wireless device may determine an operating mode based on the received access network information/type via system information block. In an example implementation, the wireless device may determine/detect a numerology (e.g. modulation scheme, frequency band, and/or the like) of the access network. The wireless device may determine the first NAS period/timer (e.g., NAS periods/timers) based on the operating mode. In an example, the operating mode may comprise a terrestrial operation mode, a wide band terrestrial operation mode, a narrow band terrestrial operation mode, a non-terrestrial operation mode, a non-terrestrial low earth orbit (LEO) operation mode, a non-terrestrial medium earth orbit (MEP) operation mode, a non-terrestrial geostationary earth orbit (GEO) operation mode, a non-terrestrial unmanned aircraft system (UAS) operation mode, and/or the like. In an example, the wireless device may determine the operating mode as the non-terrestrial geostationary earth orbit (GEO) operation mode in response to the access network being a GEO. In an example, the wireless device may determine the operating mode as the wide band terrestrial operation mode in response to the access network being NR or E-UTRA. In an example, the wideband terrestrial operation mode may be S1 mode.

Figure 28:
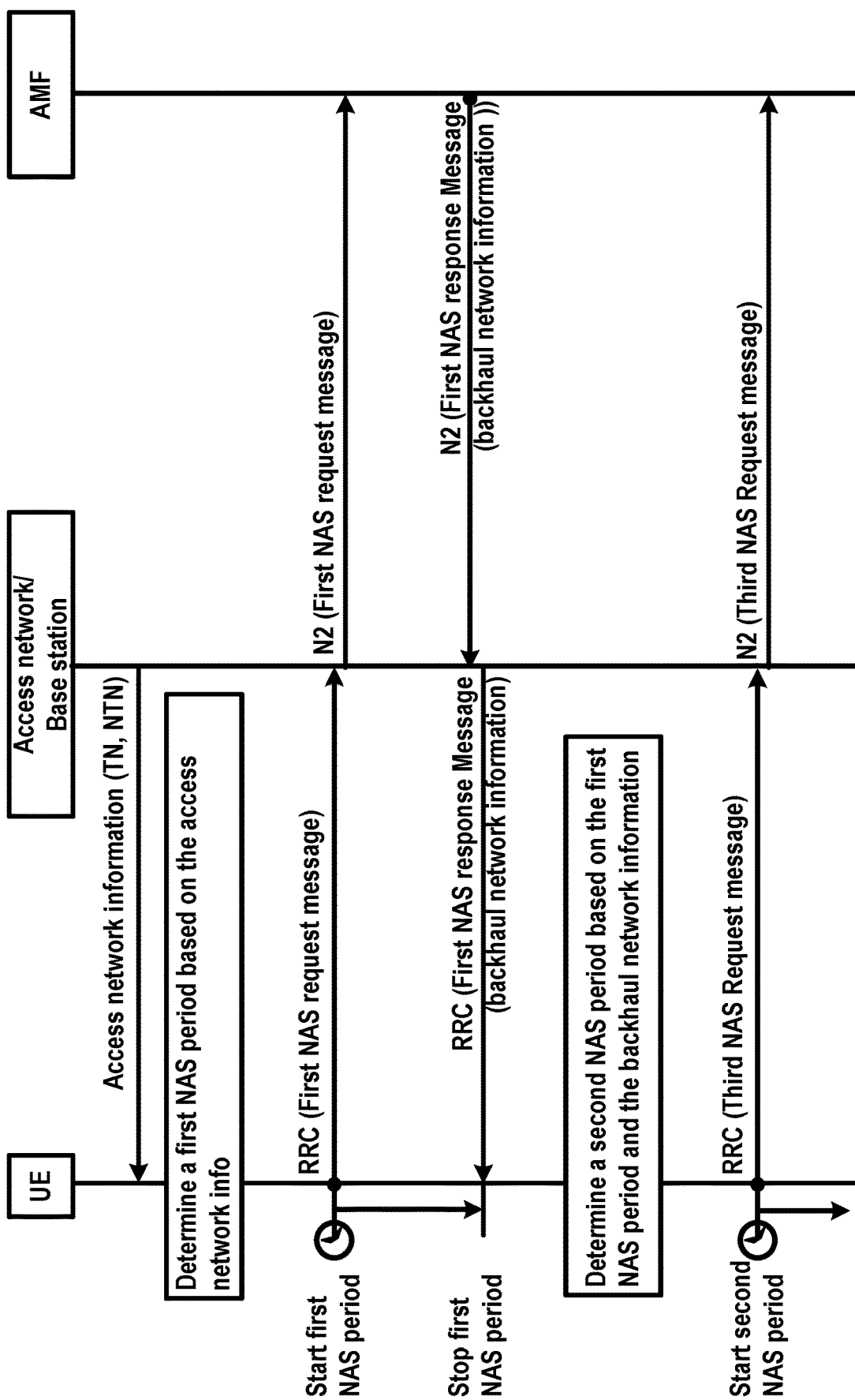
FIG. 28 illustrates an example embodiment of a present disclosure.

FIG. 28 illustrates an example wherein a wireless device receives a response message from the network (e.g., AMF/SMF). As described in FIG. 26, the wireless device (e.g., UE) may determine a first NAS period/timer based on the access network information/type. The wireless device may initiate by sending a first NAS request message to the network. The network (e.g., AMF) may send a first NAS response message in response to receiving the first NAS request message. If the wireless device receives the first NAS response message prior to an expiration of the first NAS period/timer (as it does in the example of FIG. 28), the wireless device may stop the first NAS period/timer. If a NAS attempt counter is not zero, the wireless device may reset (set as zero) the NAS attempt counter in response to receiving the first NAS response message.

In an example implementation, the wireless device may receive backhaul network information of the core network from the network. The first NAS response message may comprise the backhaul network information. The backhaul network information may comprise NTN type information, backhaul latency information, altitude information, and/or the like.

The wireless device may determine a second NAS period/timer based on the backhaul network information. The wireless device may adapt the NAS timings based on the backhaul network information. For example, the wireless device may determine a second NAS period/timer based on the first NAS period and the backhaul network information. In an example, the second NAS period may be equal to the sum of the first NAS period and a delta value. The delta value may vary based on whether or not the backhaul includes an NTN. For example, the delta value may be a particular size based on the backhaul network information indicating the NTN (or indicating a particular type of NTN), and may be a smaller size or zero based on the backhaul network information indicating no NTN (or indicating a different type of NTN). In an example, the second NAS period is equal to the first NAS period, based on the backhaul network information indicating the TN. In an example, the delta value may be pre-configured in the wireless device. In an example, the delta value may be broadcasted by the access network. In an example, the backhaul network information may comprise the delta value. The wireless device may initiate a NAS procedure by sending a third NAS request message. The first NAS request message may be same NAS message with the third NAS request message. The wireless device may start the second NAS period/timer in response to the sending the third NAS request message. The wireless device may use the same physical/logical NAS timer (e.g. T3510, T3517) for the first NAS period and the second NAS period. The duration of the second NAS period may differ from the duration of the first NAS period based on the backhaul network information.

In an example implementation, it may be efficient to inform a wireless device of possible backhaul network information (e.g., possible backhaul interface propagation delay/latency) prior to receiving a first NAS response message. The wireless device may determine the first NAS timer based on an access network information and the backhaul network information at the initial access/procedure as below.

Figure 29A:
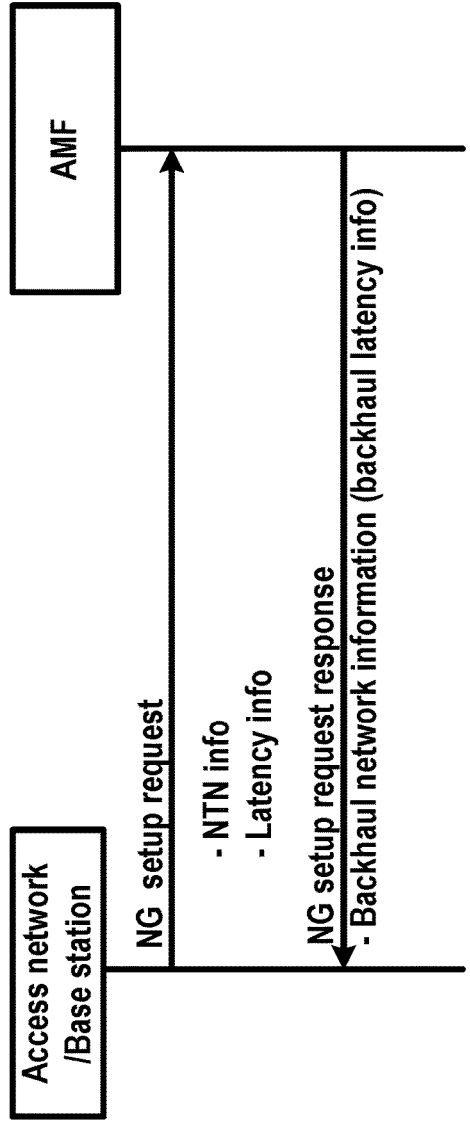
FIG. 29A illustrates an example embodiment of a present disclosure.
Figure 29B:
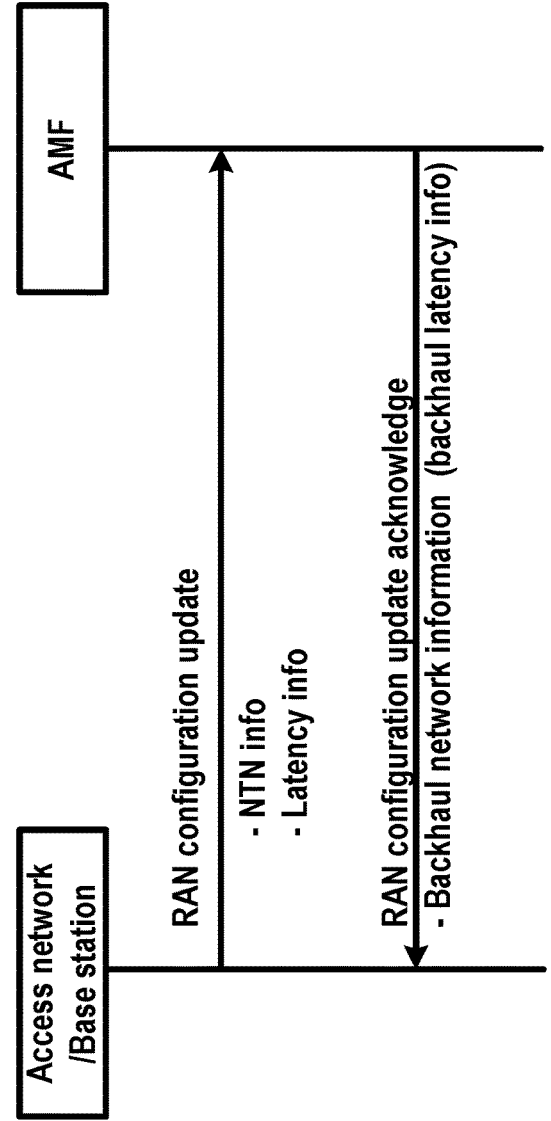
FIG. 29B illustrates an example embodiment of a present disclosure.

FIG. 29A and FIG. 29B illustrate example embodiments of a latency related information exchange. FIG. 29A illustrates, for example, a first NGAP procedure triggered after the TNL (transport network layer) association has become operational. The base station may initiate the procedure by sending an NG setup request message to the AMF. The NG setup request message may comprise an identity of the base station, a default paging discontinuous reception (DRX) cycle, supported tracking areas list with supported slice info, non-terrestrial network information, latency information, and/or the like. In an example, the non-terrestrial network information may comprise an employed satellite type (e.g. LEO, MEO, GEO and/or the like). In an example, the latency information may comprise a time value, altitude information and/or the like. The AMF may send a NG setup request response message to the base station in response to receiving the NG setup request message. The NG setup request response message may comprise an AMF name, a served globally unique AMF identifier (GUAMI) list, a PLMN support list, backhaul network information and/or the like. The PLMN support list may comprise a PLMN identity and supported S-NSSAIs per tracking area. In an example, the backhaul network information may comprise backhaul latency information, non-terrestrial network type information, and/or the like. The backhaul latency information may comprise actual latency as a time value (e.g. 30 milliseconds, 1 second, 2 seconds, 3 seconds, 100 seconds, 200 seconds and/or the like). In an example, the non-terrestrial network (NTN) type information may comprise an employed satellite network type or altitude information and/or the like. In an example, the employed satellite network type may comprise a LEO, MEO, GEO and/or the like. In an example, the altitude information may comprise the altitude of the backhaul satellite. In an example, the altitude of the backhaul satellite may comprise 300 km, 400 km, 500 km, 100 km, 1500 km, 2000 km, 3000 km and/or the like. In an example, the altitude of the backhaul satellite may be preconfigured index information.

FIG. 29B illustrates, for example, an update to application level configuration data needed for the base station (NG-RAN) and the AMF to interoperate correctly on the NG-C interface. The base station may send a RAN configuration update message to the AMF. The RAN configuration update message may comprise an identity of the base station, a default paging discontinuous reception (DRX) cycle, supported tracking areas list with supported slice info, the non-terrestrial network information, the latency information, and/or the like. The AMF may send a RAN configuration update acknowledge message to the base station in response to receiving the RAN configuration update message. In an example, the RAN configuration update acknowledge message may comprise an AMF name, a served globally unique AMF identifier (GUAMI) list, a PLMN support list, backhaul network information and/or the like.

In an example, the propagation delay or latency of delivery of packet between in Uu interface/radio interface (from a wireless device to an access network/base station) may degrade user service experience. In an example, the high latency due to propagation delay may not appropriate for some user services (e.g. a critical service, an interactive service). In an example, as explained in 29A, 29B, the access network/base station may send a latency related information to core network. The core network (e.g. AMF, SMF) may determine acceptable QoS service based on the latency related information. In an example, the core network may provide the latency related information to a PCF. The PCF may determine an acceptance of any requested service QoS based on the latency related information. In an example, the latency related information may comprise a non-terrestrial information or a latency information (e.g. delivery time) if the access network includes a non-terrestrial network.

In an example, the propagation delay or latency of delivery of packet between in backhaul interface/NG interface (from an access network/base station to core networks) may degrade user service experience. In an example, the high latency due to propagation delay may not appropriate for some user services (e.g. a critical service, an interactive service). In an example, the access network may adapt/determine parameters (e.g. QoS, RRC timers, throughput, and/or the like) based on the backhaul latency. The core network (e.g. AMF) may send a latency related information of the backhaul to the access network. In an example, the latency related information may comprise a non-terrestrial information or a latency information (e.g. delivery time) of the backhaul if the core network interface includes a non-terrestrial network.

In an example implementation, an access network may indicate a propagation delay/backhaul latency of a core network (backhaul interface) to a wireless device via broadcasting (system information block) to a wireless device. The propagation delay/backhaul latency of the core network may be a potential one if the access network is connected multiple core networks. The access network may broadcast the propagation delay/backhaul latency as a common information element without distinction between different core networks. In an example, the access network may be connected to multiple core networks. In an example, the access network may be connected to two core networks (e.g. core network A, core network B). A backhaul interface with the core network A may be a terrestrial network type and a backhaul interface with the core network B may be a non-terrestrial network (NTN) type. In an example, the access network may exchange with the core network B the latency related information of the backhaul as illustrated in FIG. 31A and FIG. 31B. The access network may broadcast the propagation delay/backhaul latency without distinction between the core network A and the core network B. In an example, the access network may broadcast the propagation delay/backhaul latency with distinction between the core network A and the core network B. If a wireless device accesses the core network A via the access network, the wireless device may determine a first NAS period/timer without considering the propagation delay/backhaul latency information. If a wireless device accesses the core network B via the access network, the wireless device may determine a first NAS period/timer based on the propagation delay/backhaul latency information. The first NAS period for the core network B may be longer than the first NAS period for the core network A.

In an example implementation, an access network may provide a propagation delay/backhaul latency of a core network (backhaul interface) to a wireless device via radio resource control (RRC) message. This example implementation may be efficient since the access network sends the RRC message comprising the propagation delay/backhaul latency information after the access network/base station selects a core network (e.g., core network A or core network B) for routing a first NAS request message. In an example, the access network/base station select the AMF based on S-NSSAI, UE capability information. In an example, if the access network selects the core network A (terrestrial type backhaul interface, low/no latency) for a wireless device, the access network may not provide the propagation delay/backhaul latency to the wireless device. If the access network selects the core network B (non-terrestrial type backhaul interface, middle/high latency), the access network may provide the propagation delay/backhaul latency to the wireless device.

Figure 30:
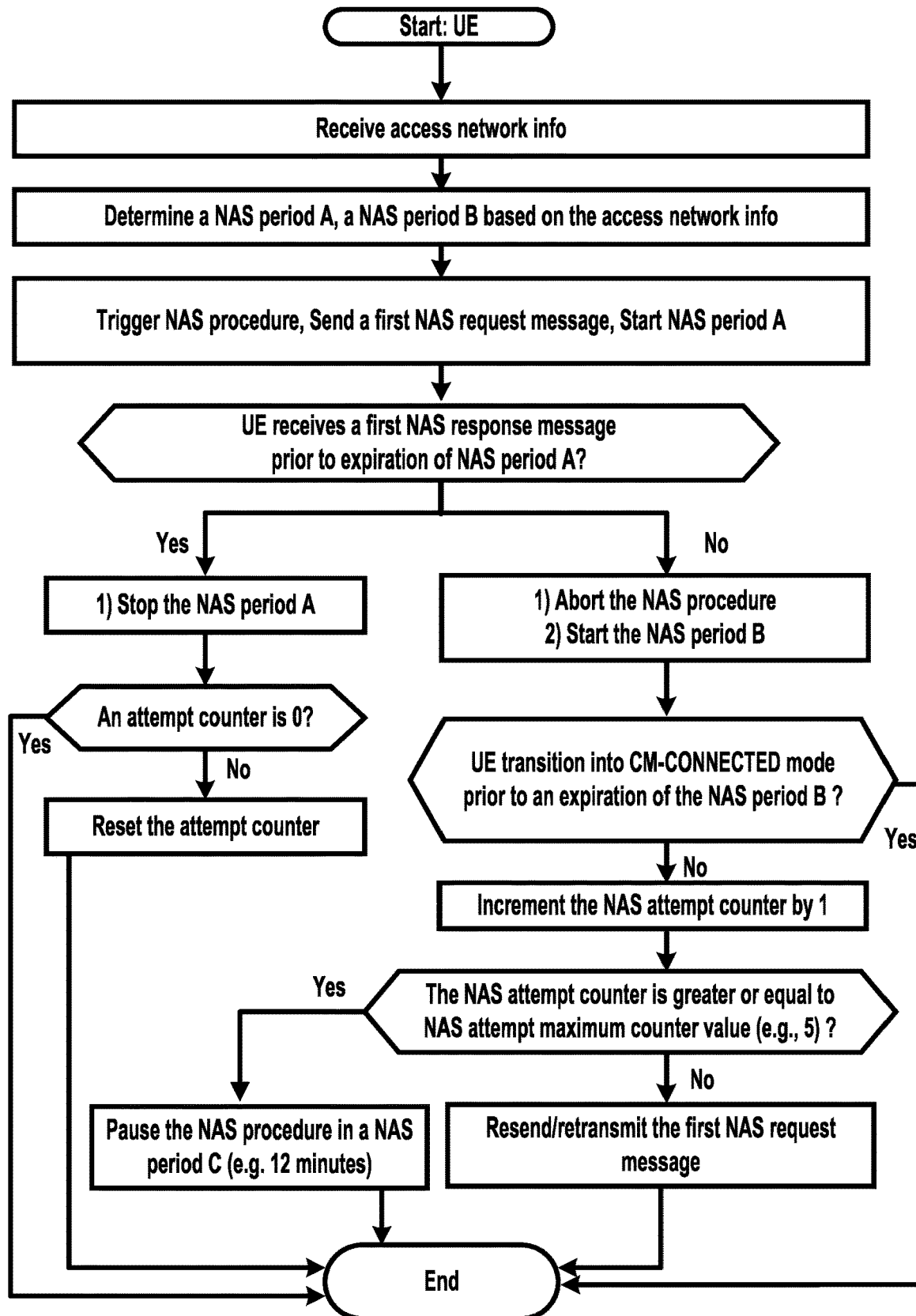
FIG. 30 illustrates an example flow chart of a present disclosure.

FIG. 30 shows an example flow chart of a present disclosure. In an example implementation, a wireless device may employ two NAS timers (e.g. T3510, T3511) for NAS request message retransmission if there is no response from a network (e.g. AMF) in a given time (e.g., a time value of a NAS timer C). In an example, a registration procedure may employ two NAS periods/timers. The wireless device (e.g. UE) may receive access network information and determine a NAS period A (e.g. T3510), a NAS period B (e.g. T3511) and the pause NAS period C (T3502). In an example, the wireless device may determine the value of NAS periods based on access network information. The NAS periods/timers may be equal to a first set of values in response to the access network information/type comprising an NTN. The NAS periods/timers may be equal to a second set of values in response to the access network information/type comprising an TN. In an example implementation, the NAS periods/timers may be equal to a first set of values in response to the access network information/type comprising an access network type implying longer latency/propagation delay. The NAS periods/timers may be equal to a second set of values in response to the access network information/type comprising access network type implying shorter/normal latency/propagation delay. In an example, the second set of values may be from a few seconds to tens of seconds (e.g. T3510=15s, T3511=10s, T3502=12 minutes). In an example, the first set of values may be a few hundreds of seconds (e.g. T3510=215s, T3511=210s, T3502=1 hours). In an example, the first set of values may be the sum of the second set of values and a time delta. The time delta (e.g., 200 s, 300s, 400s) may be a hundred of seconds to a few minutes/hours.

The wireless device may initiate a NAS procedure by sending a first NAS request message. The wireless device may start the NAS period A (T3510) in response to initiate the NAS procedure (sending the first NAS request message). In an example, the wireless device may wait to receive a first NAS response message from a core network (e.g. AMF, SMF). If the wireless device receives the first NAS response message prior to an expiration of the NAS period A, the wireless device may stop the NAS period A. The wireless device may reset an NAS attempt counter to zero in response to receiving the first NAS response message.

In an example, the wireless device may not receive the first NAS response message and the NAS period A may be expired. The wireless device may abort the NAS procedure and start the NAS period B (T3511) in response to the expiration of the NAS period A. In an example, if the wireless device transitions into CM-CONNECTED state/mode prior to an expiration of the NAS period B, the wireless device may stop the NAS period B. If the wireless device does transition into CM-CONNECTED state/mode prior to the expiration of the NAS period B, the wireless device may increment the NAS attempt counter by 1. If the NAS attempt counter is greater or equal to a NAS attempt maximum counter value (e.g. 5), the wireless device may start a NAS period C (e.g. T3502). The wireless device may pause (does not initiate same NAS procedure) the NAS procedure the time duration that the NAS period/timer C is running. In an example, the wireless device does not initiate the same NAS procedure/NAS procedure prior to an expiration of the NAS period C. If the NAS attempt counter is less than the NAS attempt maximum counter value, the wireless device may send a second NAS request message. The sending of the second NAS request message is equal to retransmit/re-send same context of the first NAS request message.

Figure 31:
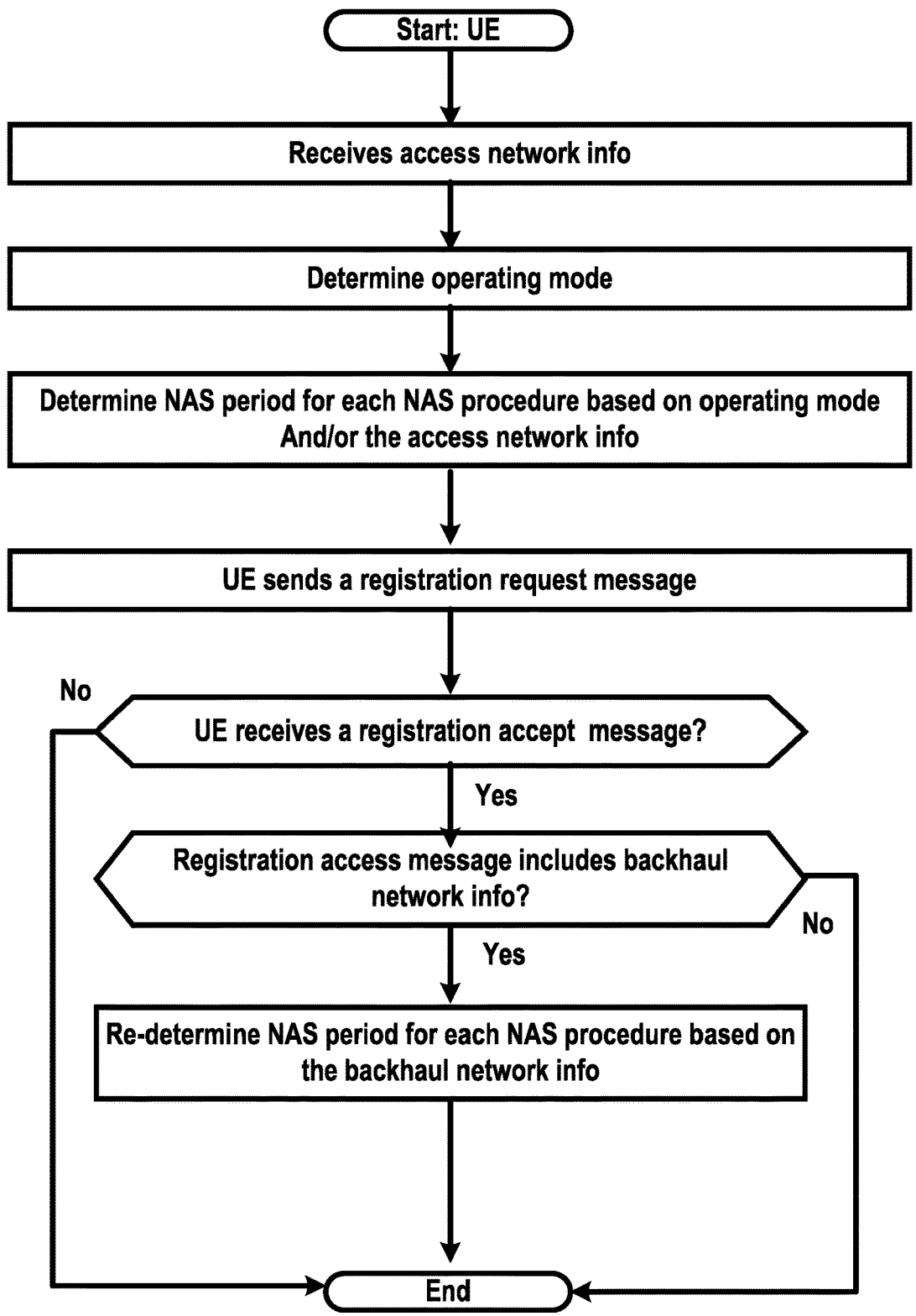
FIG. 31 illustrates an example flow chart of a present disclosure.

FIG. 31 shows an example flow chart of a present disclosure. A wireless device (e.g., UE) may determine operating mode based on received access network information/type. The wireless device may determine NAS periods (e.g. NAS period A, NAS period B, NAS period C) for each NAS procedure (e.g. registration procedure, service request procedure, PDU session establishment procedure) based on the operating mode and/or the access network information/type. The wireless device may initiate/trigger a NAS procedure by sending a NAS request message (e.g. registration request message). In an example, the wireless device may receive a NAS response message (e.g. registration access message) prior to an expiration of a NAS period (NAS period A). If the NAS response message comprising backhaul network information, the wireless device may re-determine NAS periods/NAS timers for each NAS procedure based on the backhaul network information.

In an example, a wireless device may receive from an access network and the access network information may indicate an access network type of a plurality of access network types. The access network type may comprise a non-terrestrial network (NTN) access network type, a terrestrial network (TN) access network type.

In an example, the wireless device may determine a first non-access stratum (NAS) period based on the access network type. The wireless device may initiate a NAS procedure by sending, to an access and mobility management function (AMF), a first NAS request message, wherein the sending corresponds to a start of the first NAS period. The wireless device may abort the NAS procedure in response to an in response to an expiration of the first NAS period.

In an example, the first NAS period may be equal to a first value based on the access network information indicating the NTN. In an example, the first NAS period may be equal to a second value based on the access network indicating the TN.

In an example, the access network information includes the first value or the second value. In an example, the first value and/or the second value is pre-configured in the wireless device. The second value corresponds to a shorter NAS period than the first value. The second value may be shorter than the first value.

The NTN access network type is connected to the AMF and the TN access network type is connected to the AMF.

In an example, the wireless device may determine an operating mode of the wireless device based on the access network type. The wireless device may determine the first NAS period based on the operating mode. In an example, the operating mode may comprise a terrestrial operation mode, a wide band terrestrial operation mode, a narrow band terrestrial operation mode, a non-terrestrial operation mode, a non-terrestrial low earth orbit (LEO) operation mode, a non-terrestrial medium earth orbit (MEP) operation mode, a non-terrestrial geostationary earth orbit (GEO) operation mode, a non-terrestrial unmanned aircraft system (UAS) operation mode, and/or the like.

In an example, the NTN (access network type) may comprise a low earth orbit (LEO) satellite type, a medium earth orbit (MET) satellite type, a geostationary earth orbit (GEO) satellite type, an unmanned aircraft system (UAS) platform type, a high elliptical orbit (HEO) platform type, and/or the like.

In an example, the TN (access network type) may comprise a narrow band internet of things types, an enhanced machine type communication (MTC) type, a wide-band evolved terrestrial radio access (WB-E-UTRA) type, a new radio (NR) type, and/or the like. In an example implementation, the TN (access network type) may comprise a wideband evolved terrestrial radio access (WB-E-UTRA) type, a new radio (NR)type, and/or the like.

In an example, the wireless device may send a second NAS request message, in response to the expiration of the first NAS period. The sending of the second NAS request message may comprise a re-sending of a content of the first NAS request message.

In an example, the wireless device may not send the second NAS request message in response to receiving a first NAS response message prior to the expiration of the first NAS period.

The first NAS response message may comprise backhaul network information corresponding to a core network. The backhaul network information may comprise NTN type information, backhaul latency information, altitude information and/or the like.

In an example, the wireless device may determine a second NAS period based on the first NAS period and the backhaul network information. In an example, the wireless device may determine a second NAS period based on the backhaul network information.

In an example, the second NAS period may be equal to the sum of first NAS period and a delta value based on/in response to the backhaul network information indicating the NTN. The second NAS period may be equal to the first NAS period based on the backhaul network information indicating the TN.

The backhaul network information may include the delta value. In an example, the delta value is pre-configured in the wireless device.

The wireless device may increment an NAS attempt counter by 1 in response to an expiration of the first NAS period.

The wireless device may not perform/initiate a NAS procedure in response to the NAS attempt counter being equal a maximum retrial number.

In an example, a remote radio unit of the access network is an onboard to a satellite. The access network is an onboard to a satellite.

In an example, a wireless device may receive from an access network, access network information indicating an access network type of a plurality of access network types. The access network type may comprise a non-terrestrial network (NTN) access network type, a terrestrial network (TN) access network type. The wireless device may determine a first non-access stratum (NAS) timer value corresponding to a first NAS timer based on the access network type. The wireless device may initiate a NAS procedure by sending, to an access and mobility management function (AMF), a first NAS request message. The wireless may start the first NAS timer corresponding to the NAS timer value in response to initiating the NAS procedure. The wireless device may abort the NAS procedure, in response to an expiration of the first NAS timer.

In an example, a wireless device may determine, a first non-access stratum (NAS) period as a default value. The wireless device may send to an access and mobility management function (AMF), a non-access stratum (NAS) request message requesting a registration of the wireless device. The wireless device may receive, from the AMF, a NAS response message indicating a successful registration of the wireless device, wherein the NAS response message comprising a parameter. The wireless device may re-determine the first NAS period based on the parameter. The parameter may comprise an index value indicating a sets of timer period, a time offset value, NAS retransmission timer setting info, and/or the like. In an example, the default value is a preconfigured in the wireless device. In an example, the wireless device may receive the access network system information comprising the default value.

In an example, a wireless device may send to an access and mobility management function (AMF), a first NAS request message, wherein the sending corresponds to a start of a NAS period. The wireless device may receive an NAS response message prior to an expiration of the NAS period, wherein the NAS response message comprises backhaul network information corresponding to a core network. The wireless device may determine a second non-access stratum (NAS) period based on the backhaul network information. The wireless device may send to the AMF, a third NAS request message, wherein the sending corresponds to a start of the second NAS period. The wireless device may send a fourth NAS request message in response to an expiration of the second NAS period.

In an example, a wireless device may send to an access and mobility management function (AMF), a first NAS request message, wherein the sending corresponds to a start of a NAS period. The wireless device may receive an NAS response message prior to an expiration of the NAS period, wherein the NAS response message comprises backhaul network information corresponding to a core network. The wireless device may determine a second non-access stratum (NAS) timer value corresponding to the NAS timer based on the backhaul network information. The wireless device may send to the AMF, a third NAS request message, wherein the sending corresponds to a start of the second NAS timer with the second NAS timer value. The wireless device may send a fourth NAS request message in response to an expiration of the second NAS timer.

In an example, the second NAS timer value is a first value based on the backhaul network information indicating an NTN. The second NAS timer value is a second value based on the backhaul network information indicating a TN. The first value is larger than the first value.

Below some exemplary embodiments described above are summarized. It is emphasized, however, that the following enumeration, which includes 70 items, is not an exhaustive but rather a summary of exemplary embodiment included in the above description.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

FIG. 32 is a flow diagram as per an aspect of an example embodiment of the present disclosure. At 3210, a wireless device may receive, from a base station, access network information indicating an access network type of a plurality of access network types comprising: a geostationary earth orbit (GEO) access network type; and a low earth orbit (LEO) access network type. At 3220, based on the access network type, the wireless device may select a first non-access stratum (NAS) period among a plurality of NAS period. The plurality of NAS periods comprise: a first value associated with the GEO access network type; and a second value associated with the LEO access network type. At 3230, the wireless device may initiate a NAS procedure by sending, to an access and mobility management function (AMF) via the base station, a first NAS request message. A start of the first NAS period may be based on the sending. At 3240, the wireless device may abort the NAS procedure in response to an expiration of the first NAS period. According to various embodiments, the base station may be a non-terrestrial network (NTN) base station.

According to various embodiments, the first value may be longer than the second value. According to various embodiments, the second value may be further associated with a terrestrial network (TN) access network type.

According to various embodiments, the TN access network type may comprise at least one of: a wide-band evolved terrestrial radio access (WB-E-UTRA) type; or a new radio (NR) type.

According to various embodiments, the wireless device may send to the AMF, a second NAS request message in response to the expiration of the first NAS period. The second NAS request message may be based on the first NAS request message.

According to various embodiments, the wireless device may receive from the AMF, a first NAS response message prior to the expiration of the first NAS period.

According to various embodiments, the wireless device may receive, backhaul network information corresponding to a core network. The wireless device may determine a second NAS period based on the backhaul network information. The wireless device may send to the AMF, a third NAS request message. A start of the second NAS period may be based on the sending the third NAS request message.

According to various embodiments, the backhaul network information comprises at least one of: NTN type information; backhaul latency information; or altitude information. According to various embodiments, the NTN type information comprises at least one of: a parameter indicating a GEO; a parameter indicating a medium earth orbit (MEO); or a parameter indicating a LEO.

According to various embodiments, a wireless device may send to an access and mobility management function (AMF) via a base station, a first non-access stratum (NAS) request message. A start of a NAS period may be based on the sending. The wireless device may receive from the AMF, an NAS response message. The NAS response message may comprise backhaul network information of a backhaul interface. The wireless device may determine a second NAS period based on the backhaul network information. The wireless device may send to the AMF, a third NAS request message. A start of the second NAS period may be based on the sending the third NAS request message.

According to various embodiments, the backhaul interface may be between the base station and the AMF. According to various embodiments, the reception of the NAS response message may be prior to an expiration of the NAS period.

According to various embodiments, the backhaul network information may comprise at least one of: non-terrestrial network (NTN) type information; backhaul latency information; or altitude information.

According to various embodiments, the NTN type information may comprise one of:
 a geostationary earth orbit (GEO) NTN type; a medium earth orbit (MEO) NTN type; and a low earth orbit (LEO) NTN type.

According to various embodiments, the second NAS period is further based on the first NAS period.

Figure 33:
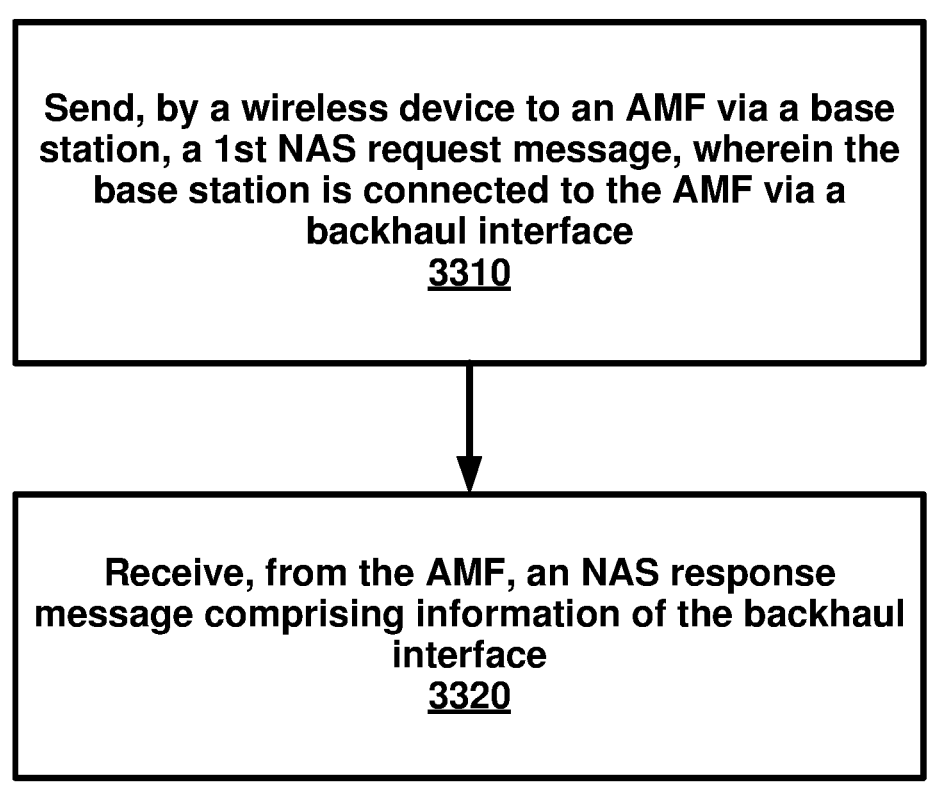
FIG. 33 is a flow diagram of an aspect of an example embodiment of the present disclosure.

FIG. 33 is a flow diagram as per an aspect of an example embodiment of the present disclosure. At 3310, a wireless device may send to an access and mobility management function (AMF) via a base station, a first non-access stratum (NAS) request message. The base station may be connected to the AMF via a backhaul interface. At 3320, the wireless device may receive from the AMF, an NAS response message. The NAS response message may comprise information of the backhaul interface.

According to various embodiments, the information may comprise a backhaul interface type of a plurality of backhaul interface types. The plurality of backhaul interface types may comprise a geostationary earth orbit (GEO) non-terrestrial network (NTN) type; a medium earth orbit (MEO) NTN type; and a low earth orbit (LEO) NTN type.

According to various embodiments, a wireless device may receive access network information from a base station. The access network information may indicate an access network type of a plurality of access network types. The plurality of access network types may comprise a geostationary earth orbit (GEO) access network type; and a low earth orbit (LEO) access network type. The wireless device may start a first non-access stratum (NAS) period based on sending, to an access and mobility management function (AMF) via the base station, a first NAS request message to initiate a NAS procedure. The first NAS period may be one of a plurality of NAS periods comprising: a first value associated with the GEO access network type; and a second value associated with the LEO access network type. In response to an expiration of the first NAS period, the wireless device may abort the NAS procedure.

According to various embodiments, a wireless device may receive access network information from a base station. The access network information may indicate an access network type of a plurality of access network types. The plurality of access network types may comprise a geostationary earth orbit (GEO) access network type; a low earth orbit (LEO) access network type; and a terrestrial network (TN) access network type. The wireless device may start a first non-access stratum (NAS) period based on sending, to an access and mobility management function (AMF) via the base station, a first NAS request message to initiate a NAS procedure. The first NAS period may be one of a plurality of NAS periods comprising: a first value associated with the GEO access network type; and a second value associated with the LEO access network type and the TN access network type. In response to an expiration of the first NAS period, the wireless device may abort the NAS procedure.

In this specification, a and an and similar phrases are to be interpreted as at least one and one or more. In this specification, the term may is to be interpreted as may, for example. In other words, the term may is indicative that the phrase following the term may is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often employed in combination to achieve the result of a functional module.

Example embodiments of the invention may be implemented using various physical and/or virtual network elements, software defined networking, virtual network functions.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using 5G AN. However, one skilled in the art will recognize that embodiments of the invention may also be implemented in a system comprising one or more legacy systems or LTE. The disclosed methods and systems may be implemented in wireless or wireline systems. The features of various embodiments presented in this invention may be combined. One or many features (method or system) of one embodiment may be implemented in other embodiments. A limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language means for or step for be interpreted under 35 U.S.C. 112. Claims that do not expressly include the phrase means for or step for are not to be interpreted under 35 U.S.C. 112.

What is claimed is:

1. A method, comprising:
receiving, by a wireless device from a base station, access network information;
determining, by the wireless device and based on the access network information, an access network type;
selecting, by the wireless device and based on the access network type, a non-access stratum (NAS) period value from between:
a first NAS period value associated with a terrestrial network (TN) access network type; and
a second NAS period value associated with a geostationary earth orbit (GEO) access network type;
sending, to an access and mobility management function (AMF), a first NAS request message; and
starting, by the wireless device and based on the sending the first NAS request message, a NAS period using the NAS period value.

2. The method of claim 1, wherein the base station is associated with the GEO access network type.

3. The method of claim 2, wherein the sending the first NAS request message comprises sending the first NAS request message to the AMF via the base station.

4. The method of claim 1, wherein the second NAS period value is longer than the first NAS period value.

5. The method of claim 1, wherein the TN access network type comprises at least one of:
a wide-band evolved terrestrial radio access (WB-E-UTRA) type; or
a new radio (NR) type.

6. The method of claim 1, further comprising sending, by the wireless device, a second NAS request message in response to expiration of the NAS period, wherein the second NAS request message is based on the first NAS request message.

7. The method of claim 1, further comprising aborting a NAS procedure in response to an expiration of the NAS period.

8. The method of claim 1, further comprising:
receiving, by the wireless device from the AMF, backhaul network information corresponding to a core network;
determining a second NAS period based on the backhaul network information; and
sending, to the AMF, a third NAS request message, wherein a start of the second NAS period is based on the sending the third NAS request message.

9. The method of claim 8, wherein the backhaul network information comprises at least one of:
NTN type information;
backhaul latency information; or
altitude information.

10. The method of claim 9, wherein the NTN type information comprises at least one of:
a parameter indicating a GEO;
a parameter indicating a medium earth orbit (MEO); or
a parameter indicating a low earth orbit (LEO).

11. A wireless device, comprising:
one or more processors; and
memory storing instructions that, when executed by the one or more processors, cause the wireless device to perform operations comprising:
receiving, from a base station, access network information;
determining, based on the access network information, an access network type;
selecting, based on the access network type, a non-access stratum (NAS) period value from between:
a first NAS period value associated with a terrestrial network (TN) access network type; and
a second NAS period value associated with a geostationary earth orbit (GEO) access network type;
sending, to an access and mobility management function (AMF), a first NAS request message; and
starting, based on the sending the first NAS request message, a NAS period using the NAS period value.

12. The wireless device of claim 11, wherein the base station is associated with the GEO access network type.

13. The wireless device of claim 12, wherein the sending the first NAS request message comprises sending the first NAS request message to the AMF via the base station.

14. The wireless device of claim 11, wherein the second NAS period value is longer than the first NAS period value.

15. The wireless device of claim 11, wherein the TN access network type comprises at least one of:
a wide-band evolved terrestrial radio access (WB-E-UTRA) type; or
a new radio (NR) type.

16. The wireless device of claim 11, wherein the instructions further cause the wireless device to perform the operations comprising sending, by the wireless device, a second NAS request message in response to expiration of the NAS period, wherein the second NAS request message is based on the first NAS request message.

17. The wireless device of claim 11, wherein the instructions further cause the wireless device to perform the operations comprising:
receiving, by the wireless device from the AMF, backhaul network information corresponding to a core network;
determining a second NAS period based on the backhaul network information; and
sending, to the AMF, a third NAS request message, wherein a start of the second NAS period is based on the sending the third NAS request message.

18. The wireless device of claim 17, wherein the backhaul network information comprises at least one of:
NTN type information;
backhaul latency information; or
altitude information.

19. The wireless device of claim 18, wherein the NTN type information comprises at least one of:
a parameter indicating a GEO;
a parameter indicating a medium earth orbit (MEO); or
a parameter indicating a low earth orbit (LEO).

20. A system comprising:
a base station comprising:
one or more first processors; and
first memory storing first instructions that, when executed by the one or more first processors, cause the base station to transmit access network information indicating an access network type; and
a wireless device comprising:
one or more second processors; and
second memory storing second instructions that, when executed by the one or more second processors, cause the wireless device to perform operations comprising:
receiving, from the base station, the access network information;

determining, based on the access network information, the access network type;

selecting, based on the access network type, a non-access stratum (NAS) period value from between:
- a first NAS period value associated with a terrestrial network (TN) access network type; and
- a second NAS period value associated with a geostationary earth orbit (GEO) access network type;

sending, to an access and mobility management function (AMF), a first NAS request message; and starting, based on the sending the first NAS request message, a NAS period using the NAS period value.

\* \* \* \* \*